US012337446B2

(12) United States Patent
Suzuki et al.

(10) Patent No.: US 12,337,446 B2
(45) Date of Patent: Jun. 24, 2025

(54) IMPACT TOOL

(71) Applicant: MAKITA CORPORATION, Anjo (JP)

(72) Inventors: Yuta Suzuki, Anjo (JP); Makoto Chikaraishi, Anjo (JP); Seiichi Ohkawara, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/543,064

(22) Filed: Dec. 18, 2023

(65) Prior Publication Data

US 2024/0238950 A1 Jul. 18, 2024

(30) Foreign Application Priority Data

Jan. 18, 2023 (JP) ................................ 2023-005661
Sep. 15, 2023 (JP) ................................ 2023-149973

(51) Int. Cl.

*B25B 23/18* (2006.01)
*B25B 21/02* (2006.01)
*B25D 11/00* (2006.01)
*B25F 5/00* (2006.01)
*B25F 5/02* (2006.01)

(52) U.S. Cl.

CPC .............. *B25B 23/18* (2013.01); *B25B 21/02* (2013.01); *B25D 11/00* (2013.01); *B25F 5/006* (2013.01); *B25F 5/026* (2013.01)

(58) Field of Classification Search

CPC ......... B25B 23/18; B25B 21/02; B25D 11/00; B25F 5/006; B25F 5/026
See application file for complete search history.

(56) References Cited

U.S. PATENT DOCUMENTS

| | | | | |
|---|---|---|---|---|
| 7,815,356 | B2 | 10/2010 | Lutz et al. | |
| 8,317,350 | B2 * | 11/2012 | Friedman | B23Q 17/2404 362/120 |
| 8,328,381 | B2 | 12/2012 | Dixon et al. | |
| 8,496,366 | B2 | 7/2013 | Leong | |
| 8,820,955 | B2 | 9/2014 | Dixon et al. | |
| 10,040,181 | B2 | 8/2018 | Fu et al. | |
| 2019/0001457 | A1 * | 1/2019 | Ely | B25F 5/00 |
| 2021/0222866 | A1 * | 7/2021 | Niwa | F21V 33/008 |
| 2021/0260733 | A1 | 8/2021 | Fischer et al. | |
| 2022/0388134 | A1 * | 12/2022 | Hozumi | B25B 23/18 |

FOREIGN PATENT DOCUMENTS

| | | | | |
|---|---|---|---|---|
| DE | 202018107139 | U1 * | 2/2019 | B25F 5/021 |
| JP | 4923883 | B2 | 4/2012 | |
| JP | 4936213 | B2 | 5/2012 | |
| JP | 5146717 | B2 | 2/2013 | |
| JP | 5671332 | B2 | 2/2015 | |
| JP | 5769017 | B2 | 8/2015 | |
| JP | 5844970 | B2 | 1/2016 | |
| JP | 5900141 | B2 | 4/2016 | |

* cited by examiner

*Primary Examiner* — Michelle Lopez
(74) *Attorney, Agent, or Firm* — Oliff PLC

(57) ABSTRACT

An impact tool includes a light emitter unit that is isolated from vibrations. An impact tool includes a motor, a hammer rotatable by the motor, an anvil strikable by the hammer in a rotation direction, a hammer case accommodating the hammer, a light emitter unit including a light emitter that illuminates an area adjacent to a front end of the anvil, and a radial elastic member supported by the hammer case and supporting the light emitter unit from radially inside.

19 Claims, 45 Drawing Sheets

IMPACT TOOL

CROSS-REFERENCE TO RELATED APPLICATIONS

This application claims the benefit of priority to Japanese Patent Application No. 2023-005661, filed on Jan. 18, 2023, and Japanese Patent Application No. 2023-149973, filed on Sep. 15, 2023, the entire contents of which are hereby incorporated by reference.

BACKGROUND

1. Technical Field

The present disclosure relates to an impact tool.

2. Description of the Background

In the technical field of power tools, a handheld impact tool is known as described in U.S. Pat. No. 8,496,366. A known handheld power tool includes a cover fixable to the housing to cover a light substrate and a substrate buffer.

BRIEF SUMMARY

A known impact tool includes an annular light-emitting diode (LED) mounted on the distal end of its hammer case. The LED illuminates a workpiece to improve workability in darkness. A lens to transmit light from the LED typically includes a transparent resin component. Recent impact tools that can output higher power may have a larger weight and cause more vibrations. In a known structure, the lens and the LED are received in an annular recess on the distal end of a hammer case. The hammer case and the lens are covered with a hammer case cover to absorb a shock. However, for a heavy high-power product, the hammer case cover cannot fully absorb a shock to the product resulting from a drop, causing the outer circumference of the hammer case to deform and break the lens and the substrate. More specifically, an outer rib defines an annular recess in which the lens and the substrate are received. When the product is dropped, the outer rib receives a shock through the hammer case cover. For a heavy product, the outer rib may deform under the shock, possibly damaging the lens or the substrate inside the outer rib. In a known structure, the hammer case has an annular recess on its distal end to receive a buffer, a substrate, and a lens. The buffer is located between the substrate and the bottom of the recess to protect the substrate from vibrations and heat generated during striking. In this structure, the lens and the substrate are supported in direct contact with the hammer case. When a high-power product produces large vibrations, such vibrations may damage the substrate or the lens. The lens is directly supported by the hammer case in the radial direction, and a vibration component other than in the axial direction propagates to the substrate through the lens.

One or more aspects of the present disclosure are directed to an impact tool including a light emitter unit that is isolated from vibrations.

A first aspect of the present disclosure provides an impact tool, including:

a motor;

a hammer rotatable by the motor;

an anvil strikable by the hammer in a rotation direction;

a hammer case accommodating the hammer;

a light emitter unit including a light emitter configured to illuminate an area adjacent to a front end of the anvil; and a radial elastic member supported by the hammer case and supporting the light emitter unit from radially inside.

A second aspect of the present disclosure provides an impact tool, including:

a motor;

a hammer rotatable by the motor;

an anvil strikable by the hammer in a rotation direction;

a hammer case accommodating the hammer;

a light emitter unit including a light emitter configured to illuminate an area adjacent to a front end of the anvil; and an axial elastic member supported by the hammer case, the axial elastic member including an axial base and a cover, the axial base supporting the light emitter unit from rear, the cover covering the light emitter unit from radially outside.

A third aspect of the present disclosure provides an impact tool, including:

a motor;

a hammer rotatable by the motor;

an anvil strikable by the hammer in a rotation direction;

a hammer case accommodating the hammer;

a light emitter unit including a light emitter configured to illuminate an area adjacent to a front end of the anvil;

an elastic member supported by the hammer case, the elastic member including a front support supporting the light emitter unit from front; and a fastener fastened to at least a part of the hammer case and supporting the front support from front.

A fourth aspect of the present disclosure provides an impact tool, including:

a motor;

a hammer rotatable by the motor;

an anvil strikable by the hammer in a rotation direction;

a hammer case accommodating the hammer;

a light emitter unit including a light emitter configured to illuminate an area adjacent to a front end of the anvil; and an elastic member supported by the hammer case and supporting the light emitter unit from at least three of radially inside, radially outside, rear, or front.

A fifth aspect of the present disclosure provides an impact tool, including:

a motor;

an output unit located frontward from the motor, the output unit being rotatable about an output rotation axis extending in a front-rear direction with a rotational force from the motor;

a bearing supporting the output unit in a rotatable manner;

a case holding the bearing;

a light assembly surrounding the case; and a front bumper located frontward from the light assembly and covering at least a part of a surface of the case, the front bumper comprising rubber and being in contact with at least a part of a front surface of the light assembly.

The impact tool according to the above aspects of the present disclosure includes a light emitter unit that is isolated from vibrations.

DETAILED DESCRIPTION

Figure 1:
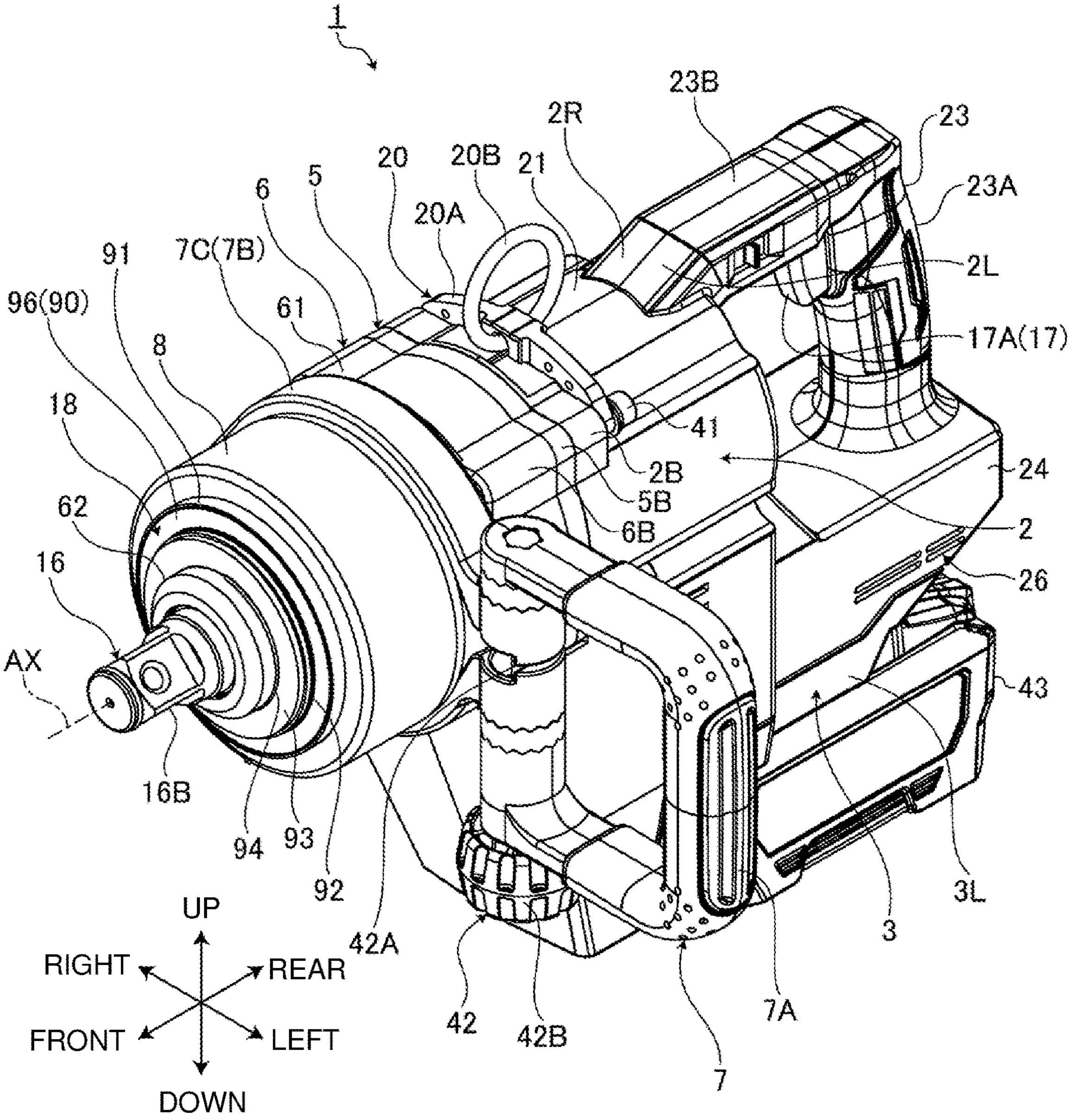
FIG. 1 is a perspective view of an impact tool according to an embodiment as viewed from the left front.

A first aspect of the present disclosure provides an impact tool (1), comprising:

- a motor (10);
- a hammer (71) rotatable by the motor (10);
- an anvil (16) strikable by the hammer (71) in a rotation direction;
- a hammer case (6) accommodating the hammer (71);
- a light emitter unit (90) including a light emitter (95B) configured to illuminate a front end of the anvil (16) and an area adjacent to the front end of the anvil (16); and
- a radial elastic member (92) supported by the hammer case (6) and supporting the light emitter unit (90) from radially inside.

A second aspect of the present disclosure provides the impact tool (1) according to the first aspect in which

- the hammer case (6) includes
  - a first cylinder (61) surrounding the hammer (71),
  - a second cylinder (62) located frontward from the first cylinder (61) and having a smaller outer diameter than the first cylinder (61), and
  - a front wall (63) connecting a front end of the first cylinder (61) and a rear end of the second cylinder (62),
- the light emitter unit (90) at least partially surrounds the second cylinder (62), and
- the radial elastic member (92) includes a radial base (92A) between the second cylinder (62) and the light emitter unit (90) in a radial direction.

A third aspect of the present disclosure provides the impact tool (1) according to the second aspect in which

- the radial base (92A) includes
  - an inner circumferential surface facing an outer circumferential surface of the second cylinder (62), and
  - a radial rib (92D) protruding radially inward from the inner circumferential surface, the radial rib (92D) being in contact with the outer circumferential surface of the second cylinder (62).

A fourth aspect of the present disclosure provides the impact tool (1) according to the second aspect or the third aspect in which the radial base (92A) is in contact with an inner circumferential surface of the light emitter unit (90).

A fifth aspect of the present disclosure provides the impact tool (1) according to any one of the second to fourth aspects in which the radial elastic member (92A) includes a rear support (92B) supporting the light emitter unit (90) from rear.

A sixth aspect of the present disclosure provides the impact tool (1) according to the fifth aspect in which the rear support (92B) includes a rear surface facing a front surface of the front wall (63), and a first axial rib (92F) protruding rearward from the rear surface, the first axial rib (92F) being in contact with the front surface of the front wall (63).

A seventh aspect of the present disclosure provides the impact tool (1) according to the fifth aspect or the sixth aspect in which the rear support (92B) is in contact with a rear surface of the light emitter unit (90).

An eighth aspect of the present disclosure provides the impact tool (1) according to any one of the second to seventh aspects in which the radial elastic member (92B) includes a front support (92C) supporting the light emitter unit (90) from front.

A ninth aspect of the present disclosure provides the impact tool (1) according to the eighth aspect in which the front support (92C) is in contact with a front surface of the light emitter unit (90).

A tenth aspect of the present disclosure provides the impact tool (1) according to the eighth aspect or the ninth aspect, further comprising:

a fastener (93, 94) fastened to at least a part of the hammer case (6) and supporting the front support (92C) from front.

An eleventh aspect of the present disclosure provides the impact tool (1) according to any one of the first to tenth aspects in which the radial elastic member (92) surrounds the anvil (16).

A twelfth aspect of the present disclosure provides the impact tool (1) according to any one of the first to eleventh aspects, further comprising:

an axial elastic member (91) supporting the light emitter unit (90) from rear.

A thirteenth aspect of the present disclosure provides the impact tool (1) according to the twelfth aspect in which the hammer case (6) includes a first cylinder (61) surrounding the hammer (71), a second cylinder (62) located frontward from the first cylinder (61) and having a smaller outer diameter than the first cylinder (61), and a front wall (63) connecting a front end of the first cylinder (61) and a rear end of the second cylinder (62), and the axial elastic member (91) includes an axial base (91A) between the front wall (63) and the light emitter unit (90) in an axial direction.

A fourteenth aspect of the present disclosure provides the impact tool (1) according to the thirteenth aspect in which the axial base (91A) includes a rear surface facing a front surface of the front wall (63), and a second axial rib (91D) protruding rearward from the rear surface, the second axial rib (91D) being in contact with a front surface of the front wall (63).

A fifteenth aspect of the present disclosure provides the impact tool (1) according to the thirteenth aspect or the fourteenth aspect in which the axial base (91A) is in contact with a rear surface of the light emitter unit (90).

A sixteenth aspect of the present disclosure provides the impact tool (1) according to any one of the twelfth to fifteenth aspects in which the axial elastic member (91) includes a cover (91B) covering the light emitter unit (90) from radially outside.

A seventeenth aspect of the present disclosure provides the impact tool (1) according to the sixteenth aspect in which the cover (91B) is in contact with an outer circumferential surface of the light emitter unit (90).

An eighteenth aspect of the present disclosure provides impact tool (1), comprising:

a motor (10);

a hammer (71) rotatable by the motor (10);

an anvil (16) strikable by the hammer (71) in a rotation direction;

a hammer case (6) accommodating the hammer (71);

a light emitter unit (90) including a light emitter (95B) configured to illuminate a front end of the anvil (16) and an area adjacent to the front end of the anvil (16); and an axial elastic member (91) supported by the hammer case (6), the elastic member (91) including an axial base (91A) and a cover (91B), the axial base (91A) supporting the light emitter unit (90) from rear, the cover (91B) covering the light emitter unit (90) from radially outside.

A nineteenth aspect of the present disclosure provides the impact tool (1) according to the eighteenth aspect in which the cover (91B) has a radial dimension (Db) smaller than an axial dimension (Da) of the axial base (91A).

A twentieth aspect of the present disclosure provides an impact tool (1), comprising:

a motor (10);

a hammer (71) rotatable by the motor (10);

an anvil (16) strikable by the hammer (71) in a rotation direction;

a hammer case (6) accommodating the hammer (71);

a light emitter unit (90) including a light emitter (95B) configured to illuminate a front end of the anvil (16) and an area adjacent to the front end of the anvil (16);

an elastic member (92) supported by the hammer case (6), the elastic member (92) including a front support (92C) supporting the light emitter unit (90) from front; and a fastener (93, 94) fastened to at least a part of the hammer case (6) and supporting the front support (92C) from front.

A twenty-first aspect of the present disclosure provides an impact tool (1), comprising:

a motor (10);

a hammer (71) rotatable by the motor (10);

an anvil (16) strikable by the hammer (71) in a rotation direction;

a hammer case (6) accommodating the hammer (71);

a light emitter unit (90) including a light emitter (95B) configured to illuminate a front end of the anvil (16) and an area adjacent to the front end of the anvil (16); and an elastic member (91, 92) supported by the hammer case (6) and supporting the light emitter unit (90) from at least three of radially inside, radially outside, rear, or front.

A twenty-second aspect of the present disclosure provides the impact tool (1) according to the twenty-first aspect in which the hammer case (6) includes a first cylinder (61) surrounding the hammer (71), a second cylinder (62) located frontward from the first cylinder (61) and having a smaller outer diameter than the first cylinder (61), and a front wall (63) connecting a front end of the first cylinder (61) and a rear end of the second cylinder (62), and the elastic member (91, 92) and the light emitter unit (90) are located radially inward from a line (VL) connecting the front end of the first cylinder (61) and a front end of the anvil (16) in a cross section including a rotation axis (AX) of the anvil (16) and parallel to the rotation axis (AX).

A twenty-third aspect of the present disclosure provides the impact tool (1) according to any one of the first to twenty-second aspects in which the light emitter unit (90) includes a chip-on-board light-emitting diode (95).

A twenty-fourth aspect of the present disclosure provides the impact tool (1) according to the twenty-third aspect in which the light emitter unit (90) includes an optical member (96) facing a front surface of the light emitter (95B), and the optical member (96) transmits light emitted from the light emitter (95B).

A twenty-fifth aspect of the present disclosure provides the impact tool (1) according to the twenty-fourth aspect in which the optical member (96) and a substrate in the chip-on-board light-emitting diode (95) are fastened together with a fastener (96G).

A twenty-sixth aspect of the present disclosure provides the impact tool (1) according to the twenty-fifth aspect in which the fastener (96G) includes a snap-fit (96G) included in the optical member (96).

A twenty-seventh aspect of the present disclosure provides an impact tool (1B), comprising:

a motor (10);

an output unit (16) located frontward from the motor (10), the output unit (16) being rotatable about an output rotation axis (AX) extending in a front-rear direction with a rotational force from the motor (10);

a bearing (79) supporting the output unit (16) in a rotatable manner;

a case (6) holding the bearing (79);

a light assembly (18B) surrounding the case (6); and a front bumper (120) located frontward from the light assembly (18B) and covering at least a part of a surface of the case (6), the front bumper (120) comprising rubber and being in contact with at least a part of a front surface of the light assembly (18B).

A twenty-eighth aspect of the present disclosure provides the impact tool (1B) according to the twenty-seventh aspect in which the front bumper (120) includes a cylindrical portion (121) surrounding the case (6), and a protrusion (123) protruding radially inward from an inner circumferential surface of the cylindrical portion (121), the protrusion (123) being received in a groove (62R) on an outer circumferential surface of the case (6).

A twenty-ninth aspect of the present disclosure provides the impact tool (1B) according to the twenty-seventh aspect in which the light assembly (18B) includes a light emitter unit (300) surrounding the case (6) and including a light emitter (95), and a radial elastic member (302) supported by the case (6) and supporting the light emitter unit (300) from radially inside, and the front bumper (120) is in contact with at least a part of a front surface of the radial elastic member (302).

A thirtieth aspect of the present disclosure provides the impact tool (1B) according to the twenty-ninth aspect in which the light emitter unit (300) includes an optical member (960) facing a front surface of the light emitter (95), and the optical member (960) transmitting light emitted from the light emitter (95), the radial elastic member (302) at least partially faces a front surface of the optical member (960), and the front bumper (120) supports the optical member (960) from front with the radial elastic member (302) in between.

A thirty-first aspect of the present disclosure provides the impact tool (1B) according to the thirtieth aspect in which the front bumper (120) has an outer end located radially outward from an inner end of the optical member (960).

A thirty-second aspect of the present disclosure provides the impact tool (1B) according to the thirty-first aspect in which the light assembly (18B) includes an axial elastic member (301) supporting the light emitter unit (300) from rear.

A thirty-third aspect of the present disclosure provides the impact tool (1B) according to the thirty-second aspect in which the case (6) includes a front cylinder (62) holding the bearing (79), a rear cylinder (61) located rearward from the front cylinder (62) and having a larger outer diameter than the front cylinder (62), a front wall (63) connecting a front end of the rear cylinder (61) and a rear end of the front cylinder (62), and an annular rib (64) protruding frontward from an outer edge of a front surface of the front wall (63), and the axial elastic member (301) is at least partially between the annular rib (64) and the light emitter unit (300) in a radial direction.

A thirty-fourth aspect of the present disclosure provides the impact tool (1B) according to the thirty-third aspect, further comprising:

a rear bumper (110) comprising rubber and covering an outer circumferential surface of the rear cylinder (61) and an outer circumferential surface of the annular rib (64).

A thirty-fifth aspect of the present disclosure provides the impact tool (1B) according to the thirty-fourth aspect in which each of the radial elastic member (302) and the axial elastic member (301) comprises rubber, and each of the front bumper (120) and the rear bumper (110) has a higher rubber hardness than the radial elastic member (302) or the axial elastic member (301).

A thirty-sixth aspect of the present disclosure provides the impact tool (1B) according to the thirty-fourth aspect in which the rear bumper (110) has a front end located rearward from a rear end of the optical member (960).

A thirty-seventh aspect of the present disclosure provides the impact tool (1B) according to the thirty-fourth aspect in which the rear bumper (110) has a front end overlapping a rear end of the axial elastic member (301) in a radial direction.

A thirty-eighth aspect of the present disclosure provides the impact tool (1B) according to the twenty-seventh aspect, further comprising:

a main housing (2) including
- a body (21) accommodating the motor (10),
- a protruding portion (22) protruding downward from the body (21),
- a controller compartment (24) behind the protruding portion (22), and
- a grip (23) behind the body (21), the grip (23) including
  - a rear grip (23A) extending upward from a rear portion of the controller compartment (24), and
  - an upper grip (23B) extending frontward from an upper end of the rear grip (23A), the rear grip (23A) having a lower end connected to the controller compartment (24) and an upper end connected to a rear end of the upper grip (23B), the upper grip (23B) having a front end connected to an upper portion of the body (21).

A thirty-ninth aspect of the present disclosure provides the impact tool (1F) according to the twenty-seventh aspect, further comprising:

a main housing (202) including
- a body (221) accommodating the motor (10),
- a grip (222) protruding downward from the body (221), and
- a battery holding portion (223) connected to a lower end of the grip (222).

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of an impact tool 1. The lateral direction, the front-rear direction, and the vertical direction are orthogonal to one another.

The impact tool 1 includes a motor 10 and an anvil 16 that is an output unit of the impact tool 1. The rotation axis of the motor 10 is referred to as a motor rotation axis MX for convenience. The rotation axis of the anvil 16 is referred to as an output rotation axis AX for convenience. The motor rotation axis MX extends vertically. The output rotation axis AX extends in the front-rear direction.

A direction parallel to the output rotation axis AX is referred to as an axial direction or axially for convenience. A direction about the output rotation axis AX is referred to as a circumferential direction or circumferentially, or a rotation direction for convenience. A direction radial from the output rotation axis AX is referred to as a radial direction or radially for convenience. A position nearer the output rotation axis AX in the radial direction, or a radial direction toward the output rotation axis AX, is referred to as radially inside or radially inward for convenience. A position farther from the output rotation axis AX in the radial direction, or a radial direction away from the output rotation axis AX, is referred to as radially outside or radially outward for convenience.

First Embodiment

Impact Tool

Figure 2:
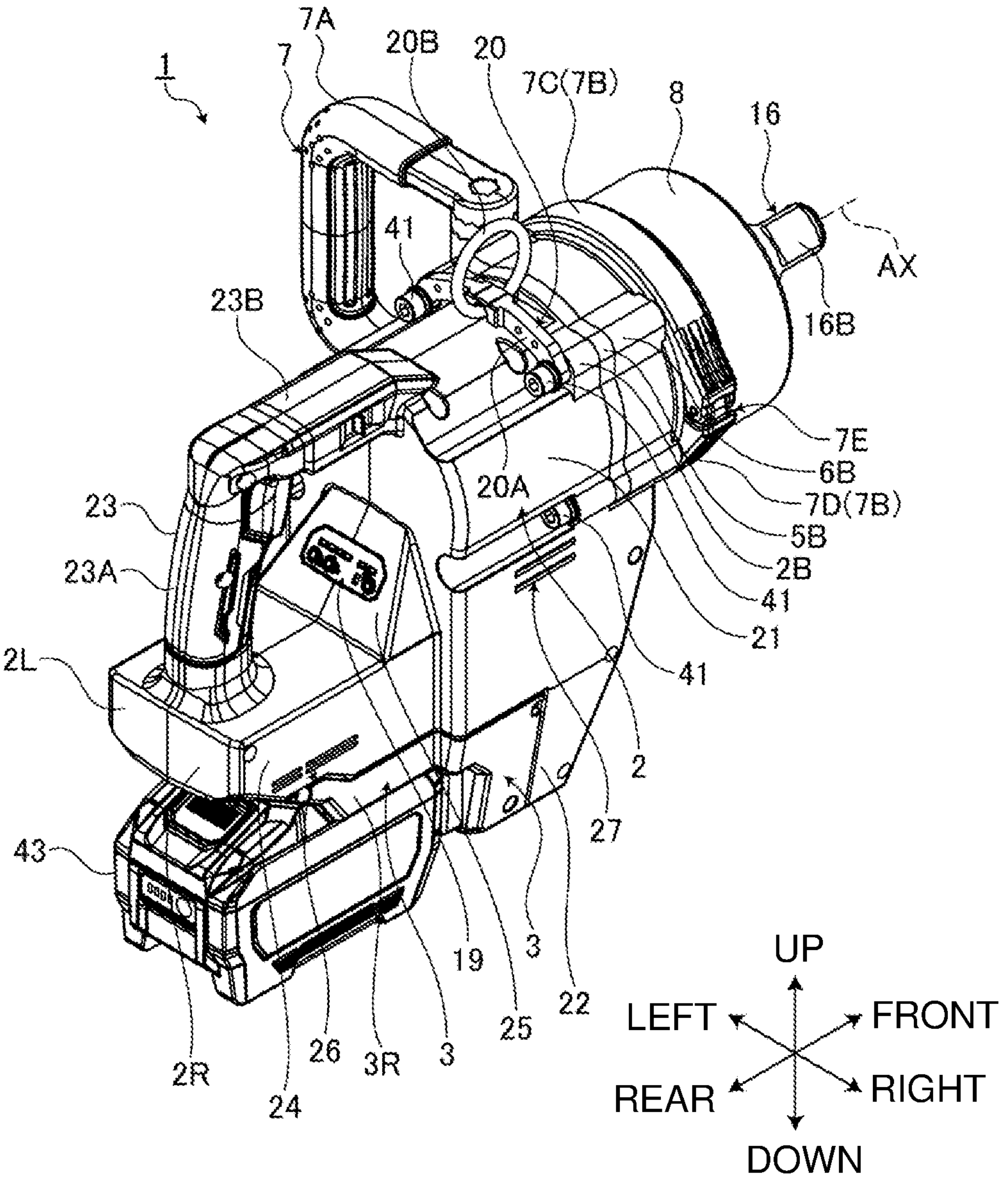
FIG. 2 is a perspective view of the impact tool according to the embodiment as viewed from the right rear.
Figure 3:
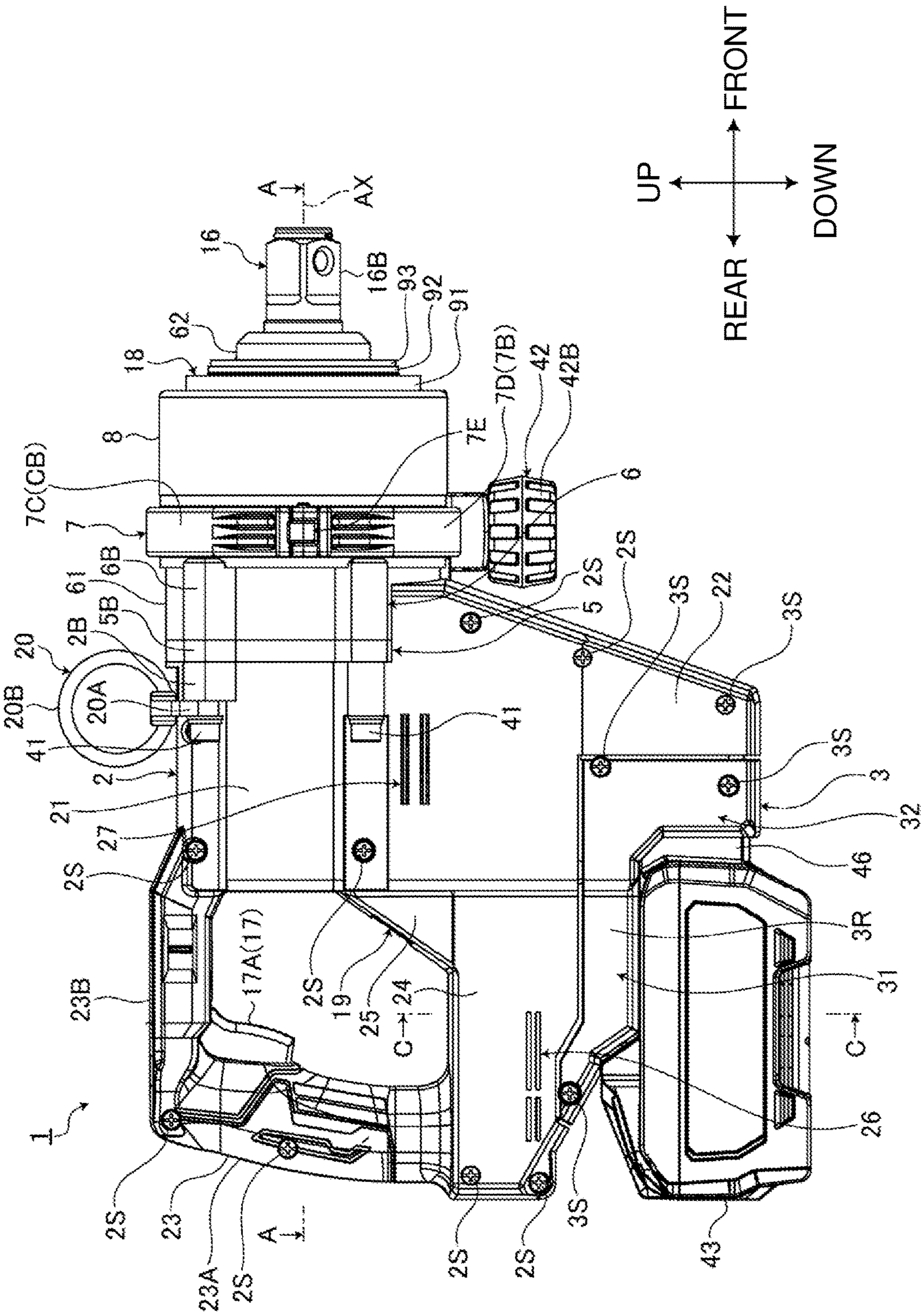
FIG. 3 is a right side view of the impact tool according to the embodiment.
Figure 4:
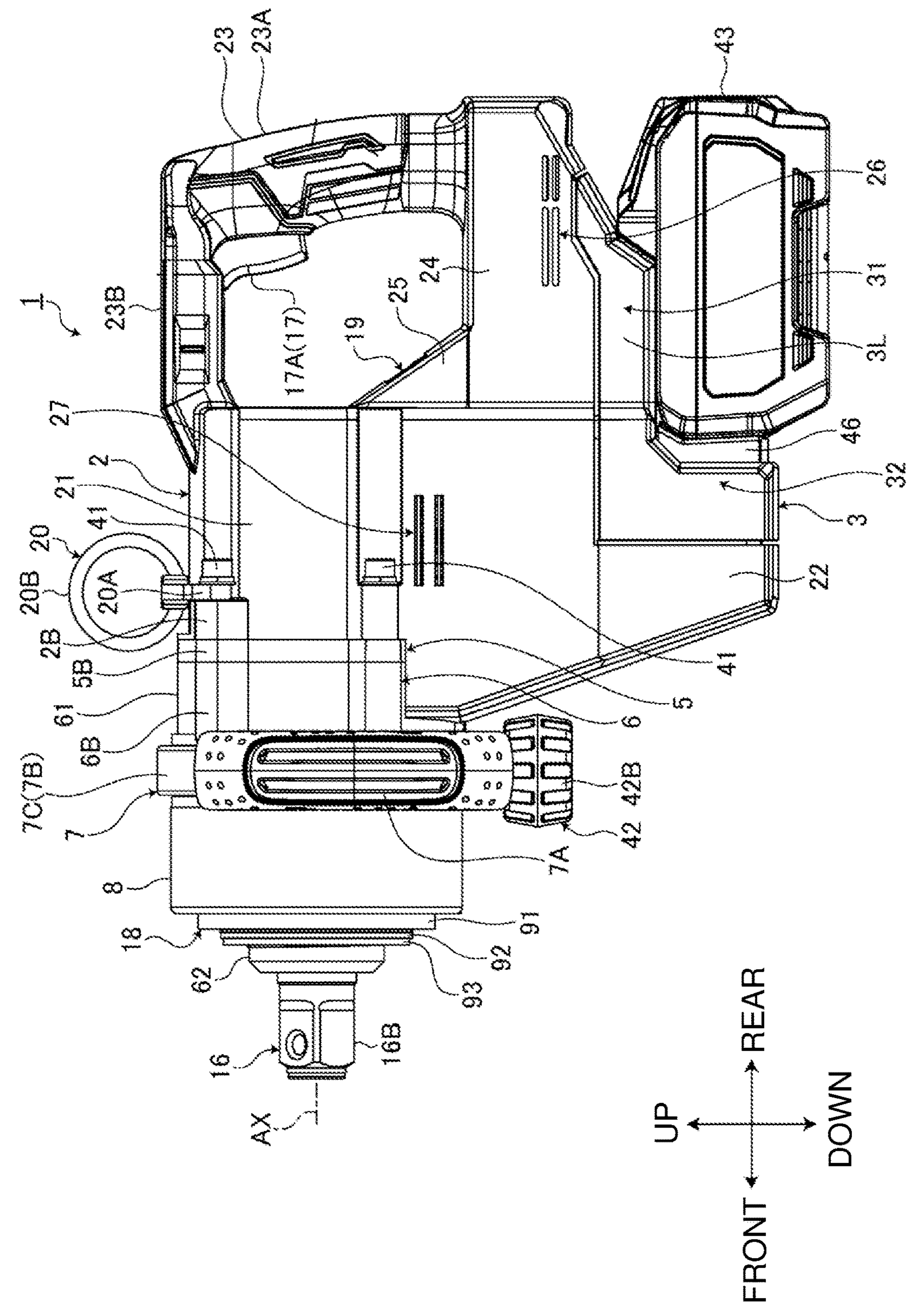
FIG. 4 is a left side view of the impact tool according to the embodiment.
Figure 5:
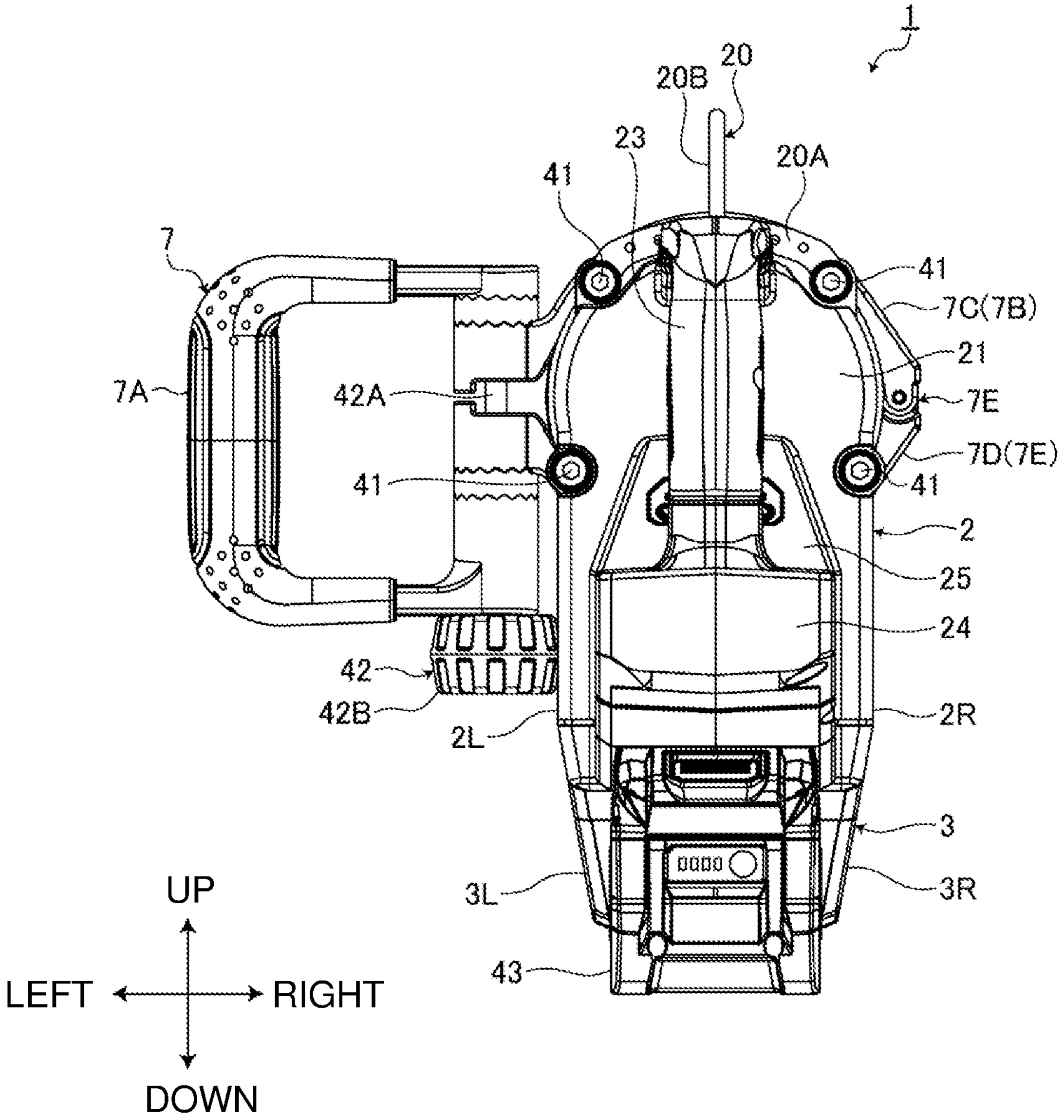
FIG. 5 is a rear view of the impact tool according to the embodiment.
Figure 6:
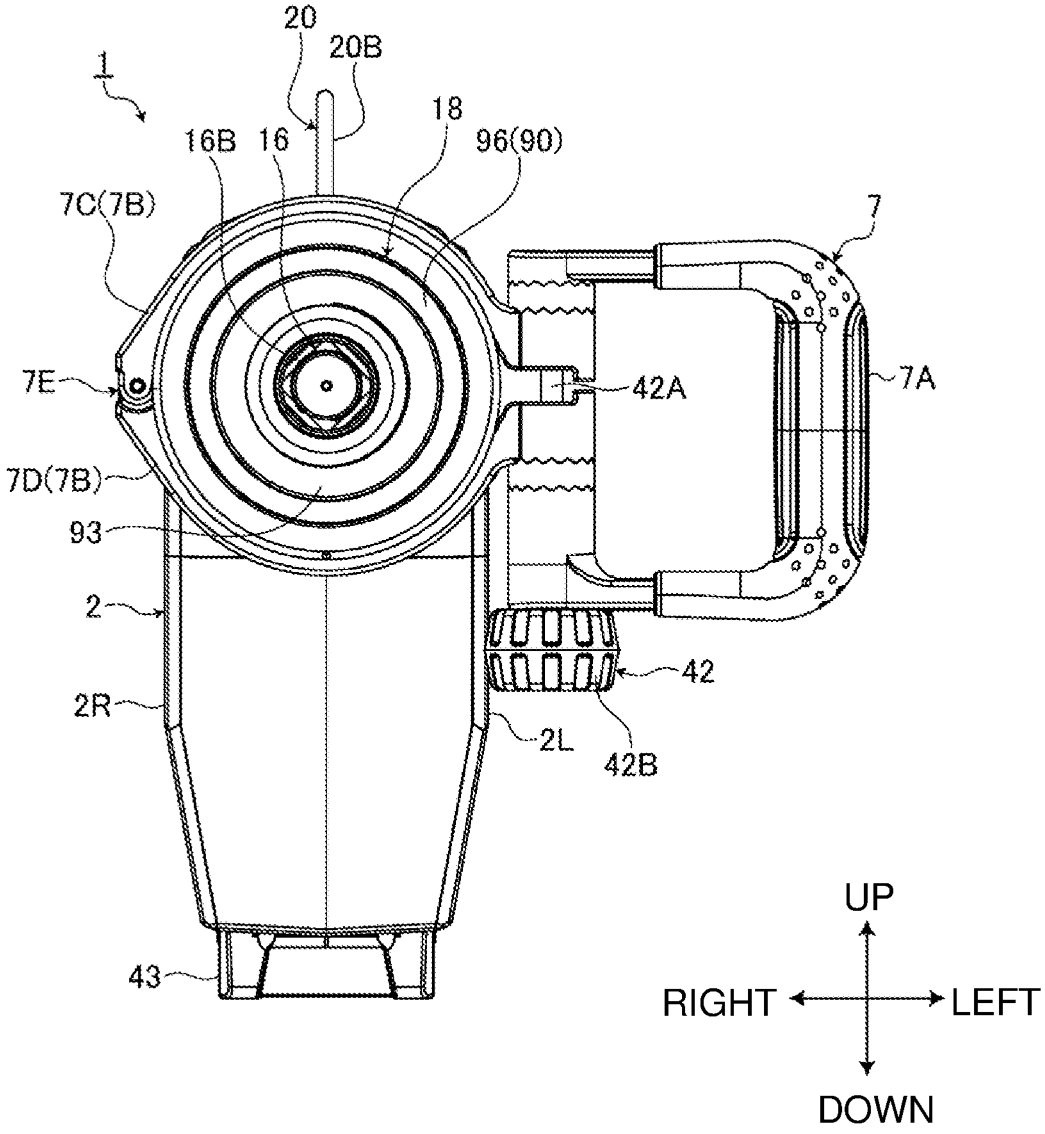
FIG. 6 is a front view of the impact tool according to the embodiment.
Figure 7:
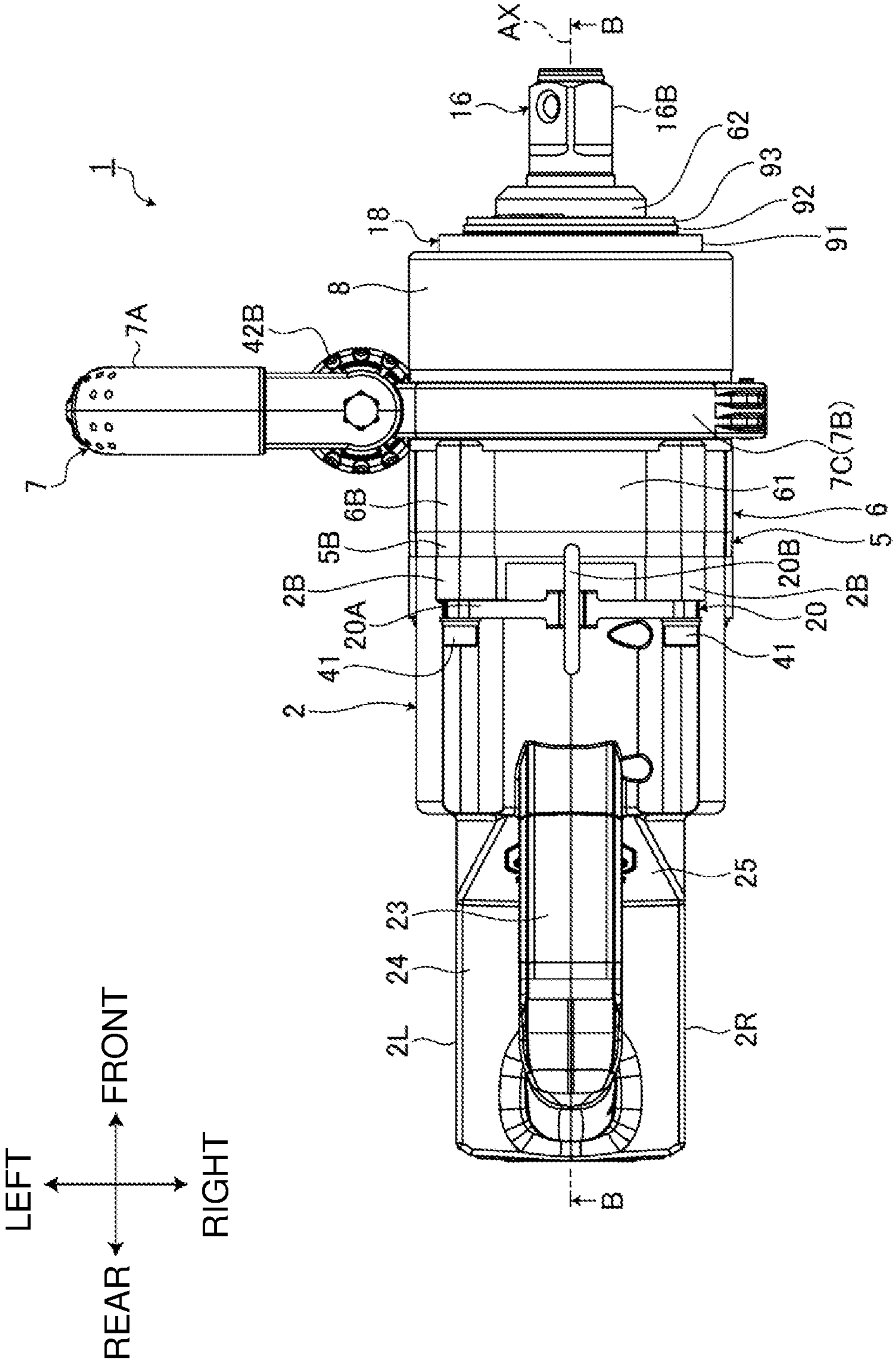
FIG. 7 is a top view of the impact tool according to the embodiment.
Figure 8:
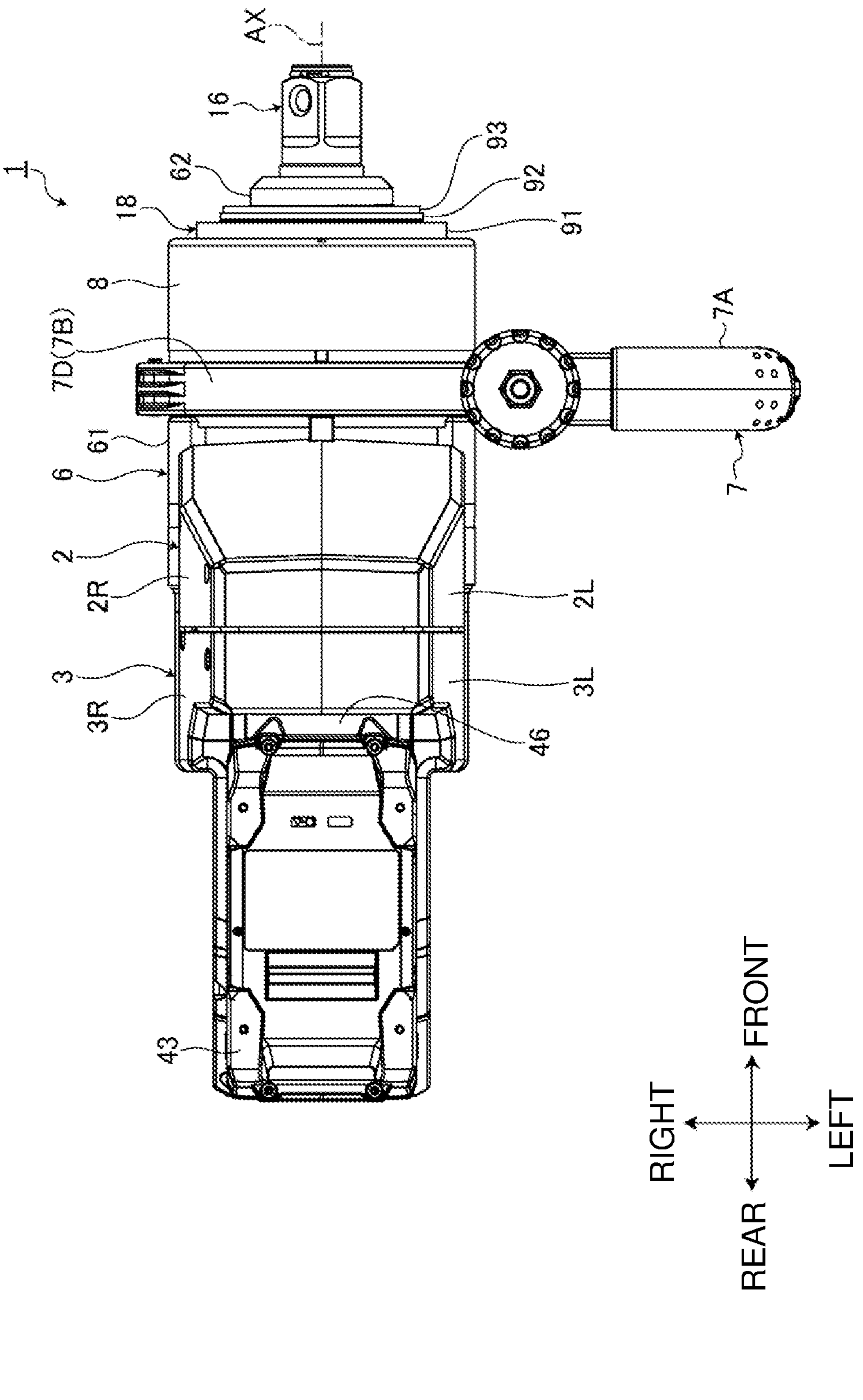
FIG. 8 is a bottom view of the impact tool according to the embodiment.
Figure 9:
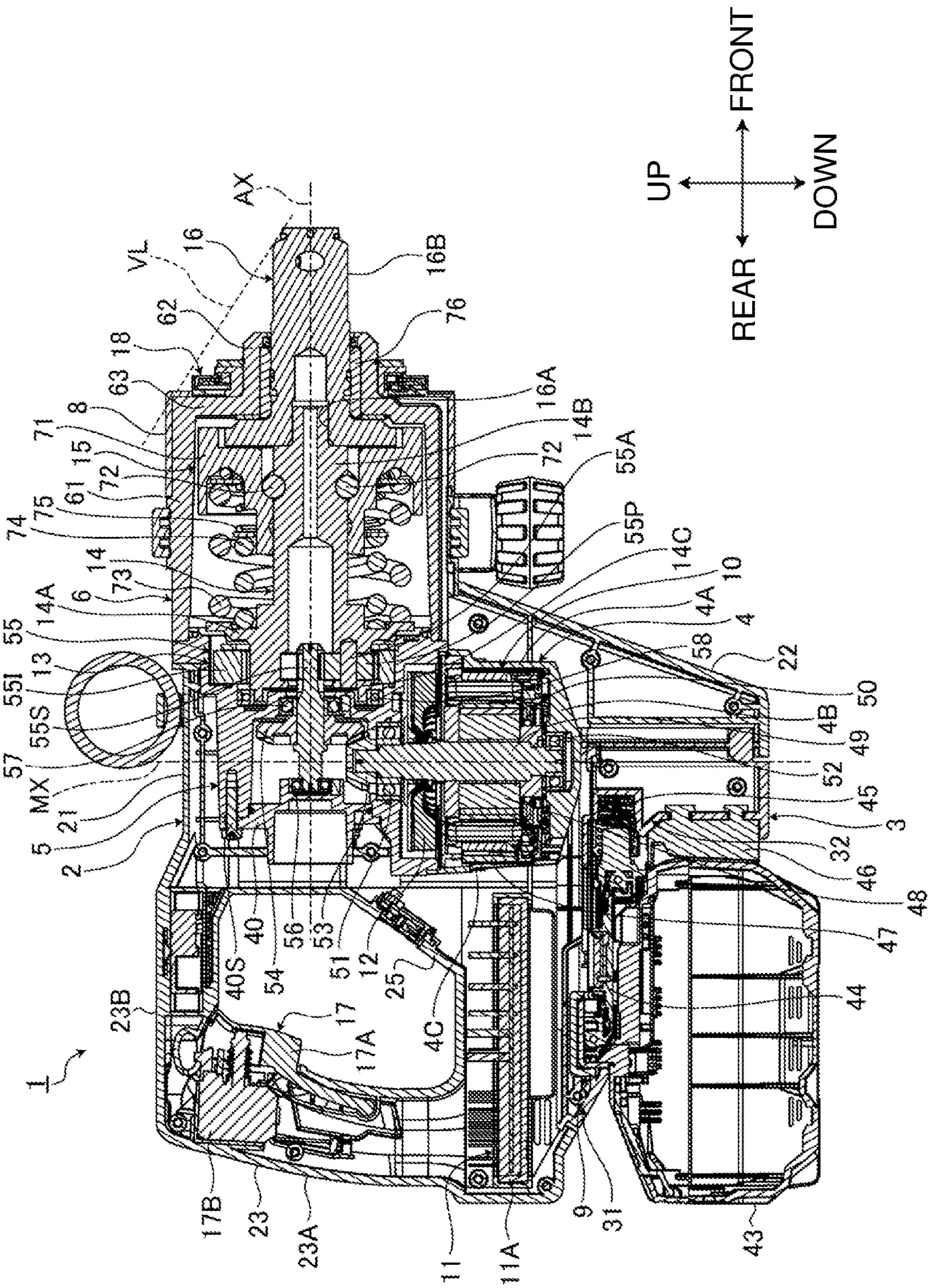
FIG. 9 is a sectional view of the impact tool according to the embodiment.
Figure 10:
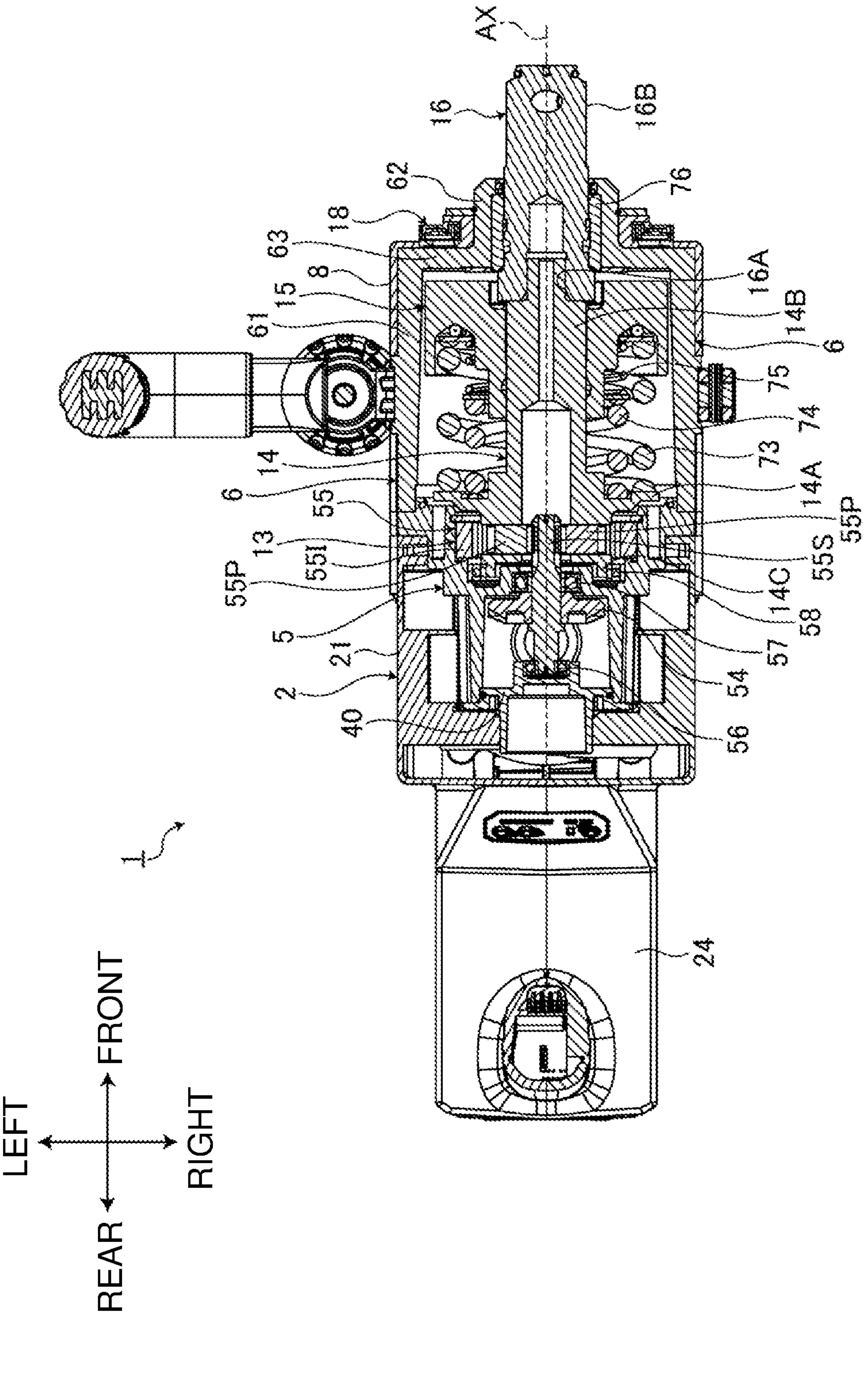
FIG. 10 is a sectional view of the impact tool according to the embodiment.
Figure 11:
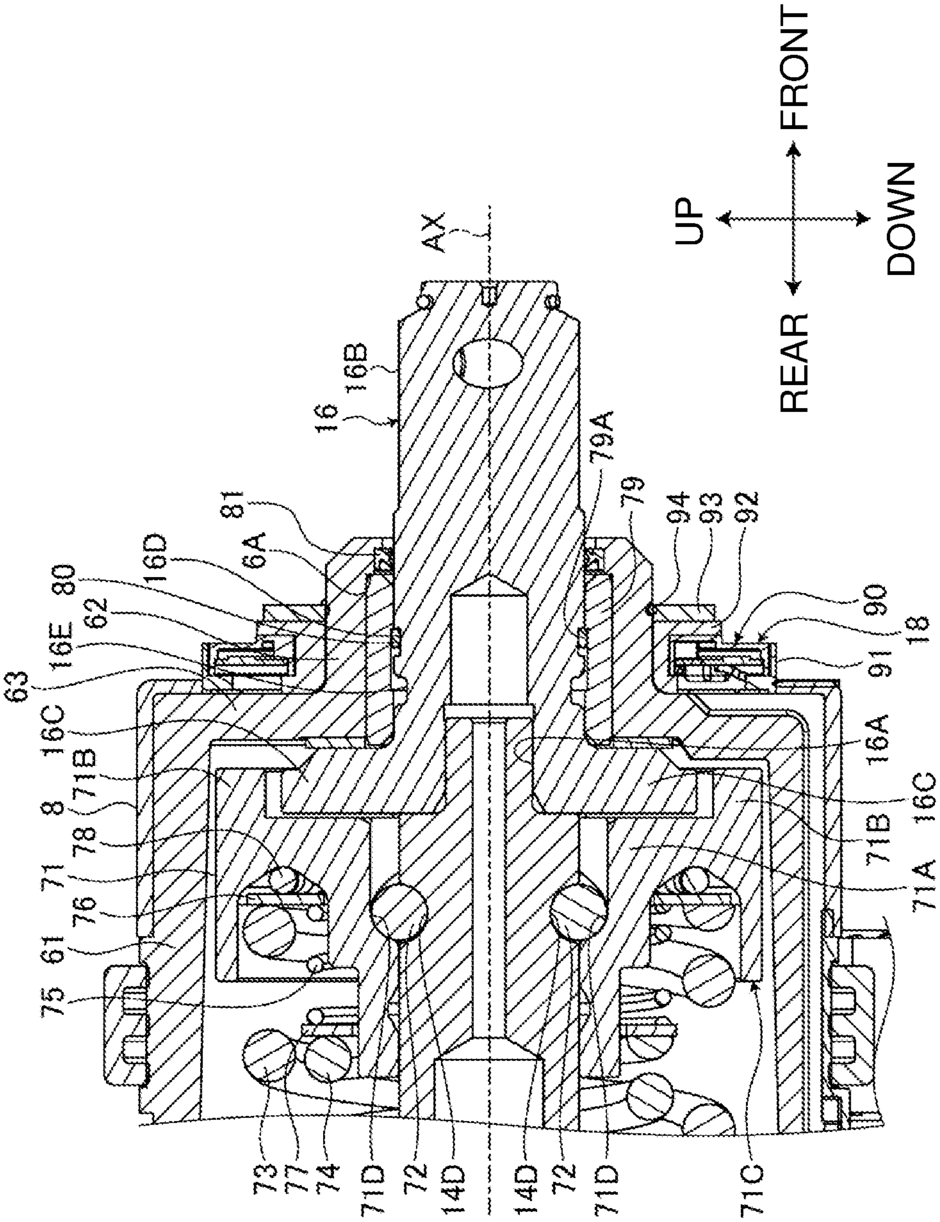
FIG. 11 is a partial sectional view of the impact tool according to the embodiment.
Figure 12:
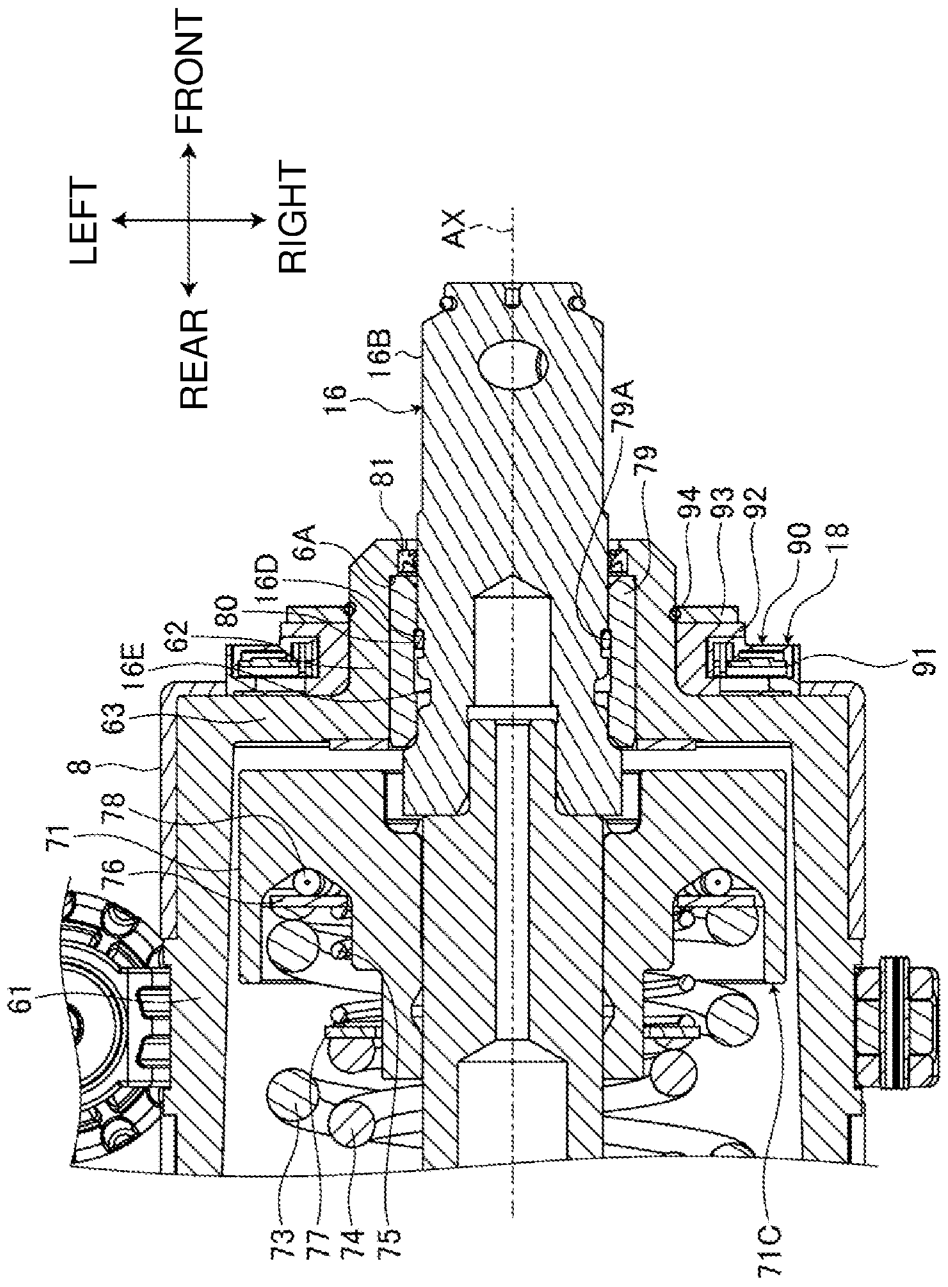
FIG. 12 is a partial sectional view of the impact tool according to the embodiment.

FIG. 1 is a perspective view of the impact tool 1 according to the present embodiment as viewed from the left front. FIG. 2 is a perspective view of the impact tool 1 as viewed from the right rear. FIG. 3 is a right side view of the impact tool 1. FIG. 4 is a left side view of the impact tool 1. FIG. 5 is a rear view of the impact tool 1. FIG. 6 is a front view of the impact tool 1. FIG. 7 is a top view of the impact tool 1. FIG. 8 is a bottom view of the impact tool 1. FIG. 9 is a sectional view of the impact tool 1 taken along line B-B in FIG. 7 as viewed in the direction indicated by the arrows. FIG. 10 is a sectional view of the impact tool 1 taken along line A-A in FIG. 3 as viewed in the direction indicated by the arrows. FIG. 11 is a partial sectional view of the impact tool 1, corresponding to a partially enlarged view of FIG. 9. FIG. 12 is a partial sectional view of the impact tool 1, corresponding to a partially enlarged view of FIG. 10.

The impact tool 1 is an example of a power tool including an electric motor 10 as a driving source. The impact tool 1 according to the embodiment is an impact wrench as an example of a fastening tool. The impact tool 1 includes a main housing 2, a battery housing 3, a motor case 4, a gear case 5, a hammer case 6, a side handle 7, a bumper 8, a battery holder 9, the motor 10, a controller 11, a fan 12, a reducer 13, a spindle 14, a striker 15, the anvil 16, a trigger switch 17, a light assembly 18, an interface panel 19, and a hook assembly 20.

The main housing 2 accommodates the motor case 4. The main housing 2 accommodates a part of the gear case 5. The main housing 2 is connected to the battery housing 3. The main housing 2 is fixed to the hammer case 6.

The main housing 2 is formed from a synthetic resin. The main housing 2 is formed from, for example, a nylon resin. The main housing 2 includes a left main housing 2L and a right main housing 2R. The right main housing 2R is on the right of the left main housing 2L. The left main housing 2L and the right main housing 2R form a pair of housing halves. The left main housing 2L and the right main housing 2R are fastened together with multiple screws 2S.

The main housing 2 includes a body 21, a protruding portion 22, a grip 23, a controller compartment 24, and a panel holder 25.

The body 21 accommodates the motor case 4. The body 21 accommodates a part of the gear case 5.

The protruding portion 22 protrudes downward from the body 21. The protruding portion 22 is located in front of the battery housing 3.

The grip 23 is grippable by an operator. The grip 23 is located behind the body 21. The grip 23 includes a rear grip 23A and an upper grip 23B. The rear grip 23A extends upward from a rear portion of the controller compartment 24. The upper grip 23B extends frontward from the upper end of the rear grip 23A. The rear grip 23A has its lower end connected to the controller compartment 24. The rear grip 23A has its upper end connected to the rear end of the upper grip 23B. The upper grip 23B has its front end connected to an upper portion of the body 21. The grip 23, the body 21, and the controller compartment 24 define a D-shaped handle. The D-shaped handle is located behind the motor 10. The trigger switch 17 is located in an upper portion of the rear grip 23A.

The controller compartment 24 accommodates the controller 11.

The panel holder 25 holds the interface panel 19.

The battery housing 3 supports the battery holder 9. The battery housing 3 is movable relative to the main housing 2 and connected to the main housing 2. The battery housing 3 is formed from a synthetic resin. The battery housing 3 is formed from, for example, a nylon resin.

The battery housing 3 is located below the controller compartment 24. The battery housing 3 is located behind the protruding portion 22. The battery housing 3 is connected to the D-shaped handle.

The battery housing 3 includes a left battery housing 3L and a right battery housing 3R. The right battery housing 3R is on the right of the left battery housing 3L. The left battery housing 3L and the right battery housing 3R form a pair of housing halves. The left battery housing 3L and the right battery housing 3R are fastened together with multiple screws 3S. The battery holder 9 is held between the left battery housing 3L and the right battery housing 3R.

The motor case 4 accommodates the motor 10. The motor case 4 is located below the gear case 5. The motor case 4 is fastened to the gear case 5.

The motor case 4 is formed from a synthetic resin. The motor case 4 is formed from, for example, a polycarbonate resin.

The motor case 4 includes a cylinder 4A and a lower wall 4B. The cylinder 4A surrounds the motor 10. The lower wall 4B is at the lower end of the cylinder 4A.

The gear case 5 accommodates at least a part of the reducer 13. The gear case 5 is located behind the hammer case 6. The gear case 5 is fastened to the hammer case 6.

The gear case 5 is formed from a metal. The gear case 5 is formed from, for example, aluminum or magnesium.

The gear case 5 is substantially cylindrical. The gear case 5 has an opening in its front portion. The gear case 5 has an opening in its rear portion. The gear case 5 has an opening in its lower portion. A bearing cover 40 is received in the rear opening of the gear case 5. The bearing cover 40 is fastened to the rear portion of the gear case 5 with screws 40S.

The hammer case 6 accommodates the striker 15 including a hammer 71. The hammer case 6 is connected to a front portion of the main housing 2. The hammer case 6 is connected to the front portion of the gear case 5.

The hammer case 6 is formed from a metal. The hammer case 6 is formed from, for example, aluminum.

The hammer case 6 is substantially cylindrical. The hammer case 6 includes a first cylinder 61, a second cylinder 62, and a front wall 63. The first cylinder 61 surrounds the striker 15 including the hammer 71. The second cylinder 62 is located frontward from the first cylinder 61. The second cylinder 62 has a smaller outer diameter than the first cylinder 61. The gear case 5 has its front end received in an opening in the rear end of the first cylinder 61. The front wall 63 connects the front end of the first cylinder 61 and the rear end of the second cylinder 62.

The main housing 2, the gear case 5, and the hammer case 6 are fastened together with multiple screws 41. The main housing 2 includes multiple screw bosses 2B. The gear case 5 includes multiple screw bosses 5B. The hammer case 6 includes multiple screw bosses 6B. The screws 41 are placed in through-holes in the screw bosses 2B and through-holes in the screw bosses 5B. The screws 41 are placed in threaded holes in the screw bosses 6B. The screws 41 are placed into the through-holes in the screw bosses 2B and the through-holes in the screw bosses 5B from the rear of the screw bosses 2B, and then into the threaded holes in the screw bosses 6B.

The motor case 4 has an opening in its upper portion. The gear case 5 has the opening in its lower portion. The motor case 4 has an internal space connecting with the internal space of the gear case 5 through the upper opening of the motor case 4 and the lower opening of the gear case 5. The motor case 4 and the gear case 5 are fastened together with multiple screws (not shown).

The gear case 5 has the opening in its front portion. The hammer case 6 has an opening in its rear portion. The gear case 5 has the internal space connecting with the internal space of the hammer case 6 through the front opening of the gear case 5 and the rear opening of the hammer case 6.

The side handle 7 is grippable by the operator. The side handle 7 includes a handle portion 7A and a base 7B. The handle portion 7A is grippable by the operator. The base 7B is fastened to the hammer case 6. The handle portion 7A is located on the left of the hammer case 6. The base 7B includes a first base 7C and a second base 7D. The second base 7D is located below the first base 7C. The first base 7C and the second base 7D are arc-shaped. The first base 7C and the second base 7D hold the first cylinder 61 in the hammer case 6 in between. The first base 7C and the second base 7D have their right ends connected to each other with a hinge 7E. The first base 7C and the second base 7D have their left ends connected to the handle portion 7A.

The left end of the first base 7C is joined to the left end of the second base 7D with a fastening assembly 42. The fastening assembly 42 includes a screw 42A and a dial 42B. The screw 42A is received in a threaded hole in the left end of the second base 7D. The dial 42B is rotatable relative to the screw 42A. The operator operates the dial 42B to rotate the dial 42B. This adjusts the distance between the left end of the first base 7C and the left end of the second base 7D. As the screw 42A is rotated to shorten the distance between the left end of the first base 7C and the left end of the second base 7D, the base 7B tightly holds the hammer case 6, fastening the side handle 7 to the hammer case 6.

Although the handle portion 7A in the embodiment is located on the left of the hammer case 6, the handle portion 7A may be at any position around the hammer case 6. The handle portion 7A may be located on, for example, the right of, above, or below the hammer case 6. The position (angle) of the handle portion 7A with respect to the hammer case 6 is adjustable by up to 360 degrees.

The bumper 8 covers at least a part of the surface of the hammer case 6. The bumper 8 in the embodiment covers the surface of the first cylinder 61. The bumper 8 protects the hammer case 6. The bumper 8 reduces contact between the hammer case 6 and objects around the impact tool 1. The bumper 8 is formed from an elastic material that is more flexible than the material for the hammer case 6. The bumper 8 is formed from, for example, styrene butadiene rubber.

The battery holder 9 holds a battery pack 43 in a detachable manner. The controller compartment 24 is located above the battery pack 43 attached to the battery holder 9. The protruding portion 22 is located in front of the battery pack 43 attached to the battery holder 9. The battery pack 43 functions as a power supply for the impact tool 1. The battery pack 43 includes a secondary battery. The battery pack 43 in the embodiment includes a rechargeable lithium-ion battery. The battery pack 43 is attached to the battery holder 9 to power the impact tool 1. The motor 10 is driven by power supplied from the battery pack 43. The controller 11 operates with power supplied from the battery pack 43.

The battery holder 9 holds a plate-like terminal unit 44. The terminal unit 44 includes a synthetic resin plate and terminals. The terminals are metal connection terminals on the plate. When the battery holder 9 receives the battery pack 43, the terminals in the terminal unit 44 are connected to battery terminals that are connection terminals in the battery pack 43.

The battery housing 3 holds a spring 45 and a rubber buffer 46. The spring 45 is located in front of the battery holder 9. The rubber buffer 46 is located in front of the battery pack 43 held by the battery holder 9. The spring 45 urges the battery holder 9 backward. The rubber buffer 46 is located frontward from the battery pack 43 attached to the battery holder 9. The rubber buffer 46 can come in contact with the front of the battery pack 43. When, for example, the impact tool 1 is dropped, an elastic force from the spring 45 reduces a shock to the terminal unit 44, and the rubber buffer 46 reduces a shock to the battery pack 43.

The motor 10 functions as a power source for the impact tool 1. The motor 10 is an inner-rotor direct-current (DC) brushless motor. The motor 10 includes a stator 47, a rotor 48, and a rotor shaft 49. The stator 47 is supported by the motor case 4. The rotor 48 is at least partially located inward from the stator 47. The rotor shaft 49 is fixed to the rotor 48. The rotor 48 is rotatable relative to the stator 47 about the motor rotation axis MX extending vertically.

The stator 47 includes a stator core including multiple teeth and multiple coils. Each coil is wound around the corresponding tooth with an insulator in between. The coils are connected to one another with a busbar unit.

The rotor 48 rotates about the motor rotation axis MX. The rotor 48 includes a rotor core and a rotor magnet fixed to the rotor core.

A sensor board 50 is fixed to the insulator in the stator 47. The sensor board 50 detects the position of the rotor 48 in the rotation direction. The sensor board 50 includes a rotation detector supported on an annular circuit board. The rotation detector detects the position of the rotor magnet in the rotor 48 to detect the position of the rotor 48 in the rotation direction.

The rotor shaft 49 is fixed to the rotor core in the rotor 48. The rotor 48 and the rotor shaft 49 rotate together about the motor rotation axis MX.

The rotor shaft 49 is rotatably supported by a rotor bearing 51 and a rotor bearing 52. The rotor bearing 51 supports an upper portion of the rotor shaft 49 in a rotatable manner. The upper portion of the rotor shaft 49 protrudes upward from the upper end face of the rotor 48. The rotor bearing 52 supports a lower portion of the rotor shaft 49 in a rotatable manner. The lower portion of the rotor shaft 49 protrudes downward from the lower end face of the rotor 48. The rotor bearing 51 is held by the gear case 5. The rotor bearing 52 is held by the motor case 4.

A first bevel gear 53 is fixed to the upper end of the rotor shaft 49. The first bevel gear 53 is connected to at least a part of the reducer 13. The rotor shaft 49 is connected to the reducer 13 with the first bevel gear 53.

The controller 11 outputs control signals for controlling the motor 10. The controller 11 includes a circuit board on which multiple electronic components are mounted. Examples of the electronic components mounted on the circuit board include a processor such as a central processing unit (CPU), a nonvolatile memory such as a read-only memory (ROM) or a storage device, a volatile memory such as a random-access memory (RAM), a field-effect transistor (FET), and a resistor.

The controller 11 is accommodated in the controller compartment 24. The controller 11 is held by a controller case 11A in the controller compartment 24.

The fan 12 generates an airflow for cooling the motor 10 and the controller 11. The fan 12 is located above the stator 47. The fan 12 is fixed to the upper portion of the rotor shaft 49. The fan 12 is located between the rotor bearing 51 and the stator 47. The fan 12 and the rotor shaft 49 rotate together.

The controller compartment 24 has inlets 26. The body 21 has outlets 27 in its upper portion. The motor case 4 has a vent 4C in its rear portion. As the fan 12 rotates, air outside the main housing 2 flows into the internal space of the controller compartment 24 through the inlets 26 to cool the controller 11. As the fan 12 rotates, the air passing through the internal space of the controller compartment 24 flows into the internal space of the motor case 4 through the vent 4C to cool the motor 10. As the fan 12 rotates, at least a part of the air passing through the internal space of the motor case 4 flows out of the motor case 4 through the outlets 27.

The reducer 13 transmits a rotational force from the motor 10 to the striker 15 through the spindle 14. The reducer 13 connects the rotor shaft 49 and the spindle 14 together. The reducer 13 rotates the spindle 14 at a lower rotational speed than the rotor shaft 49.

The reducer 13 includes a second bevel gear 54 and a planetary gear assembly 55. The second bevel gear 54 meshes with the first bevel gear 53. The planetary gear assembly 55 is driven with a rotational force from the motor 10 transmitted through the second bevel gear 54.

The planetary gear assembly 55 includes a sun gear 55S, multiple planetary gears 55P, and an internal gear 55I. The planetary gears 55P surround the sun gear 55S. The internal gear 55I surrounds the planetary gears 55P. The planetary gear assembly 55 is accommodated in the gear case 5.

The second bevel gear 54 surrounds the sun gear 55S. The second bevel gear 54 is fixed to the sun gear 55S. The second bevel gear 54 and the sun gear 55S rotate together. The second bevel gear 54 and the sun gear 55S are rotatable about the output rotation axis AX extending in the front-rear direction. The output rotation axis AX is orthogonal to the motor rotation axis MX. The sun gear 55S has its rear end supported by a gear bearing 56. The sun gear 55S has its middle portion supported by a gear bearing 57. The gear bearing 56 is held by the bearing cover 40. The gear bearing 57 is held by the gear case 5. As the rotor shaft 49 rotates to rotate the first bevel gear 53, the second bevel gear 54 rotates. This rotates the sun gear 55S.

Each planetary gear 55P meshes with the sun gear 55S. The planetary gears 55P are rotatably supported by the spindle 14 with a pin 55A. The spindle 14 is rotated by the planetary gears 55P. The internal gear 55I includes internal teeth that mesh with the planetary gears 55P. The internal gear 55I is fixed to the gear case 5. The internal gear 55I includes multiple protrusions on its outer circumferential surface. The protrusions on the internal gear 55I are fitted in recesses on the inner circumferential surface of the gear case 5. The internal gear 55I is constantly nonrotatable relative to the gear case 5.

When the rotor shaft 49 and the first bevel gear 53 rotate as driven by the motor 10, the second bevel gear 54 and the sun gear 55S rotate. As the sun gear 55S rotates, the planetary gears 55P revolve about the sun gear 55S. The planetary gears 55P revolve while meshing with the internal teeth on the internal gear 55I. The revolving planetary gears 55P rotate the spindle 14 connected to the planetary gears 55P with the pin 55A at a lower rotational speed than the rotor shaft 49.

The spindle 14 rotates with a rotational force from the motor 10 transmitted by the reducer 13. The spindle 14 transmits the rotational force from the motor 10 transmitted through the reducer 13 to the striker 15. The spindle 14 is rotatable about the output rotation axis AX. The spindle 14 has a rear portion accommodated in the gear case 5. The spindle 14 has a front portion accommodated in the hammer case 6. The spindle 14 is at least partially located in front of the reducer 13. The spindle 14 is located behind the anvil 16.

The spindle 14 includes a flange 14A, a spindle shaft 14B, and a protruding portion 14C. The spindle shaft 14B protrudes frontward from the flange 14A. The protruding portion 14C protrudes rearward from the flange 14A.

The planetary gears 55P are rotatably supported by the flange 14A and the protruding portion 14C with the pin 55A. The spindle 14 is rotatably supported by a spindle bearing 58. The spindle bearing 58 supports the protruding portion 14C in a rotatable manner. The spindle bearing 58 is held by the gear case 5.

The striker 15 strikes the anvil 16 in the rotation direction about the output rotation axis AX. The striker 15 is located in front of the motor 10. The striker 15 is driven by the motor 10. The striker 15 is rotatable about the output rotation axis AX. A rotational force from the motor 10 is transmitted to the striker 15 through the reducer 13 and the spindle 14. The striker 15 strikes the anvil 16 in the rotation direction with a rotational force of the spindle 14 rotated by the motor 10.

The striker 15 is accommodated in the first cylinder 61 in the hammer case 6. The striker 15 includes the hammer 71, balls 72, a first coil spring 73, a second coil spring 74, a third coil spring 75, a first washer 76, and a second washer 77.

The hammer 71 is located in front of the reducer 13. The hammer 71 surrounds the spindle shaft 14B. The hammer 71 is held by the spindle shaft 14B. The hammer 71 is rotated by the motor 10. The balls 72 are located between the spindle shaft 14B and the hammer 71. The hammer 71 includes a cylindrical hammer body 71A and hammer projections 71B. The hammer projections 71B are located at the front of the hammer body 71A. The hammer body 71A has an annular recess 71C on its rear surface. The recess 71C is recessed frontward from the rear surface of the hammer body 71A.

The hammer 71 is rotated by the motor 10. A rotational force from the motor 10 is transmitted to the hammer 71 through the reducer 13 and the spindle 14. The hammer 71 is rotatable together with the spindle 14 with a rotational force of the spindle 14 rotated by the motor 10. The hammer 71 and the spindle 14 rotate about the output rotation axis AX.

The first washer 76 is received in the recess 71C. The first washer 76 is supported by the hammer 71 with multiple balls 78 in between. The balls 78 are located in front of the first washer 76.

The second washer 77 is located behind the first washer 76 inside the recess 71C. The second washer 77 has a smaller outer diameter than the first washer 76. The second washer 77 and the hammer 71 are movable relative to each other in the front-rear direction.

The first coil spring 73 surrounds the spindle shaft 14B. The first coil spring 73 has its rear end supported by the flange 14A. The first coil spring 73 has its front end received in the recess 71C and supported by the first washer 76. The first coil spring 73 constantly generates an elastic force for moving the hammer 71 forward.

The second coil spring 74 surrounds the spindle shaft 14B. The second coil spring 74 is located radially inward from the first coil spring 73. The second coil spring 74 has its rear end supported by the flange 14A. The second coil spring 74 has its front end received in the recess 71C and supported by the second washer 77. The second coil spring 74 generates an elastic force for moving the hammer 71 forward when the hammer 71 moves backward.

The third coil spring 75 surrounds the spindle shaft 14B. The third coil spring 75 is located radially inward from the first coil spring 73. The third coil spring 75 is received in the recess 71C. The third coil spring 75 has its rear end supported by the second washer 77. The third coil spring 75 has its front end supported by the first washer 76. The third coil spring 75 generates an elastic force for moving the second coil spring 74 backward. The rear end of the second coil spring 74 is pressed against the flange 14A with the elastic force from the third coil spring 75. This restricts free movement of the second coil spring 74 relative to the flange 14A.

The balls 72 are formed from a metal such as steel. The balls 72 are located between the spindle shaft 14B and the hammer 71. The spindle 14 has a spindle groove 14D. The spindle groove 14D receives at least parts of the balls 72. The spindle groove 14D is on the outer surface of the spindle shaft 14B. The hammer 71 has a hammer groove 71D. The hammer groove 71D receives at least parts of the balls 72. The hammer groove 71D is on the inner surface of the hammer 71. The balls 72 are located between the spindle groove 14D and the hammer groove 71D. The balls 72 roll along the spindle groove 14D and the hammer groove 71D. The hammer 71 is movable together with the balls 72. The spindle 14 and the hammer 71 are movable relative to each other in a direction parallel to the output rotation axis AX and in the rotation direction about the output rotation axis AX within a movable range defined by the spindle groove 14D and the hammer groove 71D.

The anvil 16 is an output unit of the impact tool 1 that rotates with a rotational force from the motor 10. The anvil 16 is at least partially located in front of the hammer 71. The anvil 16 is struck by the hammer 71 in the striker 15 in the rotation direction.

The anvil 16 has an anvil recess 16A on its rear end. The anvil recess 16A is recessed frontward from the rear end of the anvil 16. The spindle 14 is located behind the anvil 16. The spindle shaft 14B has its front end received in the anvil recess 16A.

The anvil 16 includes an anvil shaft 16B and anvil projections 16C. The anvil shaft 16B is located in front of the striker 15. The anvil projections 16C protrude radially outward from the rear end of the anvil shaft 16B. The anvil projections 16C are struck by the striker 15 in the rotation direction about the output rotation axis AX.

The anvil shaft 16B has its front end located in front of the hammer case 6 through a front opening of the second cylinder 62. The anvil shaft 16B receives a socket as a tip tool on the front end.

The anvil 16 is rotatably supported by an anvil bearing 79. The anvil bearing 79 surrounds the anvil shaft 16B. The anvil 16 is rotatable about the output rotation axis AX. The anvil bearing 79 is held by the hammer case 6. The anvil bearing 79 is located inward from the second cylinder 62 in the hammer case 6. The anvil bearing 79 is held by the second cylinder 62 in the hammer case 6.

The anvil bearing 79 in the embodiment is a slide bearing. The anvil bearing 79 is cylindrical. The anvil bearing 79 in the embodiment is a sleeve. For example, a cylindrical porous metal member manufactured by powder metallurgy may be impregnated with a lubricant oil to form the slide bearing.

The anvil shaft 16B has an outer circumferential surface that is circular in a cross section orthogonal to the output rotation axis AX. The anvil bearing 79 has an inner circumferential surface that is circular in a cross section orthogonal to the output rotation axis AX.

The anvil shaft 16B has a first groove 16D on its outer circumferential surface. The first groove 16D surrounds the output rotation axis AX.

The anvil bearing 79 has a groove 79A on its inner circumferential surface. The groove 79A surrounds the output rotation axis AX.

An O-ring 80 is located between the first groove 16D and the groove 79A. The O-ring 80 reduces the likelihood of the anvil shaft 16B slipping forward from the hammer case 6. The O-ring 80 is in contact with the inner surfaces of the first groove 16D and the groove 79A. The O-ring 80 is slightly compressed by the inner surfaces of the first groove 16D and the groove 79A. The O-ring 80 seals the boundary between the anvil shaft 16B and the anvil bearing 79.

The hammer case 6 has a bearing support surface 6A. The bearing support surface 6A is in contact with the front end of the anvil bearing 79. The bearing support surface 6A is on a front end portion of the second cylinder 62. The bearing support surface 6A faces rearward. The bearing support surface 6A presses the anvil bearing 79 from the front. The bearing support surface 6A reduces the likelihood of the anvil bearing 79 slipping forward from the hammer case 6. The bearing support surface 6A is annular in a plane orthogonal to the output rotation axis AX. The opening in the front end portion of the second cylinder 62 is located radially inward from the bearing support surface 6A.

The anvil shaft 16B has its front end located frontward from the second cylinder 62 through the opening in the front end portion of the second cylinder 62. The anvil shaft 16B is at least partially located in the opening in the front end portion of the second cylinder 62. The second cylinder 62 receives a seal 81 on the front end portion. The seal 81 is located inward from the front end portion of the second cylinder 62. The seal 81 seals the boundary between the front end portion of the second cylinder 62 and the anvil shaft 16B. The seal 81 is located frontward from the O-ring 80.

The anvil shaft 16B has a second groove 16E. The second groove 16E is located rearward from the first groove 16D. The anvil shaft 16B has a smaller section modulus at the second groove 16E than at the first groove 16D. More specifically, the anvil shaft 16B has a smaller section modulus at a cross section of the anvil shaft 16B cut along the second groove 16E and orthogonal to the output rotation axis AX than at a cross section of the anvil shaft 16B cut along the first groove 16D and orthogonal to the output rotation axis AX. The anvil shaft 16B has the smallest bending moment at the second groove 16E. In other words, the anvil shaft 16B is breakable most easily at the second groove 16E when receiving a high load.

The second groove 16E is located on the outer circumferential surface of the anvil shaft 16B. The second groove 16E is located rearward from the first groove 16D. The second groove 16E surrounds the output rotation axis AX.

The second groove 16E is deeper than the first groove 16D. The depth of the second groove 16E refers to the radial dimension of the second groove 16E.

When receiving a high load during a fastening operation, for example, the anvil shaft 16B may be at least partially broken. In the embodiment, the anvil shaft 16B has the second groove 16E. The anvil shaft 16B may thus break at the second groove 16E when receiving a high load.

When the anvil shaft 16B breaks at the second groove 16E, a portion of the anvil shaft 16B frontward from the second groove 16E may move forward relative to the hammer case 6. In this case, at least a part of the inner surface of the first groove 16D and at least a part of the inner surface of the groove 79A are caught on the O-ring 80.

The anvil bearing 79 has its front end in contact with the bearing support surface 6A of the hammer case 6. When the anvil shaft 16B breaks, the anvil bearing 79 does not move forward relative to the hammer case 6. The O-ring 80 is caught on at least a part of the inner surface of the first groove 16D and at least a part of the inner surface of the groove 79A. The O-ring 80 also does not move forward relative to the hammer case 6. The anvil shaft 16B is caught on the O-ring 80 that does not move forward relative to the hammer case 6. This reduces the likelihood of the anvil shaft 16B slipping forward from the hammer case 6 when the anvil shaft 16B breaks at the second groove 16E. More specifically, this reduces the likelihood of the portion of the anvil shaft 16B frontward from the second groove 16E slipping forward from the impact tool 1 when the anvil shaft 16B breaks.

The trigger switch 17 is operable by the operator to drive the motor 10. The motor 10 being driven refers to the rotor 48 being rotated when the coils in the stator 47 are energized. The trigger switch 17 is located in the upper portion of the rear grip 23A. The trigger switch 17 includes a trigger lever 17A and a switch body 17B. The switch body 17B is located in the internal space of the rear grip 23A. The trigger lever 17A protrudes frontward from an upper front portion of the rear grip 23A. The trigger lever 17A is operable by the operator to move backward. This drives the motor 10. The trigger lever 17A is released from operation to stop the motor 10.

The light assembly 18 emits illumination light. The light assembly 18 illuminates the anvil 16 and an area around the anvil 16 with illumination light. The light assembly 18 illuminates an area ahead of the anvil 16 with illumination light. The light assembly 18 also illuminates the socket attached to the anvil 16 and an area around the socket with illumination light. The light assembly 18 surrounds the second cylinder 62 in the hammer case 6.

The interface panel 19 includes, for example, an operation button for selecting the light emission mode of the light assembly 18. The interface panel 19 includes, for example, a display that displays the remaining battery level of the battery pack 43.

The hook assembly 20 is hooked on an object. The hook assembly 20 includes a base 20A and a ring 20B. The base 20A is fastened to an upper portion of the main housing 2. The base 20A in the embodiment has through-holes to receive the screws 41. The screws 41 are placed in the through-holes in the screw bosses 2B through the through-holes in the base 20A. The base 20A is held between the heads of the screws 41 and the screw bosses 2B and is thus fastened to the upper portion of the main housing 2. The ring 20B protrudes upward from the base 20A. At least a part of the object may be placed through the ring 20B. This causes the impact tool 1 to be suspended from the object with the hook assembly 20.

Light Assembly

Figure 13:
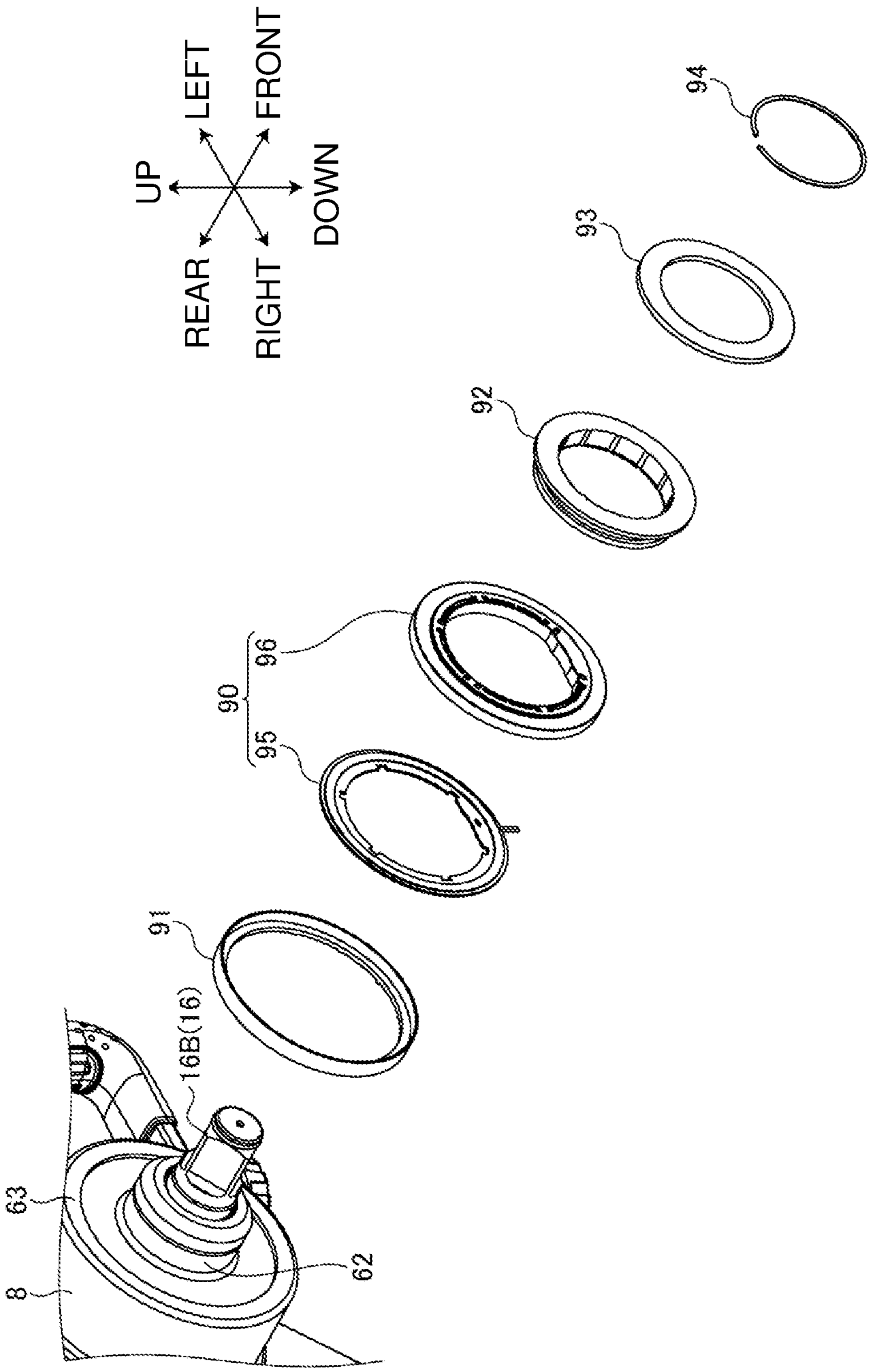
FIG. 13 is an exploded perspective view of a light assembly in the embodiment as viewed from the right front.
Figure 14:
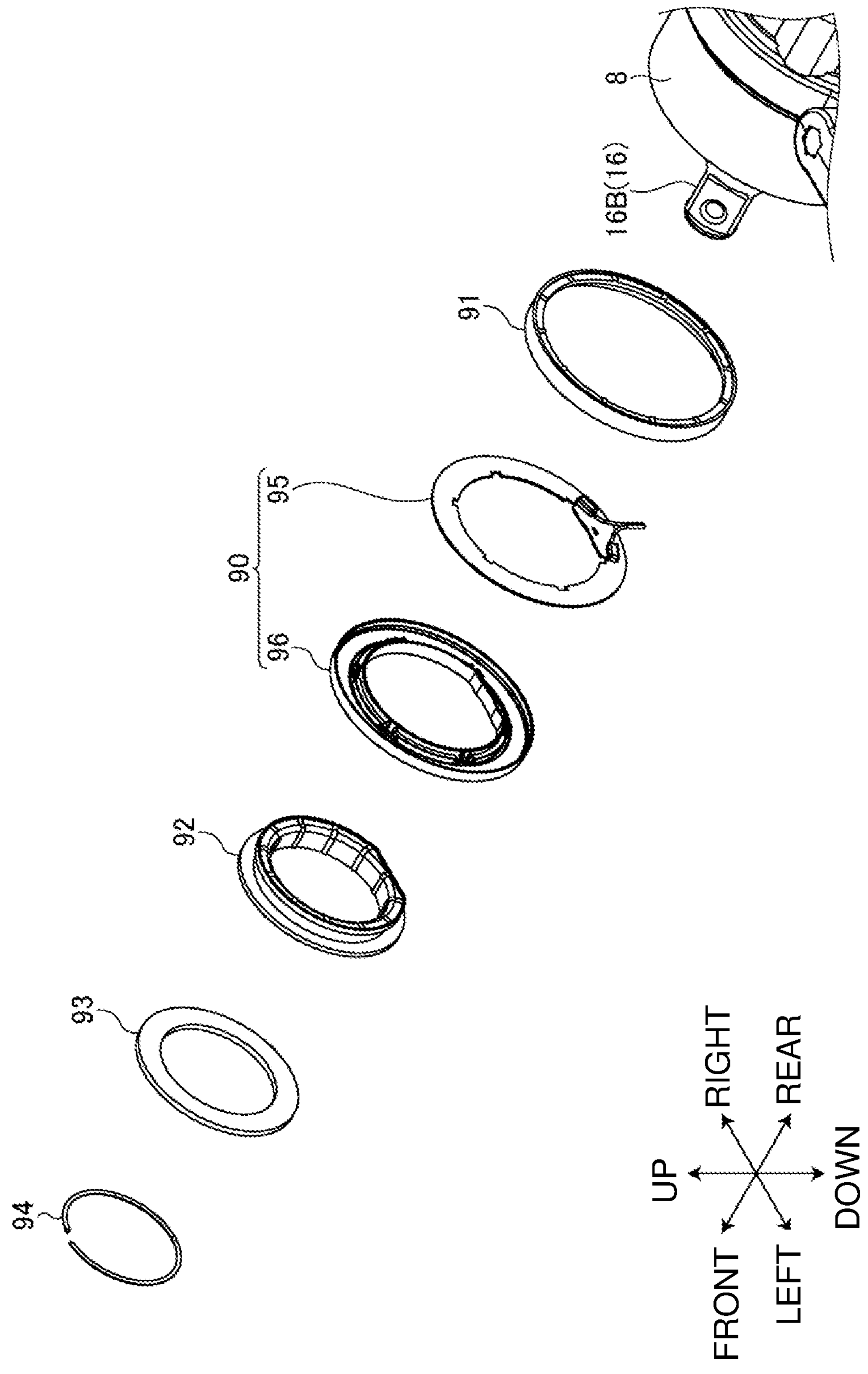
FIG. 14 is an exploded perspective view of the light assembly in the embodiment as viewed from the left rear.
Figure 15:
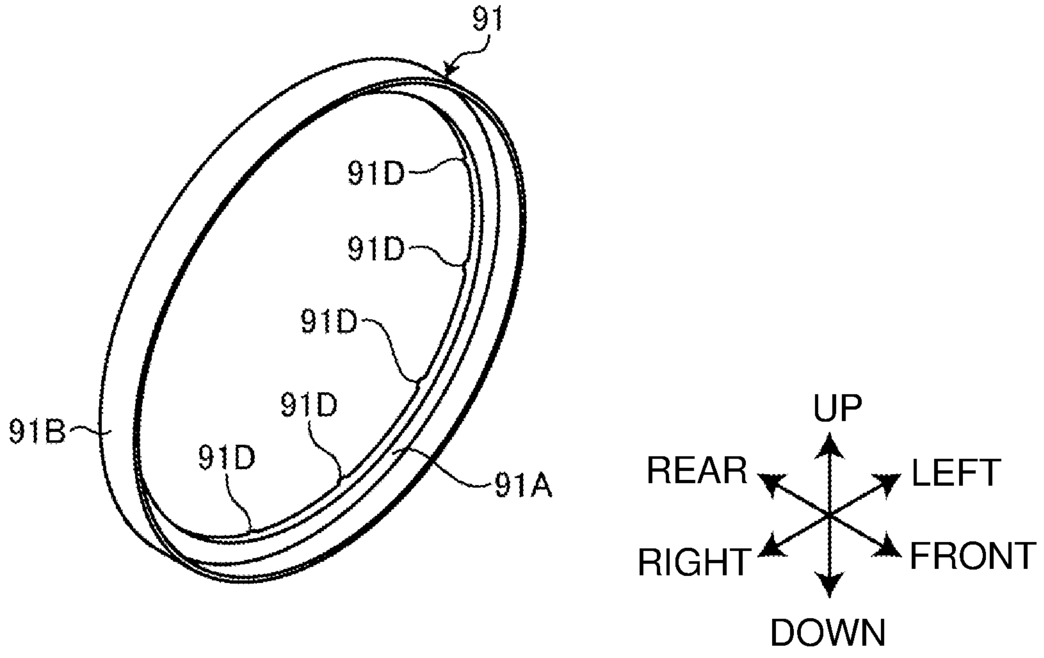
FIG. 15 is a perspective view of an axial elastic member in the embodiment as viewed from the right front.
Figure 16:
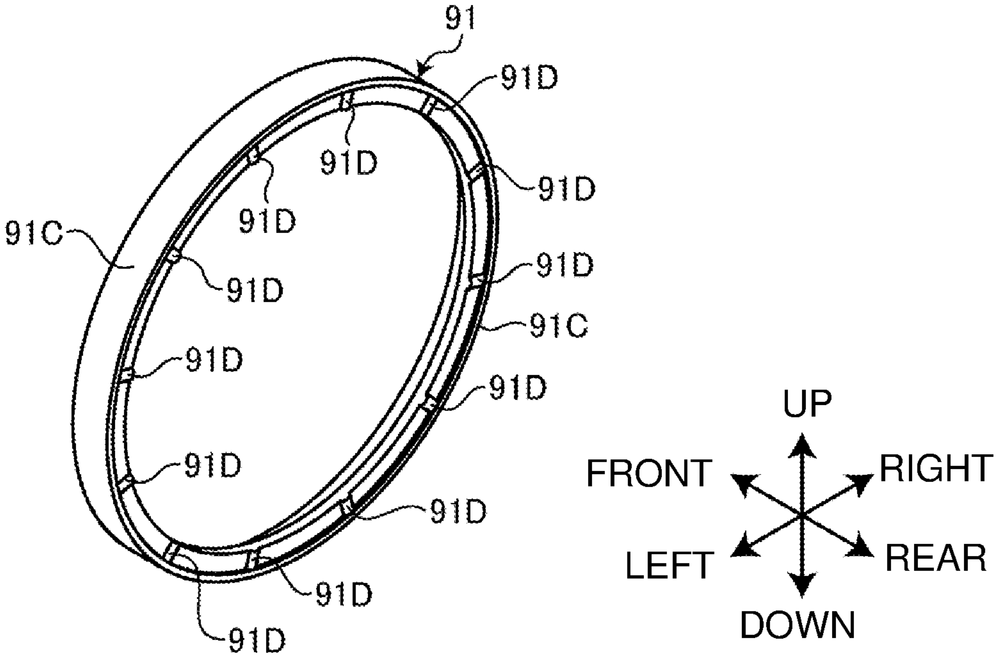
FIG. 16 is a perspective view of the axial elastic member in the embodiment as viewed from the left rear.
Figure 17:
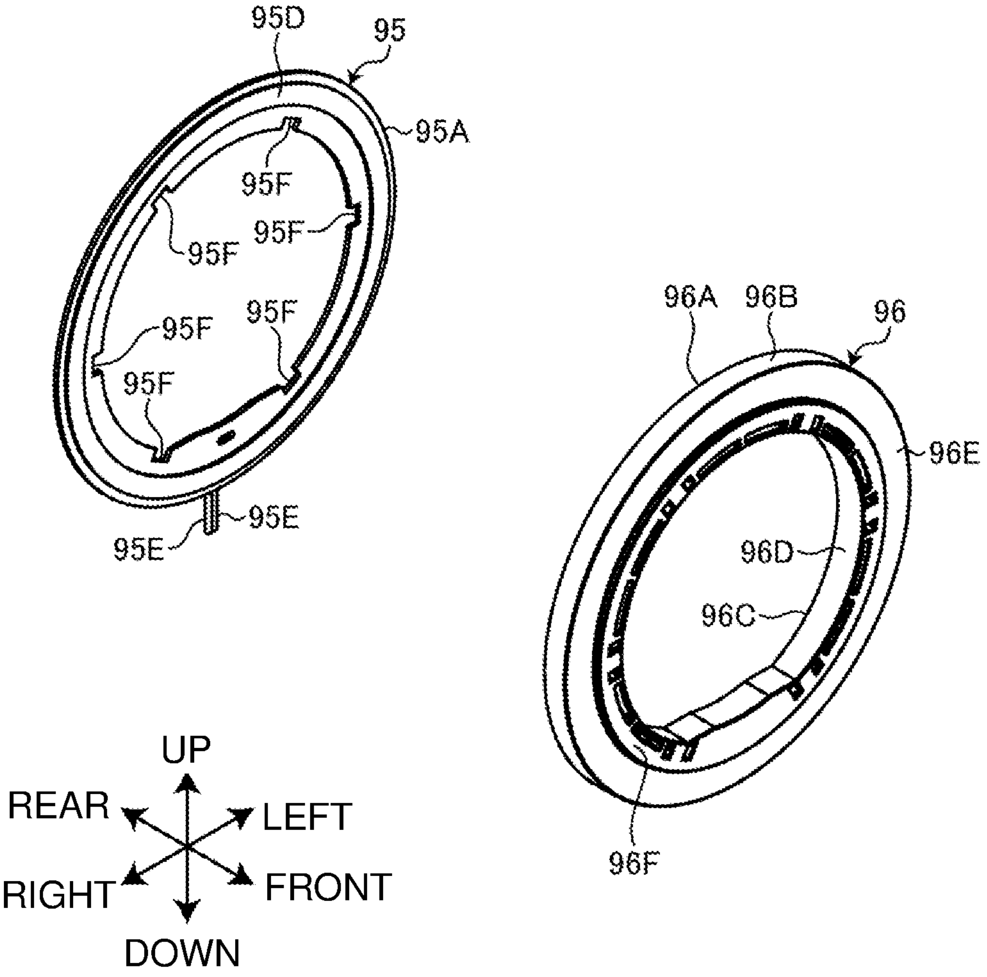
FIG. 17 is a perspective view of a light emitter unit in the embodiment as viewed from the right front.
Figure 18:
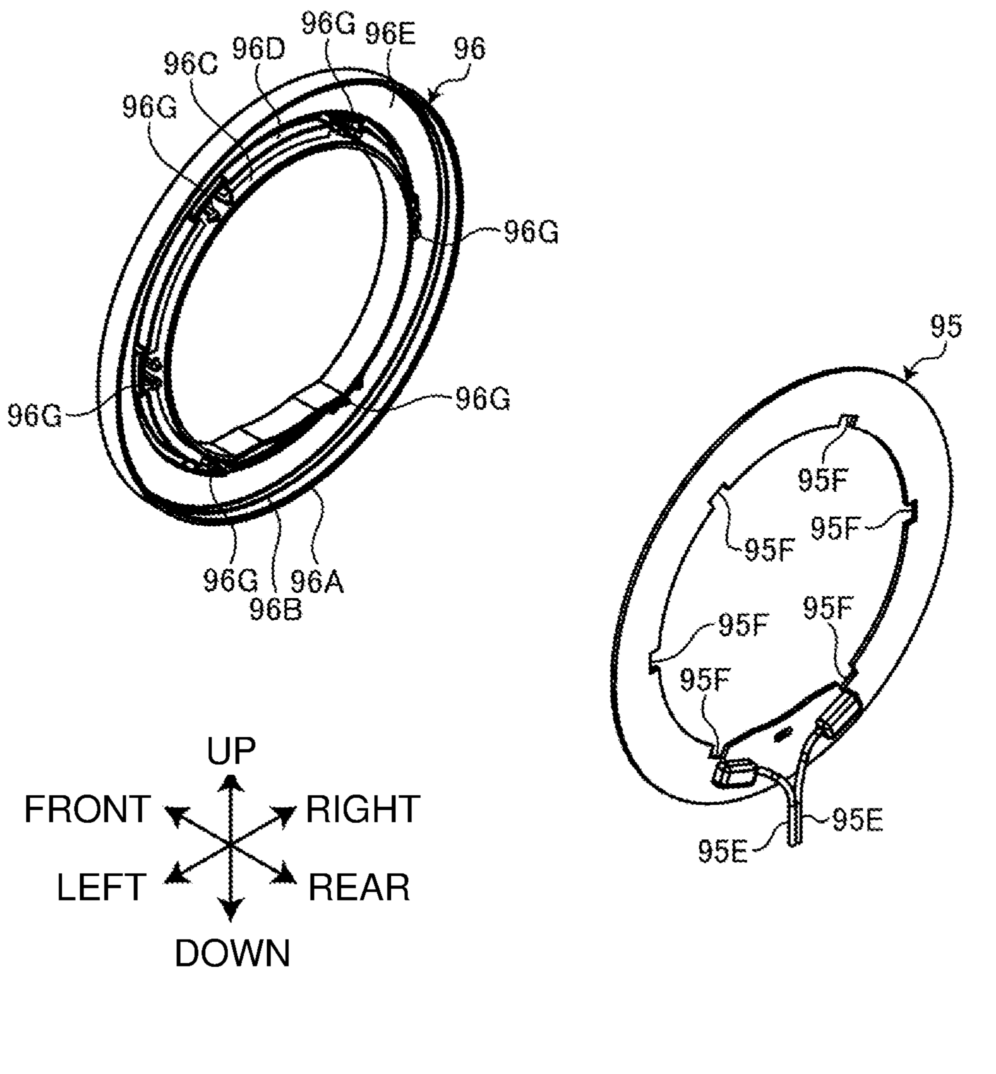
FIG. 18 is a perspective view of the light emitter unit in the embodiment as viewed from the left rear.
Figure 19:
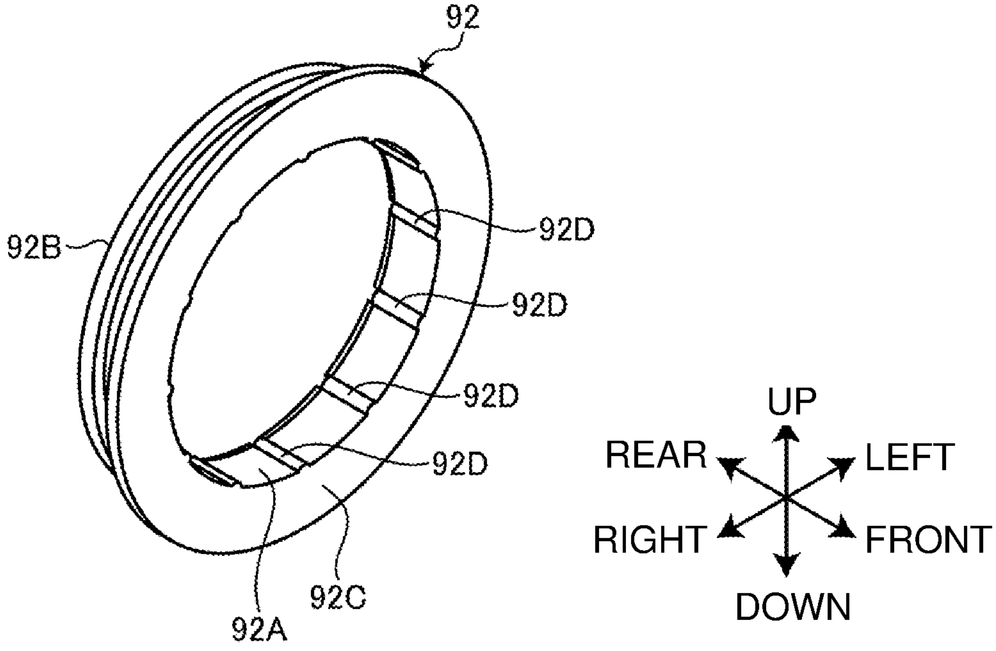
FIG. 19 is a perspective view of a radial elastic member in the embodiment as viewed from the right front.
Figure 20:
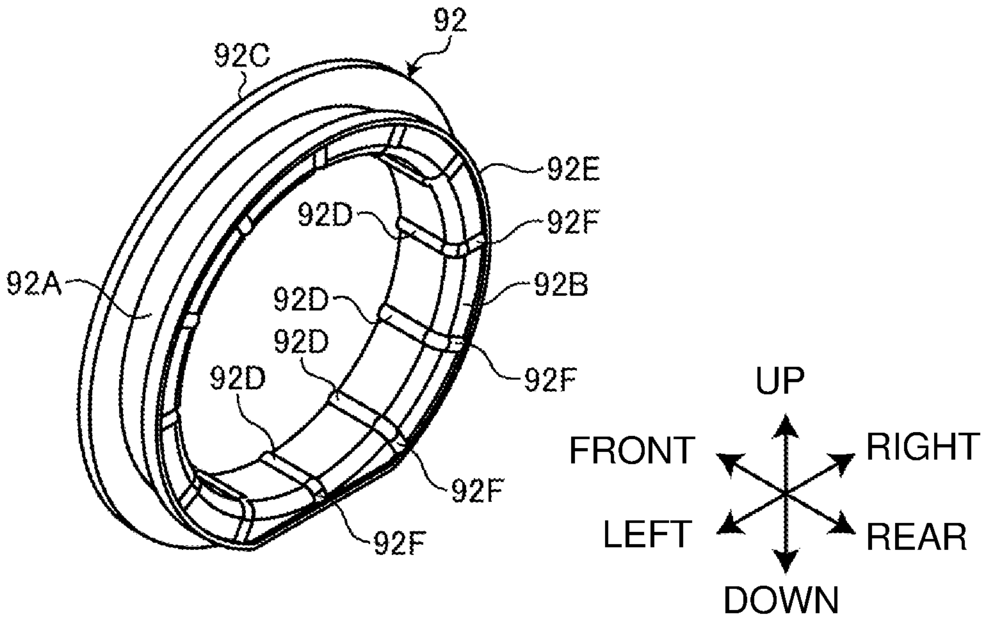
FIG. 20 is a perspective view of the radial elastic member in the embodiment as viewed from the left rear.
Figure 21:
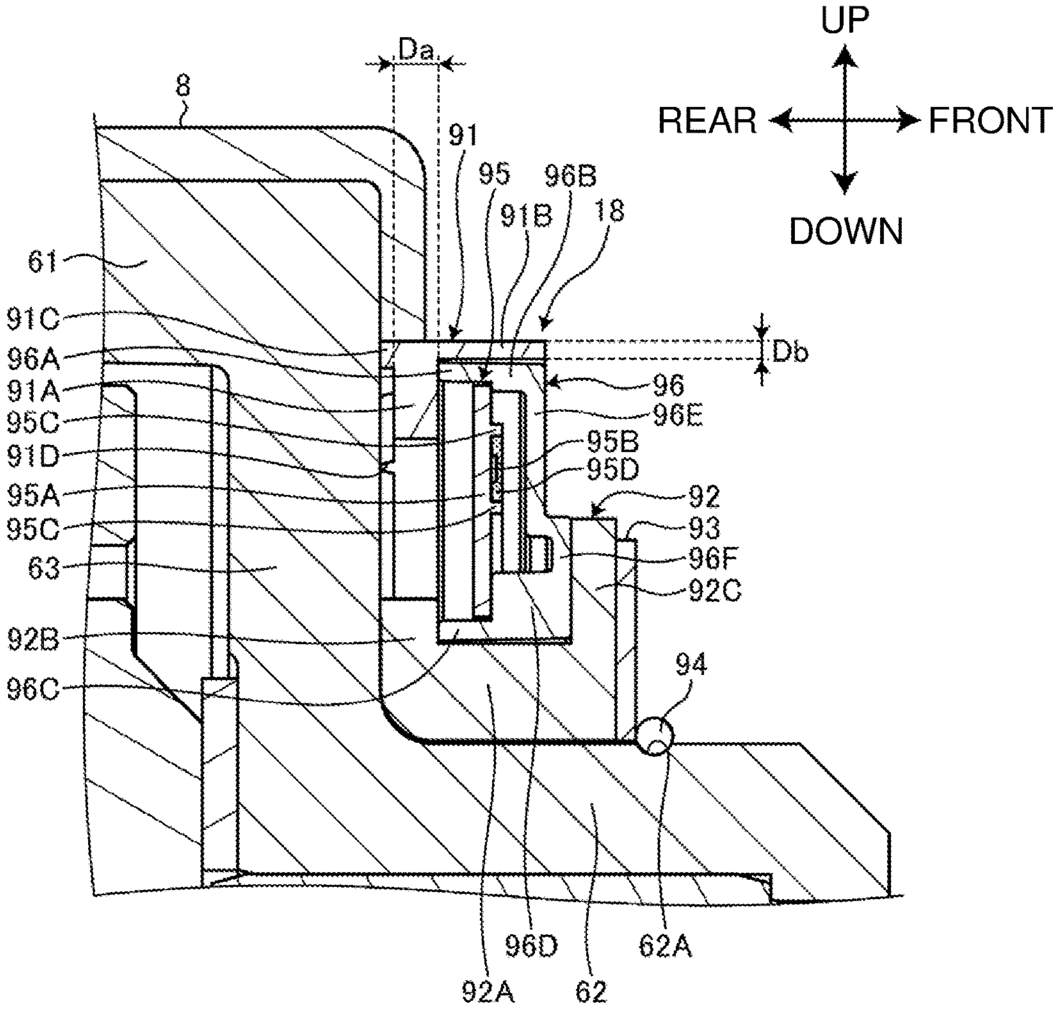
FIG. 21 is a partially enlarged sectional view of the light assembly in the embodiment.

FIG. 13 is an exploded perspective view of the light assembly 18 in the embodiment as viewed from the right front. FIG. 14 is an exploded perspective view of the light assembly 18 as viewed from the left rear. FIG. 15 is a perspective view of an axial elastic member as viewed from the right front. FIG. 16 is a perspective view of the axial elastic member as viewed from the left rear. FIG. 17 is a perspective view of a light emitter unit as viewed from the right front. FIG. 18 is a perspective view of the light emitter unit as viewed from the left rear. FIG. 19 is a perspective view of a radial elastic member as viewed from the right front. FIG. 20 is a perspective view of the radial elastic member as viewed from the left rear. FIG. 21 is a partially enlarged sectional view of the light assembly 18.

The light assembly 18 includes a light emitter unit 90, an axial elastic member 91, a radial elastic member 92, a washer 93, and a ring spring 94.

The light emitter unit 90 includes a chip-on-board light-emitting diode (COB LED) 95 and an optical member 96.

The COB LED 95 includes a substrate 95A, LED chips 95B as light emitters, banks 95C, and a phosphor 95D.

The light emitter unit 90 including the LED chips 95B illuminates the front end of the anvil 16 and an area adjacent to the anvil 16. The light emitter unit 90 at least partially surrounds the second cylinder 62.

The substrate 95A is annular. The substrate 95A is located around the anvil shaft 16B with the second cylinder 62 in between. The substrate 95A surrounds the anvil shaft 16B. The substrate 95A is, for example, an aluminum substrate, a glass fabric base epoxy resin substrate (flame retardant 4 or FR-4 substrate), or a composite base epoxy resin substrate (composite epoxy material 3 or CEM-3 substrate). The substrate 95A in the embodiment has multiple recesses 95F on its inner edge. Each recess 95F is recessed radially outward from the inner edge of the substrate 95A. The multiple (six in the embodiment) recesses 95F are arranged at intervals in the circumferential direction of the substrate 95A.

The LED chips 95B are mounted on the front surface of the substrate 95A. The LED chips 95B at least partially surround the anvil shaft 16B with the second cylinder 62 in between. The LED chips 95B are multiple (36 in the embodiment) LED chips 95B arranged at intervals in the circumferential direction of the substrate 95A. The LED chips 95B may be 60 or 72 LED chips 95B arranged at equal intervals in the circumferential direction of the substrate 95A. The LED chips 95B are connected to the substrate 95A with gold wires (not shown). The gold wires interconnect the multiple LED chips 95B.

The banks 95C are located on the front surface of the substrate 95A. The banks 95C protrude frontward from the front surface of the substrate 95A. The banks 95C define a space for the phosphor 95D. The banks 95C surround the LED chips 95B. One bank 95C is located radially inward from the LED chips 95B, and the other bank 95C is located radially outward from the LED chips 95B. The banks 95C are annular. The banks 95C in the embodiment have a double annular structure. More specifically, the banks 95C in the embodiment include a first annular bank 95C and a second annular bank 95C. The first bank 95C is located on the front surface of the substrate 95A. The second bank 95C is located radially outward from the first bank 95C on the front surface of the substrate 95A. The first bank 95C is located radially inward from the LED chips 95B. The second bank 95C is located radially outward from the LED chips 95B. The LED chips 95B are between the first bank 95C and the second bank 95C.

The phosphor 95D is located on the front surface of the substrate 95A. The phosphor 95D covers the LED chips 95B between the banks 95C. The phosphor 95D is annular. The phosphor 95D covers the LED chips 95B between the first bank 95C and the second bank 95C.

A pair of electrodes are located outside the banks 95C on the rear surface of the substrate 95A. The pair of electrodes include a positive electrode and a negative electrode. A pair of lead wires 95E are connected to the substrate 95A. The lead wires 95E are connected to the electrodes. The pair of lead wires 95E are supported on the rear surface of the substrate 95A. The electrodes may be located on the front surface of the substrate 95A. The lead wires 95E may be supported on the front surface of the substrate 95A.

A current output from the battery pack 43 is supplied to the electrodes through the controller 11 and the lead wires 95E. The voltage of the battery pack 43 is decreased by the controller 11 and applied to the electrodes. The current supplied to the electrodes is supplied to the LED chips 95B through the substrate 95A and the gold wires. The LED chips 95B emit light with the current supplied from the battery pack 43.

The optical member 96 faces the front surfaces of the LED chips 95B. The optical member 96 transmits light emitted from the LED chips 95B. The optical member 96 is connected to the COB LED 95. The optical member 96 is fixed to the substrate 95A. The optical member 96 is formed from a polycarbonate resin. The optical member 96 in the embodiment is formed from a polycarbonate resin containing a white diffusion material. The optical member 96 is milky white. The optical member 96 has a light transmittance of 40 to 70% inclusive. The milky white optical member 96 causes the profile of each LED chip 95B to be less visible from outside the impact tool 1. The impact tool 1 thus has an improved design.

The optical member 96 is at least partially located frontward from the COB LED 95. The optical member 96 includes a first outer cylinder 96A, a second outer cylinder 96B, a first inner cylinder 96C, a second inner cylinder 96D, a light transmitter 96E, a protrusion 96F, and snap-fits 96G.

The first outer cylinder 96A and the second outer cylinder 96B are located radially outward from the first inner cylinder 96C and the second inner cylinder 96D. The first outer cylinder 96A and the second outer cylinder 96B are located adjacent to the outer circumference of the COB LED 95. The first inner cylinder 96C and the second inner cylinder 96D are located adjacent to the inner circumference of the COB LED 95. The COB LED 95 is located between the first outer cylinder 96A as well as the second outer cylinder 96B and the first inner cylinder 96C as well as the second inner cylinder 96D in the radial direction.

The first outer cylinder 96A is located radially outward from the substrate 95A. The second outer cylinder 96B is located frontward from the first outer cylinder 96A. The second outer cylinder 96B has a smaller inner diameter than the first outer cylinder 96A. A step is defined at the boundary between the front end of the first outer cylinder 96A and the rear end of the second outer cylinder 96B. The substrate 95A has the front surface with its outer edge supported on the step defined at the boundary between the front end of the first outer cylinder 96A and the rear end of the second outer cylinder 96B.

The first inner cylinder 96C is located radially inward from the substrate 95A. The second inner cylinder 96D is located frontward from the first inner cylinder 96C. The second inner cylinder 96D has a smaller inner diameter than the first inner cylinder 96C. A step is defined at the boundary between the front end of the first inner cylinder 96C and the rear end of the second inner cylinder 96D. The substrate 95A has the front surface with its inner edge supported on the step defined at the boundary between the front end of the first inner cylinder 96C and the rear end of the second inner cylinder 96D.

The light transmitter 96E is located frontward from the COB LED 95. The light transmitter 96E is annular. The light transmitter 96E is located frontward from the LED chips 95B. The light transmitter 96E connects the front end of the second outer cylinder 96B and the front end of the second inner cylinder 96D. The light transmitter 96E faces the front surface of the substrate 95A. The light transmitter 96E faces the LED chips 95B. The light transmitter 96E allows light emitted from the LED chips 95B to pass through and illuminate an area ahead of the light emitter unit 90.

The light transmitter 96E has an incident surface and an emission surface. Light from the LED chips 95B enters the incident surface. The light through the light transmitter 96E is emitted through the emission surface. The front surface of the substrate 95A faces the incident surface of the light transmitter 96E. The incident surface faces the LED chips 95B. The incident surface faces substantially rearward. The emission surface faces substantially frontward.

The protrusion 96F is located inward from the light transmitter 96E. The protrusion 96F protrudes frontward from the second inner cylinder 96D. The protrusion 96F is located frontward from the emission surface of the light transmitter 96E. The protrusion 96F is annular.

The substrate 95A has the rear surface located frontward from the rear ends of the first outer cylinder 96A and the first inner cylinder 96C. The optical member 96 and the substrate 95A in the COB LED 95 are fastened together with fasteners. The fasteners include the snap-fits 96G in the optical member 96. Each snap-fit 96G is located circumferentially inward from the incident surface of the light transmitter 96E and protrudes rearward. The snap-fits 96G are multiple (six in the present embodiment) snap-fits 96G arranged at intervals in the circumferential direction of the optical member 96. The snap-fits 96G are received in the respective six recesses 95F. The optical member 96 and the substrate 95A in the COB LED 95 are thus fastened together.

The axial elastic member 91 and the radial elastic member 92 are formed from rubber. The axial elastic member 91 and the radial elastic member 92 reduce transmission of vibrations from the hammer case 6 to the light emitter unit 90. The axial elastic member 91 and the radial elastic member 92 each function as a vibration isolator to reduce vibrations received by the light emitter unit 90.

The radial elastic member 92 is annular. The radial elastic member 92 surrounds the anvil shaft 16B. The radial elastic member 92 surrounds the second cylinder 62.

The radial elastic member 92 is supported by the hammer case 6. The radial elastic member 92 supports the light emitter unit 90 from radially inside. The radial elastic member 92 includes a radial base 92A. The radial base 92A is located between the second cylinder 62 and the light emitter unit 90 in the radial direction. The radial base 92A is cylindrical. The radial base 92A surrounds the second cylinder 62.

The radial base 92A includes an inner circumferential surface facing the outer circumferential surface of the second cylinder 62, and radial ribs 92D. Each radial rib 92D protrudes radially inward from the inner circumferential surface of the radial base 92A. The radial ribs 92D are multiple radial ribs 92D arranged circumferentially at intervals. The radial ribs 92D are in contact with the outer circumferential surface of the second cylinder 62. The inner circumferential surface of the radial base 92A is apart from the outer circumferential surface of the second cylinder 62. The outer circumferential surface of the radial base 92A is in contact with the inner circumferential surface of the light emitter unit 90. In the embodiment, the inner circumferential surface of the light emitter unit 90 is the inner circumferential surface of the optical member 96.

The radial elastic member 92 includes a rear support 92B and a front support 92C. The rear support 92B supports the light emitter unit 90 from the rear. The front support 92C supports the light emitter unit 90 from the front. The rear support 92B is connected to the rear end of the radial base 92A. The rear support 92B protrudes radially outward from the rear end of the radial base 92A. The front support 92C is connected to the front end of the radial base 92A. The front support 92C protrudes radially outward from the front end of the radial base 92A. The rear support 92B and the front support 92C are annular. The radial base 92A, the rear support 92B, and the front support 92C are integral with one another.

The rear support 92B includes a rear surface facing the front surface of the front wall 63, an annular protrusion 92E, and first axial ribs 92F. The annular protrusion 92E protrudes rearward from the rear surface of the rear support 92B. Each first axial rib 92F protrudes rearward from the rear surface of the rear support 92B. The annular protrusion 92E is located on the outer edge of the rear surface of the rear support 92B. The first axial ribs 92F are located radially inward from the annular protrusion 92E. The first axial ribs 92F are multiple first axial ribs 92F arranged circumferentially at intervals. The annular protrusion 92E and the first axial ribs 92F are in contact with the front surface of the front wall 63. The rear surface of the rear support 92B is apart from the front surface of the front wall 63. The front surface of the rear support 92B is in contact with the rear surface of the light emitter unit 90. In the embodiment, the front surface of the rear support 92B is in contact with the rear surface of the first inner cylinder 96C in the optical member 96.

The rear surface of the front support 92C is in contact with the front surface of the light emitter unit 90. In the embodiment, the rear surface of the front support 92C is in contact with the front surface of the protrusion 96F.

The washer 93 supports the front support 92C from the front. The washer 93 has a rear surface in contact with the front surface of the front support 92C. The ring spring 94 supports the washer 93 from the front. The ring spring 94 is received in a groove 62A on the outer circumferential surface of the second cylinder 62. The ring spring 94 is thus fixed to the second cylinder 62 in the hammer case 6. The ring spring 94 presses the washer 93 against the front support 92C. The washer 93 and the ring spring 94 are fixed to at least a part of the hammer case 6 and function as fasteners for supporting the front support 92C from the front.

The front support 92C is pushed backward by the ring spring 94 with the washer 93 in between. The light emitter unit 90 and the rear support 92B are thus also pushed backward. The light emitter unit 90 and the radial elastic member 92 are held between the front wall 63 and the washer 93 in the front-rear direction. This fixes the light emitter unit 90 and the radial elastic member 92 to the hammer case 6.

The axial elastic member 91 supports the light emitter unit 90 from the rear. The axial elastic member 91 is located radially outward from the radial elastic member 92. The axial elastic member 91 includes an axial base 91A. The axial base 91A is located between the front wall 63 and the light emitter unit 90 in the axial direction. The axial base 91A is annular.

The axial base 91A includes a rear surface facing the front surface of the front wall 63, an annular protrusion 91C, and second axial ribs 91D. The annular protrusion 91C protrudes rearward from the rear surface of the axial base 91A. Each second axial rib 91D protrudes rearward from the rear surface of the axial base 91A. The annular protrusion 91C is located on the outer edge of the rear surface of the axial base 91A. The second axial ribs 91D are located radially inward from the annular protrusion 91C. The second axial ribs 91D are multiple second axial ribs 91D arranged circumferentially at intervals. The annular protrusion 91C and the second axial ribs 91D are in contact with the front surface of the front wall 63. The rear surface of the axial base 91A is apart from the front surface of the front wall 63. The front surface of the axial base 91A is in contact with the rear surface of the light emitter unit 90. In the embodiment, the front surface of the axial base 91A is in contact with the rear surface of the first outer cylinder 96A in the optical member 96.

The axial base 91A is held between the front surface of the front wall 63 and the rear surface of the first outer cylinder 96A in the optical member 96 in the front-rear direction. The axial base 91A supports the light emitter unit 90 from the rear. The axial elastic member 91 is supported by the hammer case 6.

The axial elastic member 91 includes a cover 91B. The cover 91B covers the light emitter unit 90 from radially outside. The cover 91B is cylindrical. The cover 91B is in contact with the outer circumferential surface of the light emitter unit 90. The outer circumferential surface of the light emitter unit 90 includes the outer circumferential surface of the optical member 96. The cover 91B covers the outer circumferential surface of the optical member 96. The cover 91B presses, with its elastic force, the light emitter unit 90 from radially outside. The axial elastic member 91 is thus fixed to the light emitter unit 90 with an elastic force from the cover 91B.

As shown in FIG. 21, the cover 91B has a radial dimension Db smaller than an axial dimension Da of the axial base 91A.

As described above, the axial elastic member 91 supported by the hammer case 6 support the light emitter unit 90 from radially inside and radially outside. The radial elastic member 92 supported by the hammer case 6 support the light emitter unit 90 from the rear and the front. The axial elastic member 91 and the radial elastic member 92 surround the light emitter unit 90. The light emitter unit 90 and the hammer case 6 are not in contact with each other with the axial elastic member 91 and the radial elastic member 92 in between.

As shown in FIG. 9, the axial elastic member 91, the radial elastic member 92, and the light emitter unit 90 are located radially inward from a line VL connecting the front end of the first cylinder 61 and the front end of the anvil 16 in a cross section including the output rotation axis AX of the anvil 16 and parallel to the output rotation axis AX.

Shock Absorber

Figure 22:
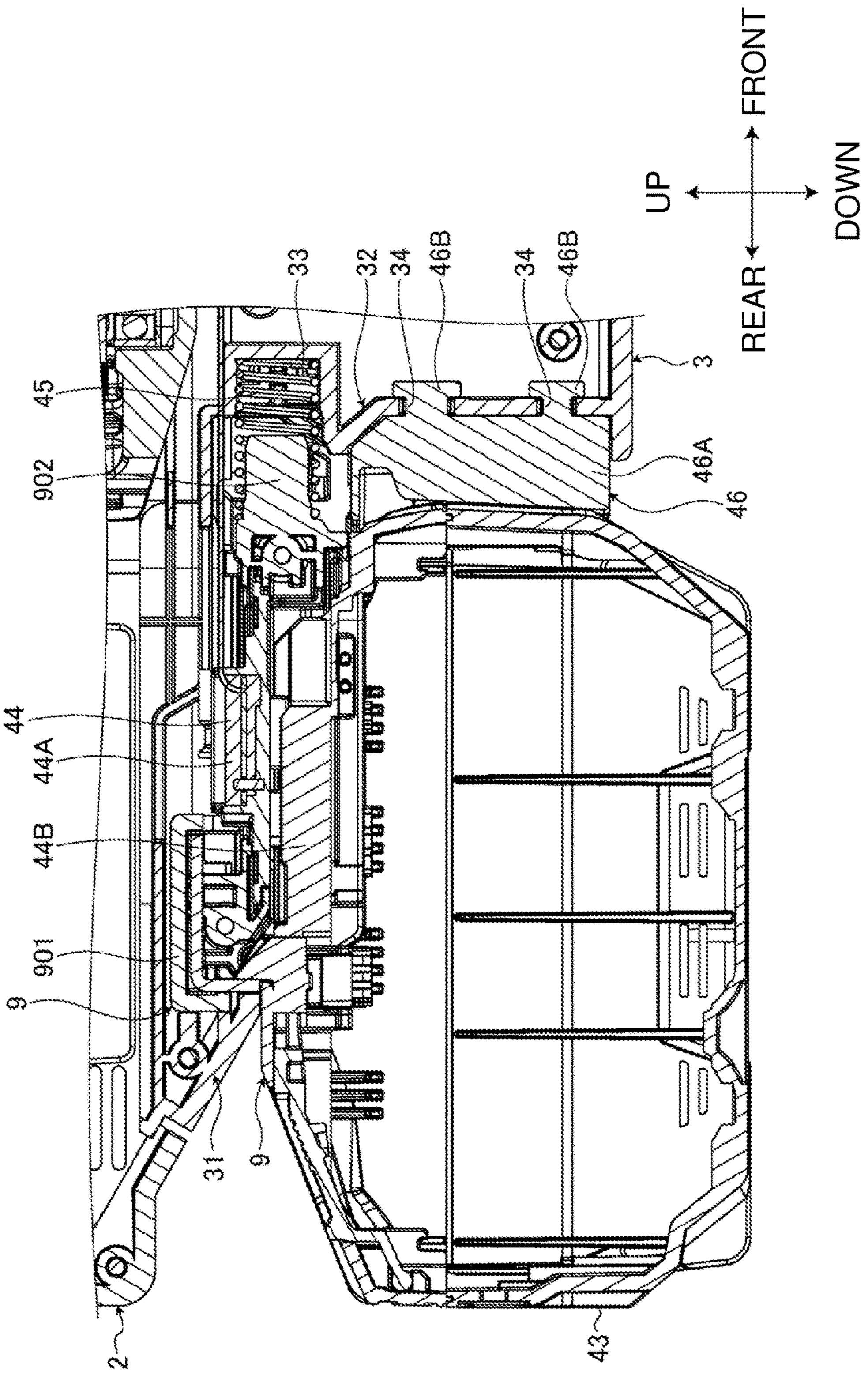
FIG. 22 is a partial sectional view of the impact tool according to the embodiment.
Figure 23:
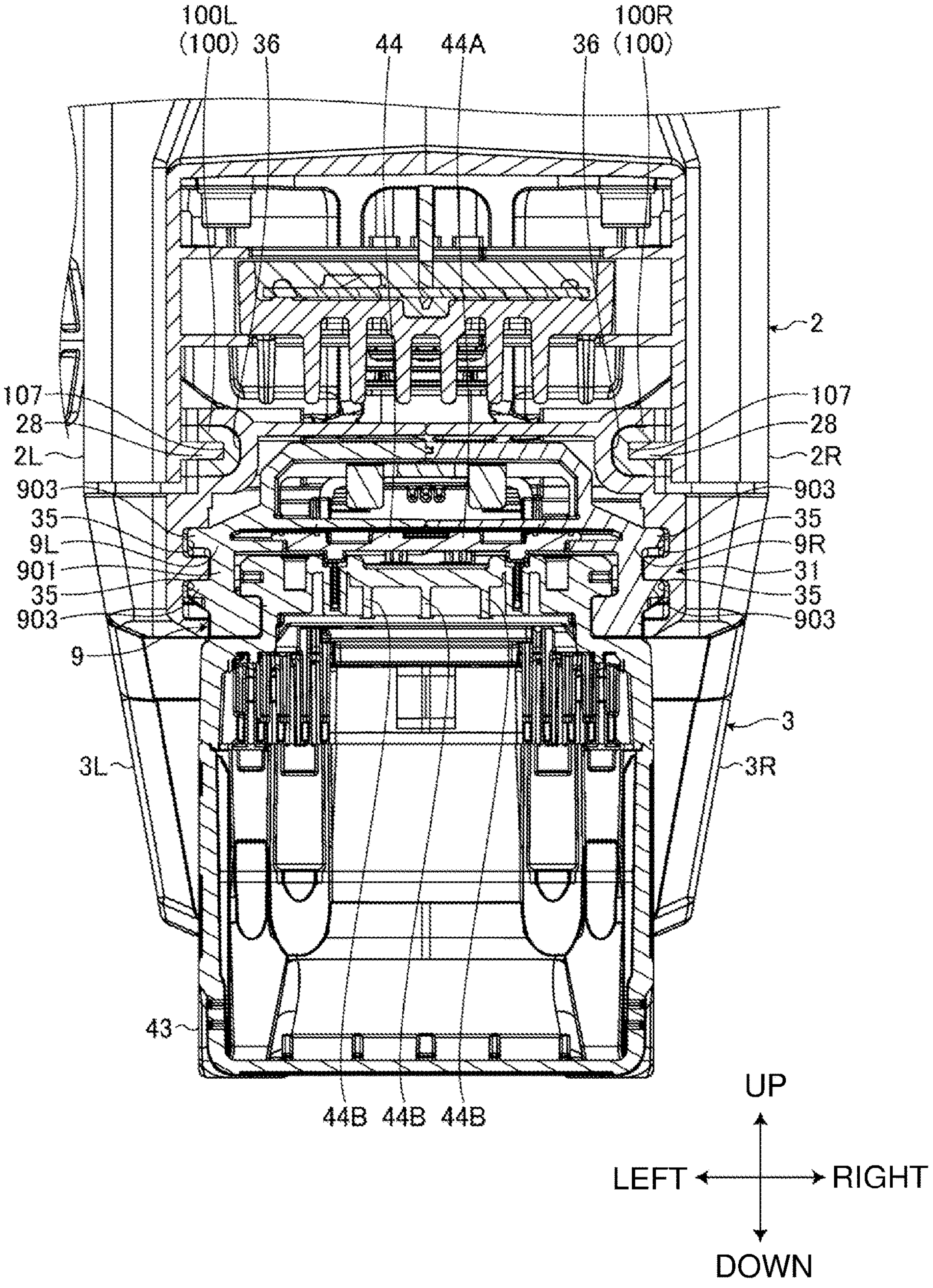
FIG. 23 is a partial sectional view of the impact tool according to the embodiment.
Figure 24:
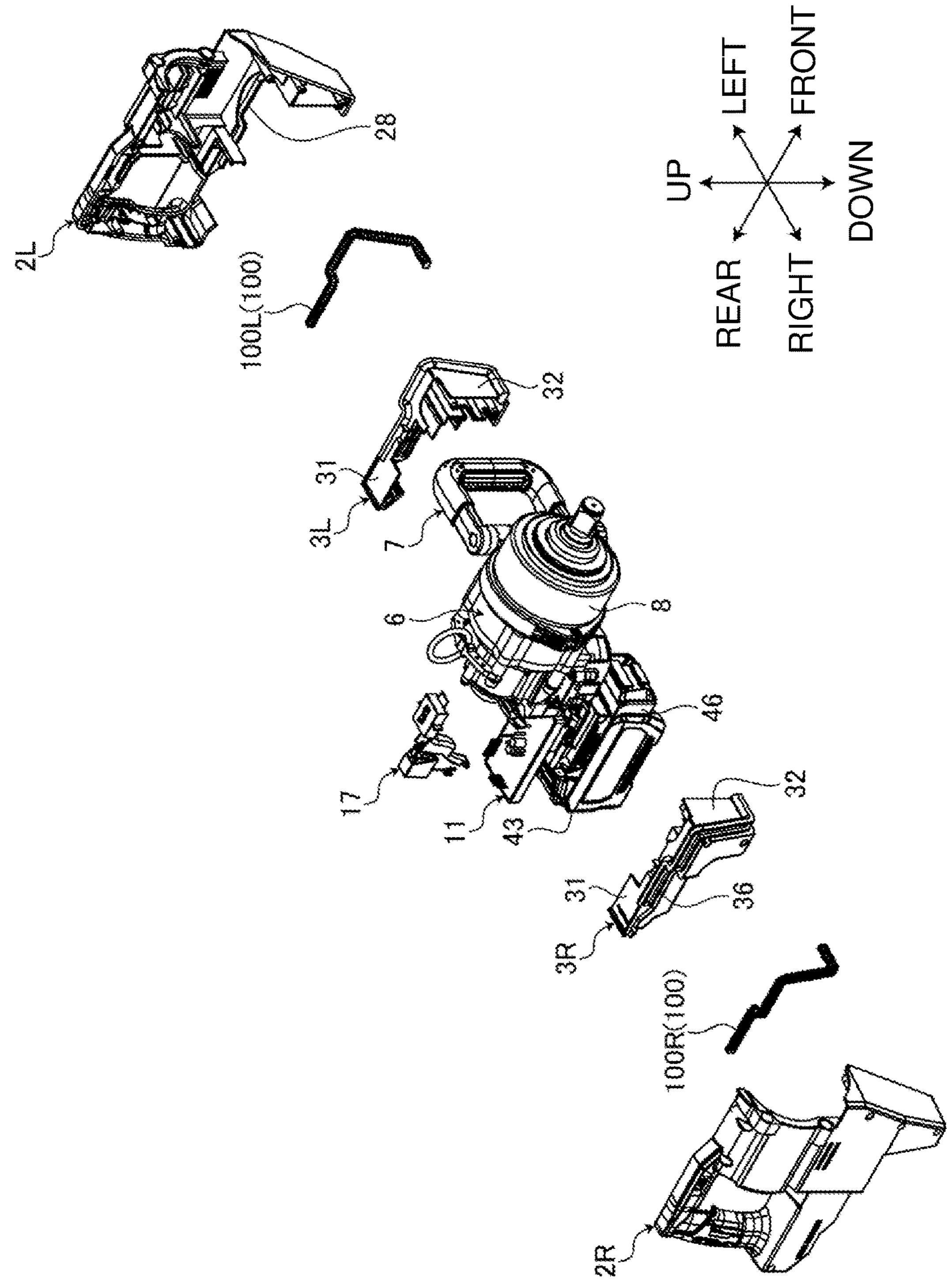
FIG. 24 is an exploded perspective view of the impact tool according to the embodiment as viewed from the right front.
Figure 25:
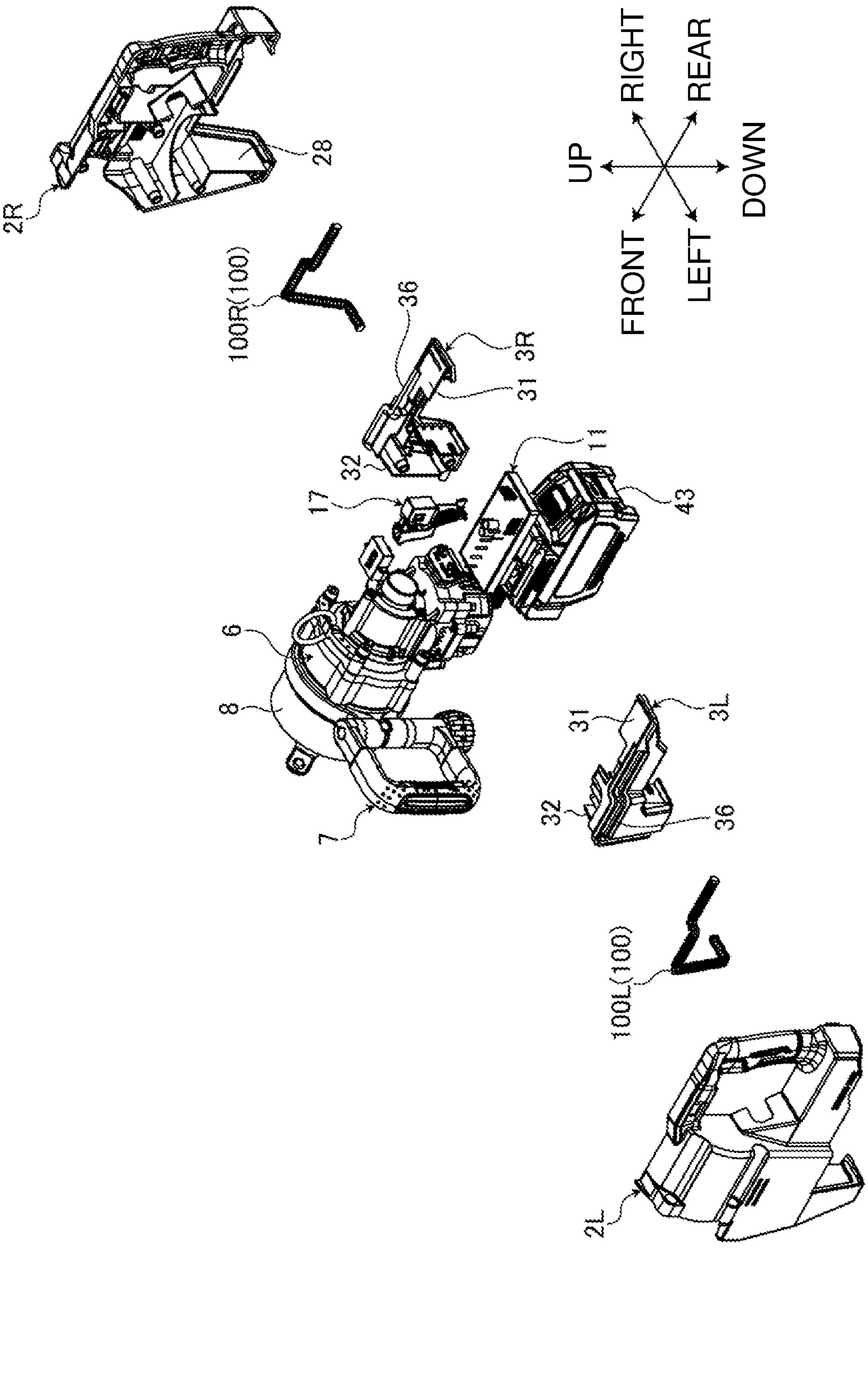
FIG. 25 is an exploded perspective view of the impact tool according to the embodiment as viewed from the left rear.
Figure 26:
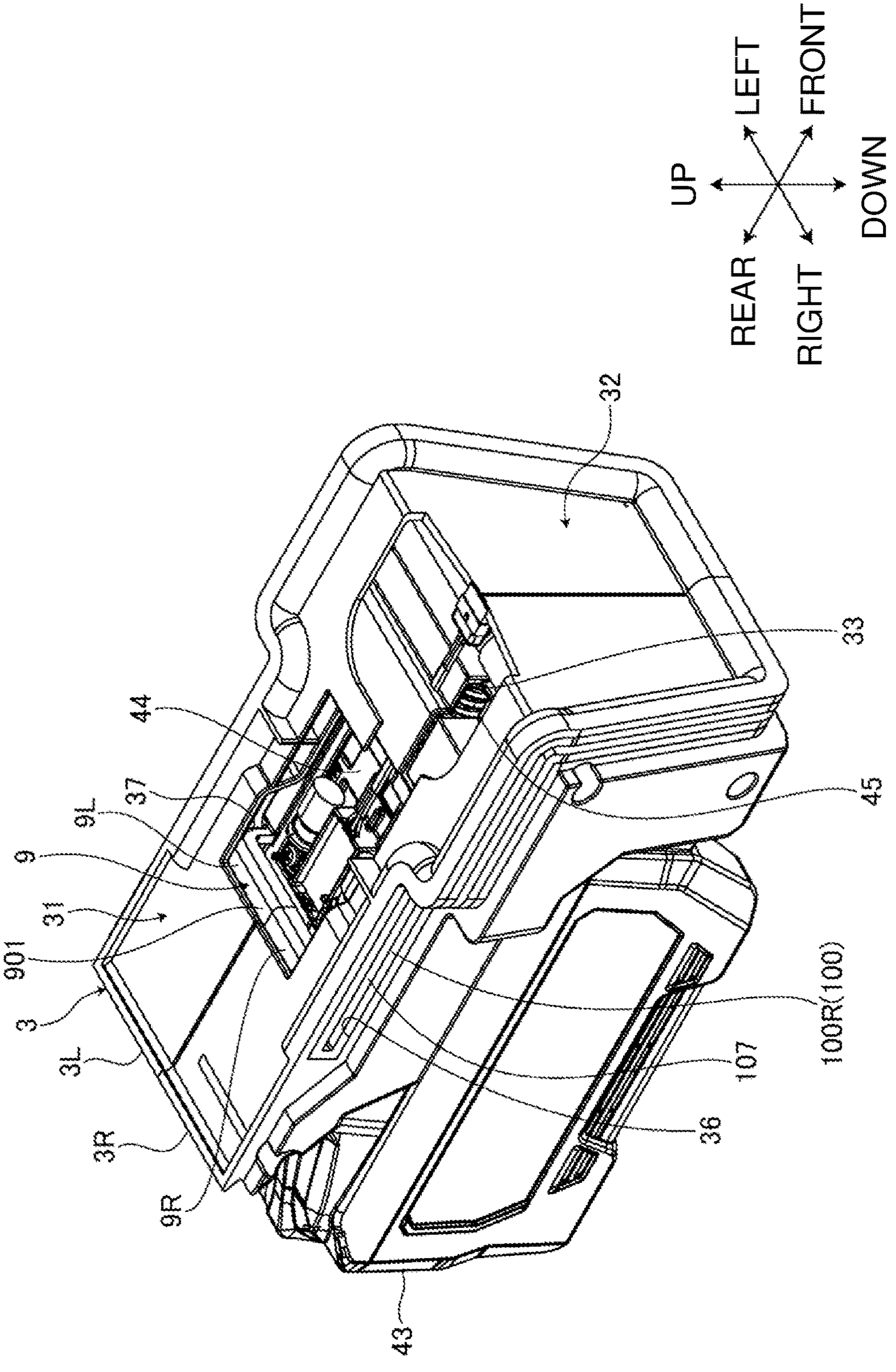
FIG. 26 is a perspective view of a battery housing in the embodiment as viewed from the right front.
Figure 27:
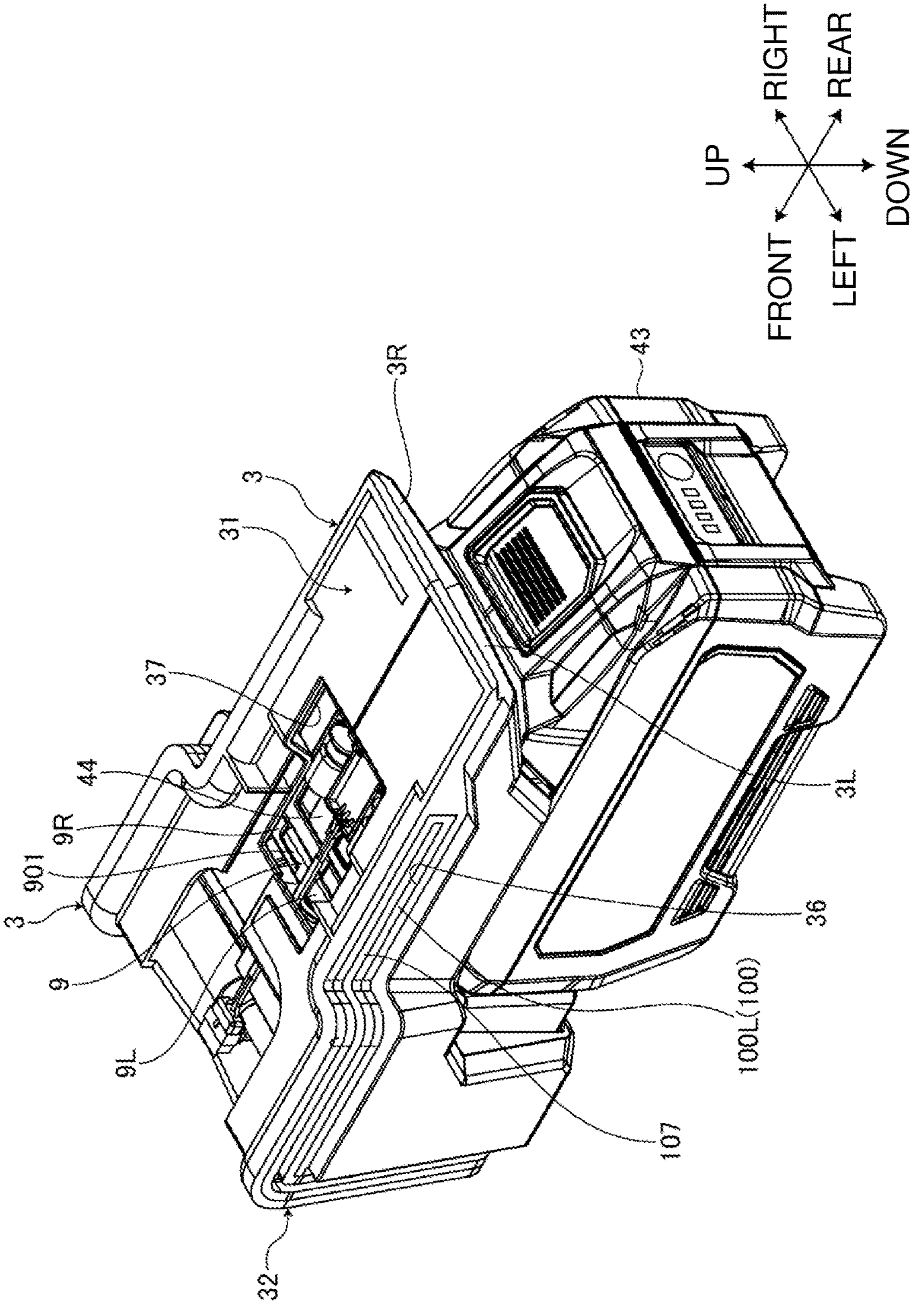
FIG. 27 is a perspective view of the battery housing in the embodiment as viewed from the left rear.
Figure 28:
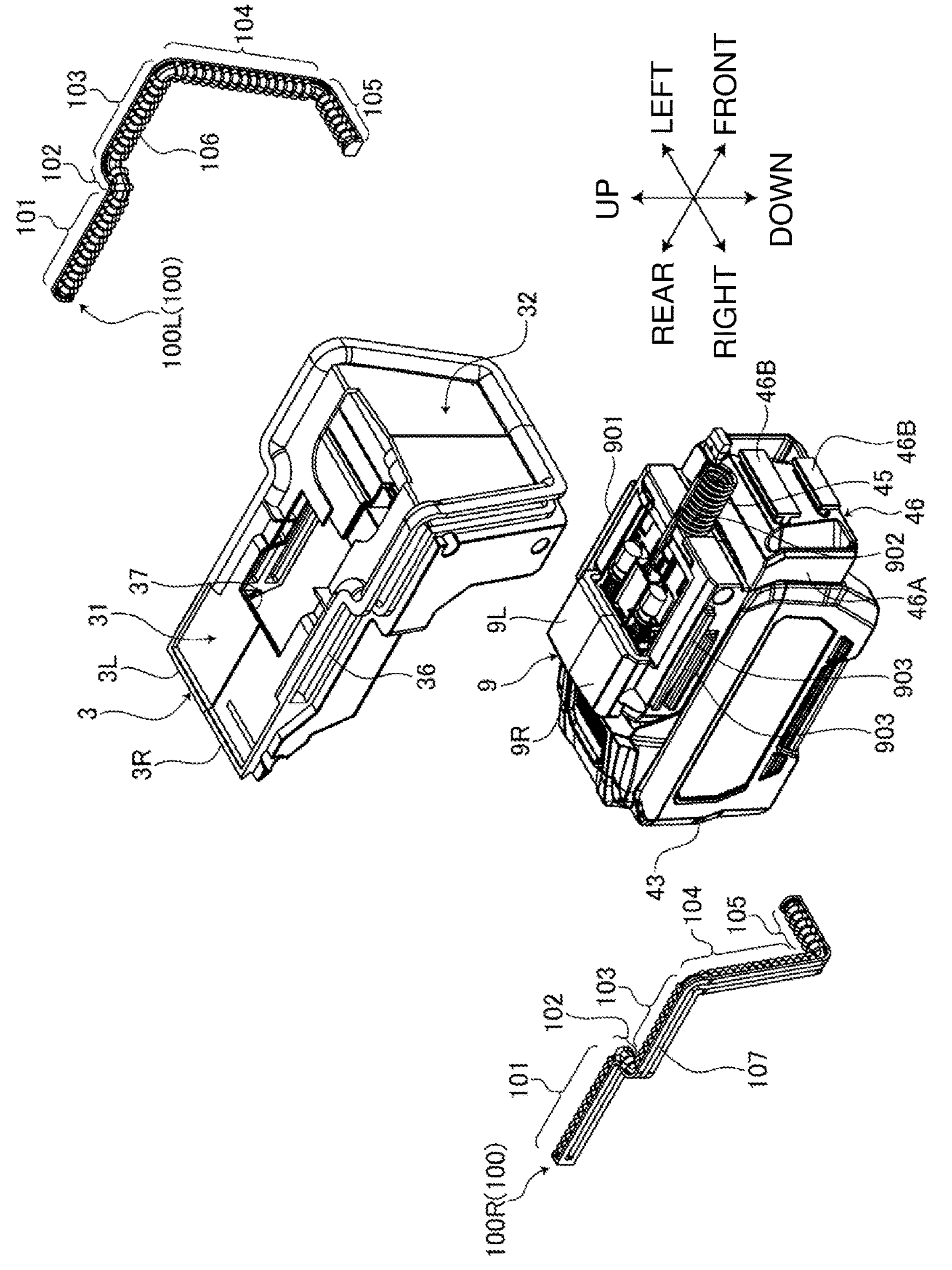
FIG. 28 is an exploded perspective view of the battery housing in the embodiment as viewed from the right front.
Figure 29:
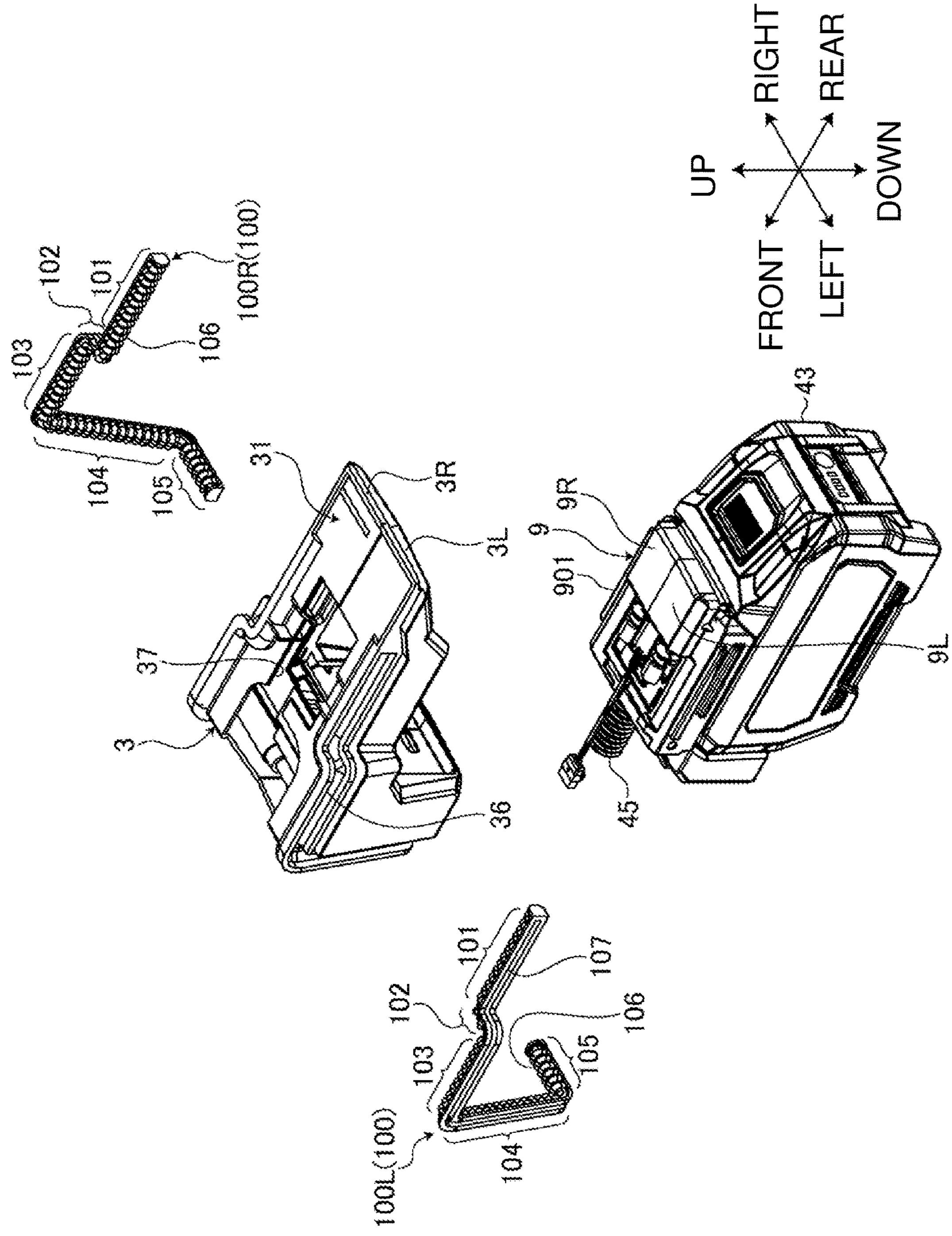
FIG. 29 is an exploded perspective view of the battery housing in the embodiment as viewed from the left rear.
Figure 30:
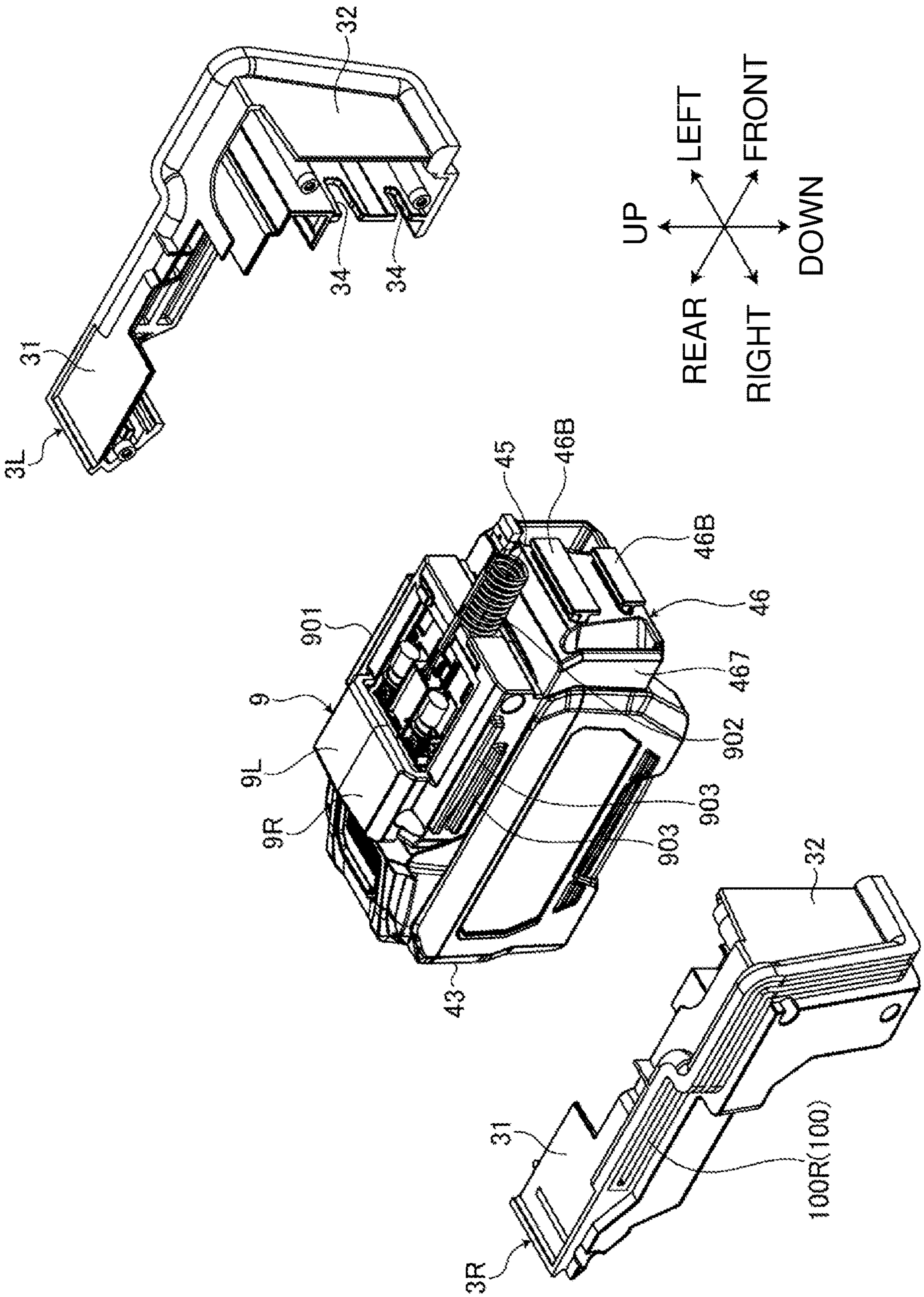
FIG. 30 is an exploded perspective view of the battery housing in the embodiment as viewed from the right front.

FIG. 22 is a partial sectional view of the impact tool 1 according to the embodiment, corresponding to a partially enlarged view of FIG. 9. FIG. 23 is a partial sectional view of the impact tool 1, taken along line C-C in FIG. 3 as viewed in the direction indicated by the arrows. FIG. 24 is an exploded perspective view of the impact tool 1 as viewed from the right front. FIG. 25 is an exploded perspective view of the impact tool 1 as viewed from the left rear. FIG. 26 is a perspective view of the battery housing 3 as viewed from the right front. FIG. 27 is a perspective view of the battery housing 3 as viewed from the left rear. FIG. 28 is an exploded perspective view of the battery housing 3 as viewed from the right front. FIG. 29 is an exploded perspective view of the battery housing 3 as viewed from the left rear. FIG. 30 is an exploded perspective view of the battery housing 3 as viewed from the right front.

The impact tool 1 includes the main housing 2, rubber vibration isolators 100 (first elastic members), the battery housing 3, the battery holder 9, the spring 45, and the rubber buffer 46. The main housing 2 accommodates the motor 10. The rubber vibration isolators 100 are supported by the main housing 2. The battery housing 3 is supported by the rubber vibration isolators 100. The battery pack 43 is attached to the battery holder 9. The spring 45 and the rubber buffer 46 are supported by the battery housing 3.

The battery housing 3 includes a holder support 31 and an elastic member support 32. The holder support 31 supports the battery holder 9. The elastic member support 32 is located in front of the battery pack 43 attached to the battery holder 9.

The battery housing 3 includes the left battery housing 3L and the right battery housing 3R. The holder support 31 is separately located in the left battery housing 3L and the right battery housing 3R. The battery holder 9 is held between the holder support 31 in the left battery housing 3L and the holder support 31 in the right battery housing 3R.

The battery holder 9 holds the terminal unit 44. The terminal unit 44 includes a terminal plate 44A and terminals 44B. The terminals 44B are fixed to the terminal plate 44A. The terminals 44B protrude downward from the lower surface of the terminal plate 44A. The terminals 44B in the terminal unit 44 are connected to the battery terminals in the battery pack 43. The battery holder 9 holds the terminal plate 44A. The holder support 31 has an opening 37 at the top. The terminal unit 44 is at least partially received in the opening 37. For the terminal unit 44 connected to the controller 11 with lead wires, the lead wires extend through the opening 37.

The battery holder 9 is movably supported by the battery housing 3. The battery holder 9 in the embodiment is supported by the battery housing 3 in a manner movable in the front-rear direction.

The battery holder 9 includes a terminal holder 901, a protrusion 902, and slides 903.

The terminal holder 901 holds the terminal plate 44A. The battery holder 9 in the embodiment includes a left battery holder 9L and a right battery holder 9R. The right battery holder 9R is located on the right of the left battery holder 9L. The left battery holder 9L and the right battery holder 9R form a pair of holder halves. The terminal unit 44 is held between the left battery holder 9L and the right battery holder 9R.

The protrusion 902 protrudes frontward from the front end of the terminal holder 901. The spring 45 is a coil spring. The protrusion 902 is placed inside the spring 45.

The battery housing 3 includes guides 35. The guides 35 guide the slides 903 included in the battery holder 9. The slides 903 are guided along the guides 35 in the front-rear direction. The guides 35 in the embodiment each have a guide groove on the inner surface of the battery housing 3. The slides 903 are movable in the front-rear direction along the guide grooves.

The slides 903 are located on a right portion and a left portion of the terminal holder 901. The guides 35 are located on the holder support 31 and adjacent to the left portion and the right portion of the terminal holder 901. The battery housing 3 includes the left battery housing 3L and the right battery housing 3R. The guides 35 are located in the left battery housing 3L and the right battery housing 3R.

The spring 45 and the rubber buffer 46 are supported by the elastic member support 32 in the battery housing 3. The elastic member support 32 includes a spring holder 33 and rubber holders 34. The spring holder 33 holds the spring 45. The rubber holders 34 hold the rubber buffer 46.

The spring holder 33 has a recess on the elastic member support 32. The recess is recessed frontward from the rear surface of the elastic member support 32. The spring 45 has a front portion received in the recess and is thus held by the spring holder 33. The protrusion 902 on the battery holder 9 is placed inside the spring 45 through the rear end of the spring 45. The rear end of the spring 45 is supported on the front surface of the terminal holder 901.

The rubber buffer 46 includes a body 46A and protrusions 46B. Each protrusion 46B protrudes frontward from the front surface of the body 46A. The protrusions 46B are two protrusions 46B arranged at an interval in the vertical direction. Each rubber holder 34 has an opening in the elastic member support 32. The protrusions 46B are received in the openings. The rubber buffer 46 is thus held by the rubber holders 34. Each rubber holder 34 (opening) has a portion located in the left battery housing 3L. Each rubber holder 34 (opening) has the other portion located in the right battery housing 3R. With the protrusions 46B placed between the portions of the rubber holders 34 (openings) in the left battery housing 3L and the other portions of the rubber holders 34 (openings) in the right battery housing 3R, the left battery housing 3L and the right battery housing 3R are fastened together with the screws 3S. The protrusions 46B are thus held by the rubber holders 34.

The spring 45 and the rubber buffer 46 each function as a second elastic member that restricts relative movement of the battery housing 3 and the battery pack 43 attached to the battery holder 9. The spring 45 is a compression spring. The spring 45 urges the battery holder 9 away from the rubber buffer 46.

The battery pack 43 is slid forward along the battery holder 9 from the rear of the battery holder 9 to be attached to the battery holder 9. The rubber buffer 46 is located in front of the battery pack 43. The spring 45 urges the battery holder 9 backward. The battery holder 9 urged backward is at least partially in contact with a rear portion of the holder support 31, thus positioning the battery holder 9 in the front-rear direction.

When receiving no external force in a direction toward the rubber buffer 46, the battery holder 9 is at its initial position under an urging force from the spring 45. The initial position of the battery holder 9 is a position at which the battery holder 9 urged backward is at least partially in contact with the rear portion of the holder support 31. When the battery holder 9 is at the initial position, the rubber buffer 46 and the battery pack 43 are out of contact with each other. When the battery holder 9 receives an external force in the direction toward the rubber buffer 46, the rubber buffer 46 and the battery pack 43 come in contact with each other. More specifically, when the battery holder 9 receives no external force in the direction toward the rubber buffer 46, the spring 45 restricts relative movement of the battery housing 3 and the battery pack 43. When the battery holder 9 receives an external force in the direction toward the rubber buffer 46, the rubber buffer 46 restricts relative movement of the battery housing 3 and the battery pack 43.

The rubber vibration isolators 100 reduce transmission of vibrations from the main housing 2 to the battery housing 3. The rubber vibration isolators 100 function as vibration isolators that reduce vibrations received by the battery housing 3 from the main housing 2. The rubber vibration isolators 100 are located between the main housing 2 and the battery housing 3. The main housing 2 and the battery housing 3 are not in contact with each other with the rubber vibration isolators 100 in between. The battery housing 3 is located between the main housing 2 and the battery holder 9. The battery holder 9 is supported by the main housing 2 with the rubber vibration isolators 100 and the battery housing 3 in between.

The rubber vibration isolators 100 are located on the right and left of the battery housing 3. The rubber vibration isolators 100 include a left rubber vibration isolator 100L and a right rubber vibration isolator 100R. The left rubber vibration isolator 100L is located between the left main housing 2L and the left battery housing 3L. The right rubber vibration isolator 100R is located between the right main housing 2R and the right battery housing 3R.

Each rubber vibration isolator 100 is a rod extending in three directions different from one another. Each rubber vibration isolator 100 includes a first portion 101, a second portion 102, a third portion 103, a fourth portion 104, and a fifth portion 105. The first portion 101 and the third portion 103 extend in the front-rear direction. The third portion 103 is located frontward from the first portion 101. The first portion 101 and the third portion 103 are at different positions in the lateral direction. In the left rubber vibration isolator 100L, the third portion 103 is located leftward from the first portion 101. In the right rubber vibration isolator 100R, the third portion 103 is located rightward from the first portion 101. The second portion 102 extends laterally. The second portion 102 connects the front end of the first portion 101 and the rear end of the third portion 103. The fourth portion 104 extends vertically. The fourth portion 104 extends downward from the front end of the third portion 103. The fifth portion 105 extends laterally. The fifth portion 105 is connected to the lower end of the fourth portion 104. In the left rubber vibration isolator 100L, the fifth portion 105 extends rightward from the lower end of the fourth portion 104. In the right rubber vibration isolator 100R, the fifth portion 105 extends leftward from the lower end of the fourth portion 104.

Each rubber vibration isolator 100 has multiple projections 106 and a holding groove 107. The projections 106 face the battery housing 3. The holding groove 107 faces the main housing 2. The projections 106 are on the first portion 101, the second portion 102, the third portion 103, the fourth portion 104, and the fifth portion 105. The holding groove 107 extends along the first portion 101, the second portion 102, the third portion 103, the fourth portion 104, and the fifth portion 105.

The battery housing 3 has holding recesses 36 to receive the rubber vibration isolators 100. Each holding recess 36 is shaped in conformance with the shape of the corresponding rubber vibration isolator 100 to receive the first portion 101, the second portion 102, the third portion 103, the fourth portion 104, and the fifth portion 105.

The holding recesses 36 are on the left surface of the left battery housing 3L and on the right surface of the right battery housing 3R. The left rubber vibration isolator 100L is received in the holding recess 36 on the left battery housing 3L. The right rubber vibration isolator 100R is received in the holding recess 36 on the right battery housing 3R. The projections 106 are in contact with the inner surfaces of the holding recesses 36. The projections 106 reduce the areas of contact between the rubber vibration isolators 100 and the battery housing 3.

The main housing 2 includes holding protrusions 28 placed in the holding grooves 107. Each holding protrusion 28 is shaped in conformance with the shape of the corresponding rubber vibration isolator 100 to be placed in the holding groove 107 extending along the first portion 101, the second portion 102, the third portion 103, the fourth portion 104, and the fifth portion 105.

The holding protrusions 28 are on the inner surfaces of the left main housing 2L and the right main housing 2R. The holding protrusion 28 on the left main housing 2L protrudes rightward from the inner surface (right surface) of the left main housing 2L. The holding protrusion 28 on the right main housing 2R protrudes leftward from the inner surface (left surface) of the right main housing 2R. The holding protrusion 28 on the left main housing 2L is placed in the holding groove 107 on the left rubber vibration isolator 100L. The holding protrusion 28 on the right main housing 2R is placed in the holding groove 107 on the right rubber vibration isolator 100R.

In the embodiment, the first portion 101, the second portion 102, the third portion 103, the fourth portion 104, and the fifth portion 105 extending in directions different from one another are integral with one another. The first portion 101, the second portion 102, the third portion 103, the fourth portion 104, and the fifth portion 105 may be separate from one another.

Operation of Impact Tool

The operation of the impact tool 1 will now be described. To perform a fastening operation on a workpiece, for example, a socket for the fastening operation is attached to the front end of the anvil 16. The operator then grips the side handle 7 with the left hand and the grip 23 with the right hand, and operates the trigger lever 17A with the right index finger and the right middle finger to move the trigger lever 17A backward. When the trigger lever 17A moves backward, power is supplied from the battery pack 43 to the motor 10 to drive the motor 10 and turn on the light assembly 18. As the motor 10 is driven, the rotor 48 and the rotor shaft 49 rotate. A rotational force of the rotor shaft 49 is transmitted to the planetary gears 55P through the first bevel gear 53, the second bevel gear 54, and the sun gear 55S. The planetary gears 55P revolve about the sun gear 55S while rotating and meshing with the internal teeth on the internal gear 55I. The planetary gears 55P are rotatably supported by the spindle 14 with the pin 55A. The revolving planetary gears 55P rotate the spindle 14 at a lower rotational speed than the rotor shaft 49.

When the spindle 14 rotates with the hammer projections 71B and the anvil projections 16C in contact with each other, the anvil 16 rotates together with the hammer 71 and the spindle 14. Thus, the fastening operation proceeds.

When the anvil 16 receives a predetermined or higher load as the fastening operation proceeds, the anvil 16 and the hammer 71 stop rotating. When the hammer 71 stops rotating and the spindle 14 rotates, the hammer 71 moves backward. Thus, the hammer projections 71B come out of contact with the anvil projections 16C. The hammer 71 that has moved backward then moves forward while rotating with elastic forces from the first coil spring 73 and the second coil spring 74. The anvil 16 is thus struck by the hammer 71 in the rotation direction. The anvil 16 thus rotates about the output rotation axis AX at high torque. A bolt or a nut is thus tightened at high torque.

In the embodiment, the axial elastic member 91 and the radial elastic member 92 reduce transmission of vibrations from the hammer case 6 to the light emitter unit 90. The light emitter unit 90 is thus isolated from vibrations. This reduces, for example, the likelihood that connections between the substrate 95A and the LED chips 95B soldered to each other are damaged, and wires on the substrate 95A are damaged. In other words, this reduces failures in the light emitter unit 90.

In the embodiment, the rubber vibration isolators 100 reduce transmission of vibrations from the main housing 2 to the terminal unit 44 and the battery pack 43. Each rubber vibration isolator 100 extends in the three directions that are the front-rear direction, the vertical direction, and the lateral direction. The rubber vibration isolator 100 can thus reduce vibrations applied to the terminal unit 44 and the battery pack 43 in the three directions.

When the impact tool 1 is dropped and the battery pack 43 hits the floor surface or the ground, the battery holder 9 moves forward, causing the battery pack 43 to come in contact with the rubber buffer 46. This reduces a shock to the battery pack 43.

As described above, the impact tool 1 according to the embodiment includes the motor 10, the hammer 71 rotatable by the motor 10, the anvil 16 strikable by the hammer 71 in the rotation direction, the hammer case 6 accommodating the hammer 71, the light emitter unit 90 including the LED chips 95B as light emitters that illuminate the front end of the anvil 16 and an area adjacent to the front end of the anvil 16, and the radial elastic member 92 supported by the hammer case 6 and supporting the light emitter unit 90 from radially inside.

In the above structure, the radial elastic member 92 reduces vibrations applied to the light emitter unit 90 in the radial direction. The light emitter unit 90 is isolated from vibrations, reducing failures in the light emitter unit 90.

The hammer case 6 in the embodiment includes the first cylinder 61 surrounding the hammer 71, the second cylinder 62 located frontward from the first cylinder 61 and having a smaller outer diameter than the first cylinder 61, and the front wall 63 connecting the front end of the first cylinder 61 and the rear end of the second cylinder 62. The light emitter unit 90 at least partially surrounds the second cylinder 62. The radial elastic member 92 includes the radial base 92A between the second cylinder 62 and the light emitter unit 90 in the radial direction.

The radial base 92A thus reduces vibrations applied to the light emitter unit 90 in the radial direction.

The radial base 92A in the embodiment includes the inner circumferential surface facing the outer circumferential surface of the second cylinder 62, and the radial ribs 92D protruding radially inward from the inner circumferential surface. The radial ribs 92D are in contact with the outer circumferential surface of the second cylinder 62.

This structure reduces the area of contact between the radial elastic member 92 and the second cylinder 62. Vibrations are thus less likely to be transmitted from the hammer case 6 to the light emitter unit 90 through the radial base 92A.

The radial base 92A in the embodiment is in contact with the inner circumferential surface of the light emitter unit 90.

The light emitter unit 90 is thus not in direct contact with the hammer case 6, but is in contact with the radial base 92A. This structure effectively isolates the light emitter unit 90 from vibrations and reduces failures in the light emitter unit 90.

The radial elastic member 92 in the embodiment includes the rear support 92B supporting the light emitter unit 90 from the rear.

The rear support 92B thus reduces vibrations applied to the light emitter unit 90 in the axial direction.

The rear support 92B in the embodiment includes the rear surface facing the front surface of the front wall 63 and the first axial ribs 92F protruding rearward from the rear surface. The first axial ribs 92F are in contact with the front surface of the front wall 63.

This structure reduces the area of contact between the radial elastic member 92 and the front wall 63. Vibrations are thus less likely to be transmitted from the hammer case 6 to the light emitter unit 90 through the rear support 92B.

The rear support 92B in the embodiment is in contact with the rear surface of the light emitter unit 90.

The light emitter unit 90 is not in direct contact with the hammer case 6, but is in contact with the rear support 92B. This structure effectively isolates the light emitter unit 90 from vibrations and reduces failures in the light emitter unit 90.

The radial elastic member 92 in the embodiment includes the front support 92C supporting the light emitter unit 90 from the front.

The rear support 92B thus reduces vibrations applied to the light emitter unit 90 in the axial direction.

The front support 92C in the embodiment is in contact with the front surface of the light emitter unit 90.

The light emitter unit 90 is not in direct contact with the hammer case 6, but is in contact with the front support 92C. This structure effectively isolates the light emitter unit 90 from vibrations and reduces failures in the light emitter unit 90.

The impact tool 1 according to the embodiment includes the washer 93 and the ring spring 94 as fasteners fastened to at least a part of the hammer case 6 and supporting the front support 92C from the front.

The light emitter unit 90 is thus fastened to the hammer case 6 with the washer 93 and the ring spring 94 with the front support 92C in between.

The radial elastic member 92 in the embodiment surrounds the anvil 16.

This structure effectively isolates the light emitter unit 90 from vibrations.

The impact tool 1 according to the embodiment includes the axial elastic member 91 supporting the light emitter unit 90 from the rear.

The axial elastic member 91 thus reduces vibrations applied to the light emitter unit 90 in the axial direction. The light emitter unit 90 is isolated from vibrations, reducing failures in the light emitter unit 90.

The hammer case 6 in the embodiment includes the first cylinder 61 surrounding the hammer 71, the second cylinder 62 located frontward from the first cylinder 61 and having a smaller outer diameter than the first cylinder 61, and the front wall 63 connecting the front end of the first cylinder 61 and the rear end of the second cylinder 62. The axial elastic member 91 includes the axial base 91A between the front wall 63 and the light emitter unit 90 in the axial direction.

The axial base 91A thus reduces vibrations applied to the light emitter unit 90 in the axial direction.

The axial base 91A in the embodiment includes the rear surface facing the front surface of the front wall 63, and the second axial ribs 91D protruding rearward from the rear surface. The second axial ribs 91D are in contact with the front surface of the front wall 63.

This structure reduces the area of contact between the axial elastic member 91 and the front wall 63. Vibrations are thus less likely to be transmitted from the hammer case 6 to the light emitter unit 90 through the axial base 91A.

The axial base 91A in the embodiment is in contact with the rear surface of the light emitter unit 90.

The light emitter unit 90 is thus not in direct contact with the hammer case 6, but is in contact with the axial base 91A. This structure effectively isolates the light emitter unit 90 from vibrations and reduces failures in the light emitter unit 90.

The axial elastic member 91 in the embodiment includes the cover 91B covering the light emitter unit 90 from radially outside.

The cover 91B blocks light emitted radially outward from the light emitter unit 90, thus reducing glare to the operator of the impact tool 1. The cover 91B protects the light emitter unit 90.

The cover 91B in the embodiment is in contact with the outer circumferential surface of the light emitter unit 90.

This effectively reduces glare to the operator. The cover 91B effectively protects the light emitter unit 90.

The impact tool 1 according to the embodiment includes the motor 10, the hammer 71 rotatable by the motor 10, the anvil 16 strikable by the hammer 71 in the rotation direction, the hammer case 6 accommodating the hammer 71, the light emitter unit 90 including the LED chips 95B as light emitters that illuminate the front end of the anvil 16 and an area adjacent to the front end of the anvil 16, and the axial elastic member 91 supported by the hammer case 6 and including the axial base 91A supporting the light emitter unit 90 from the rear and the cover 91B covering the light emitter unit 90 from radially outside.

In the above structure, the axial base 91A reduces vibrations applied to the light emitter unit 90 in the radial direction. The light emitter unit 90 is isolated from vibrations, reducing failures in the light emitter unit 90. The cover 91B blocks light emitted radially outward from the light emitter unit 90, thus reducing glare to the operator of the impact tool 1. The cover 91B protects the light emitter unit 90.

The cover 91B in the radial direction in the embodiment has the radial dimension Db smaller than the axial dimension Da of the axial base 91A.

In this structure, the axial elastic member 91 is less likely to be larger, with the axial base 91A maintaining vibration isolation and the cover 91B maintaining light shield and protection.

The impact tool 1 according to the embodiment includes the motor 10, the hammer 71 rotatable by the motor 10, the anvil 16 strikable by the hammer 71 in the rotation direction, the hammer case 6 accommodating the hammer 71, the light emitter unit 90 including the LED chips 95B as light emitters that illuminate the front end of the anvil 16 and an area adjacent to the front end of the anvil 16, the radial elastic member 92 supported by the hammer case 6 and including the front support 92C supporting the light emitter unit 90 from front, and the washer 93 and the ring spring 94 as fasteners fastened to at least a part of the hammer case 6 and supporting the front support 92C from the front.

In the above structure, the radial elastic member 92 reduces vibrations applied to the light emitter unit 90. The light emitter unit 90 is isolated from vibrations, reducing failures in the light emitter unit 90. The light emitter unit 90 is fastened to the hammer case 6 with the washer 93 and the ring spring 94 with the front support 92C in between. Although vibrations from the hammer case 6 may be transmitted to the washer 93 and the ring spring 94, the front support 92C between the washer 93 and the light emitter unit 90 reduces transmission of vibrations from the hammer case 6 to the light emitter unit 90.

The impact tool 1 according to the embodiment includes the motor 10, the hammer 71 rotatable by the motor 10, the anvil 16 strikable by the hammer 71 in the rotation direction, the hammer case 6 accommodating the hammer 71, the light emitter unit 90 including the LED chips 95B as light emitters that illuminate the front end of the anvil 16 and an area adjacent to the front end of the anvil 16, and the axial elastic member 91 and the radial elastic member 92 supported by the hammer case 6 and supporting the light emitter unit 90 from at least three of radially inside, radially outside, rear, or front.

In the above structure, the axial elastic member 91 and the radial elastic member 92 reduce vibrations applied to the light emitter unit 90 in the radial direction and the axial direction. The light emitter unit 90 is isolated from vibrations, reducing failures in the light emitter unit 90.

The hammer case 6 in the embodiment includes the first cylinder 61 surrounding the hammer 71, the second cylinder 62 located frontward from the first cylinder 61 and having a smaller outer diameter than the first cylinder 61, and the front wall 63 connecting the front end of the first cylinder 61 and the rear end of the second cylinder 62. The axial elastic member 91, the radial elastic member 92, and the light emitter unit 90 are located radially inward from the line VL connecting the front end of the first cylinder 61 and the front end of the anvil 16 in a cross section including the output rotation axis AX of the anvil 16 and parallel to the output rotation axis AX.

When the impact tool 1 is dropped on the floor surface or on the ground, the front end of the first cylinder 61 or the front end of the anvil 16 hits the floor surface or the ground. This reduces the likelihood that the light emitter unit 90 hits the floor surface or the ground. This reduces failures in the light emitter unit 90.

The light emitter unit 90 in the embodiment includes the COB LED 95.

The COB LED 95 emits a large amount of light, illuminating a workpiece brightly.

The light emitter unit 90 in the embodiment includes the optical member 96 facing the front surface of the LED chips 95B as light emitters and transmitting light emitted from the LED chips 95B.

This structure allows light emitted from the COB LED 95 to pass through the optical member 96 and illuminate a workpiece.

In the embodiment, the optical member 96 and the substrate in the COB LED 95 are fastened together with the snap-fits 96G as fasteners.

This structure fastens the optical member 96 and the COB LED 95 together without an adhesive, thus eliminating time for curing an adhesive during the manufacture of the light emitter unit 90. The optical member 96 and the COB LED 95 can be smoothly fastened together during the manufacture of the light emitter unit 90.

Second Embodiment

A second embodiment will be described. The same or corresponding components as those in the above first embodiment are given the same reference numerals herein and will be described briefly or will not be described.

Figure 31:
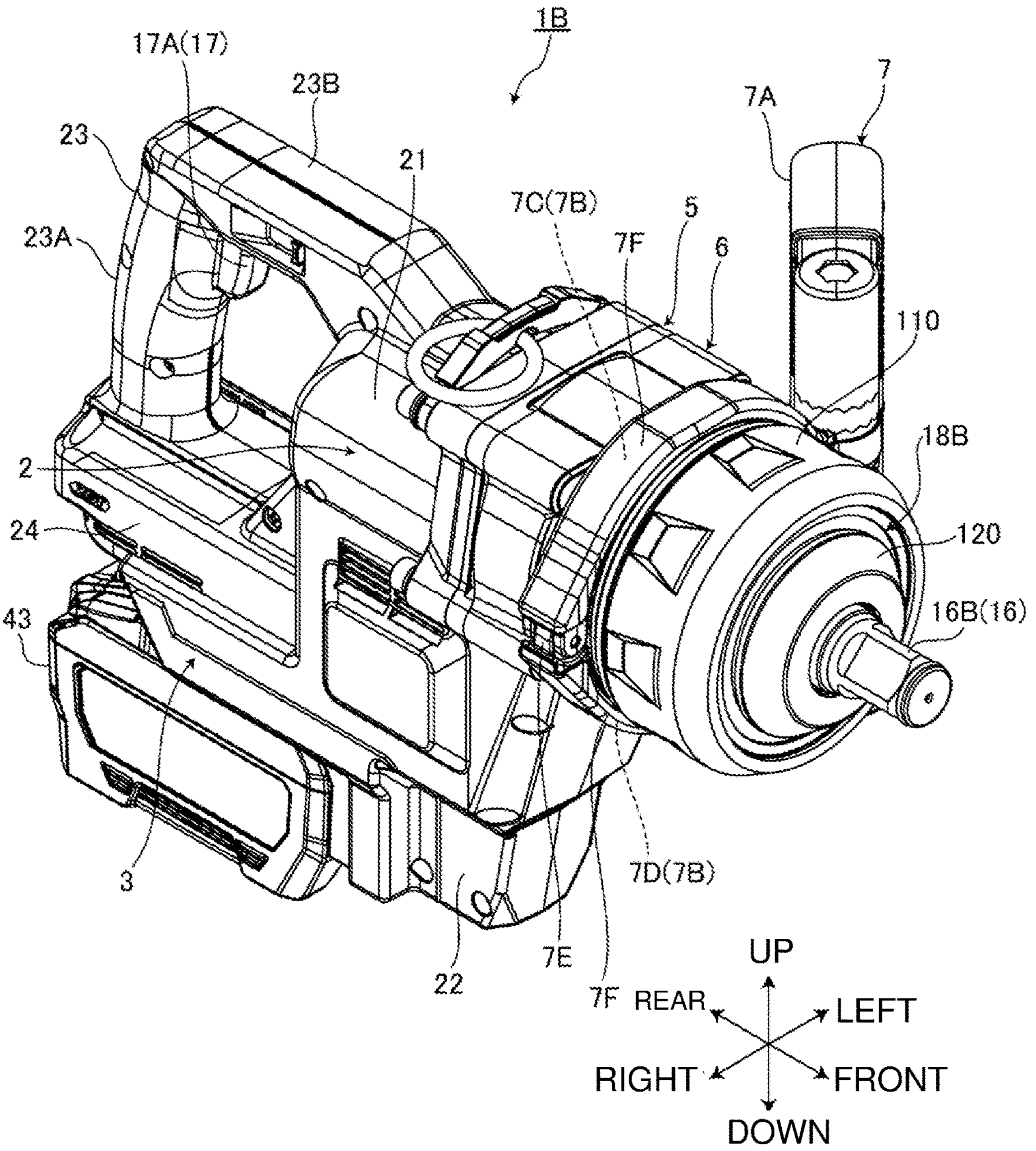
FIG. 31 is a perspective view of an impact tool according to an embodiment as viewed from the right front.
Figure 32:
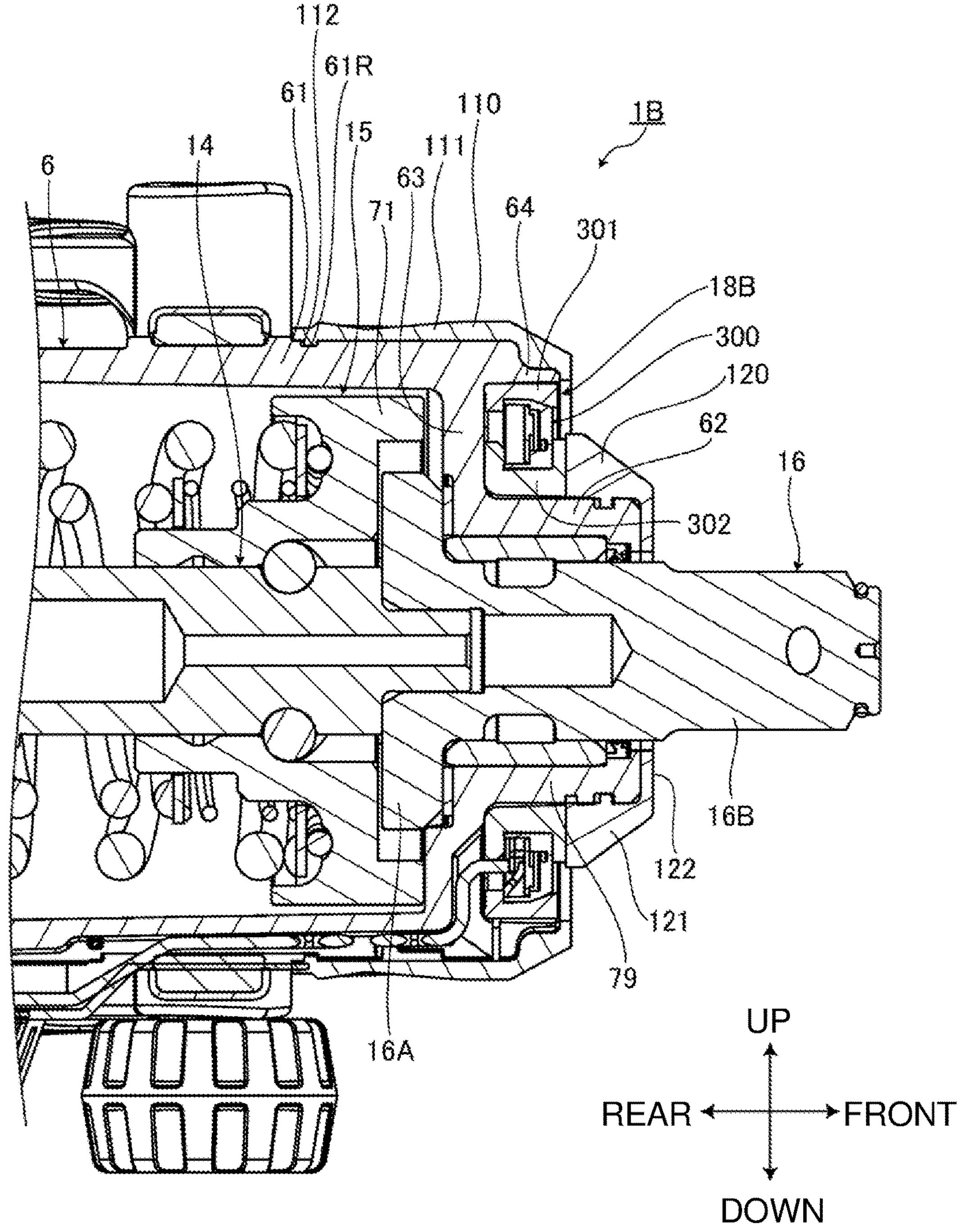
FIG. 32 is a partial sectional view of the impact tool according to the embodiment.
Figure 33:
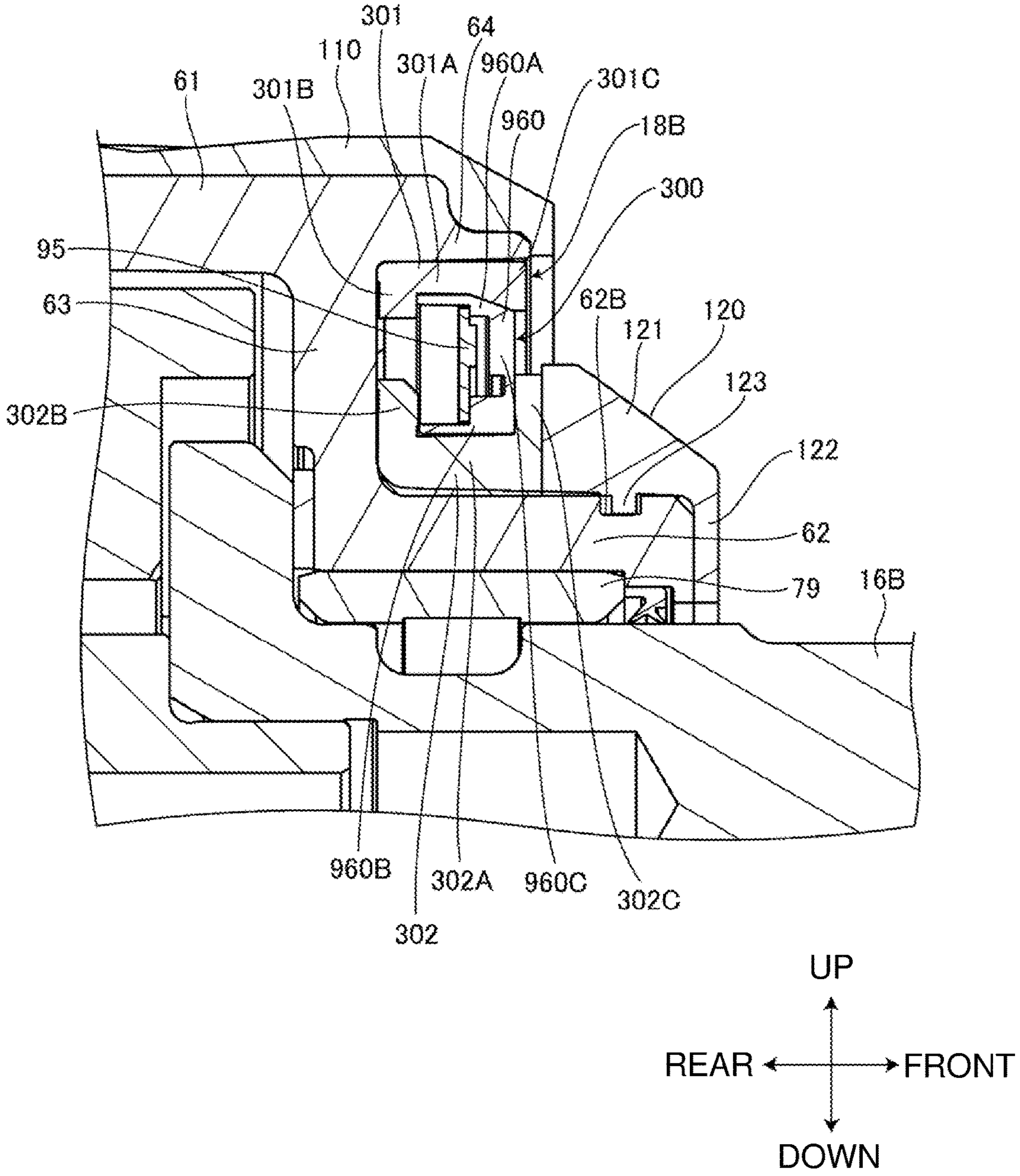
FIG. 33 is a partially enlarged sectional view of a light assembly in the embodiment.
Figure 34:
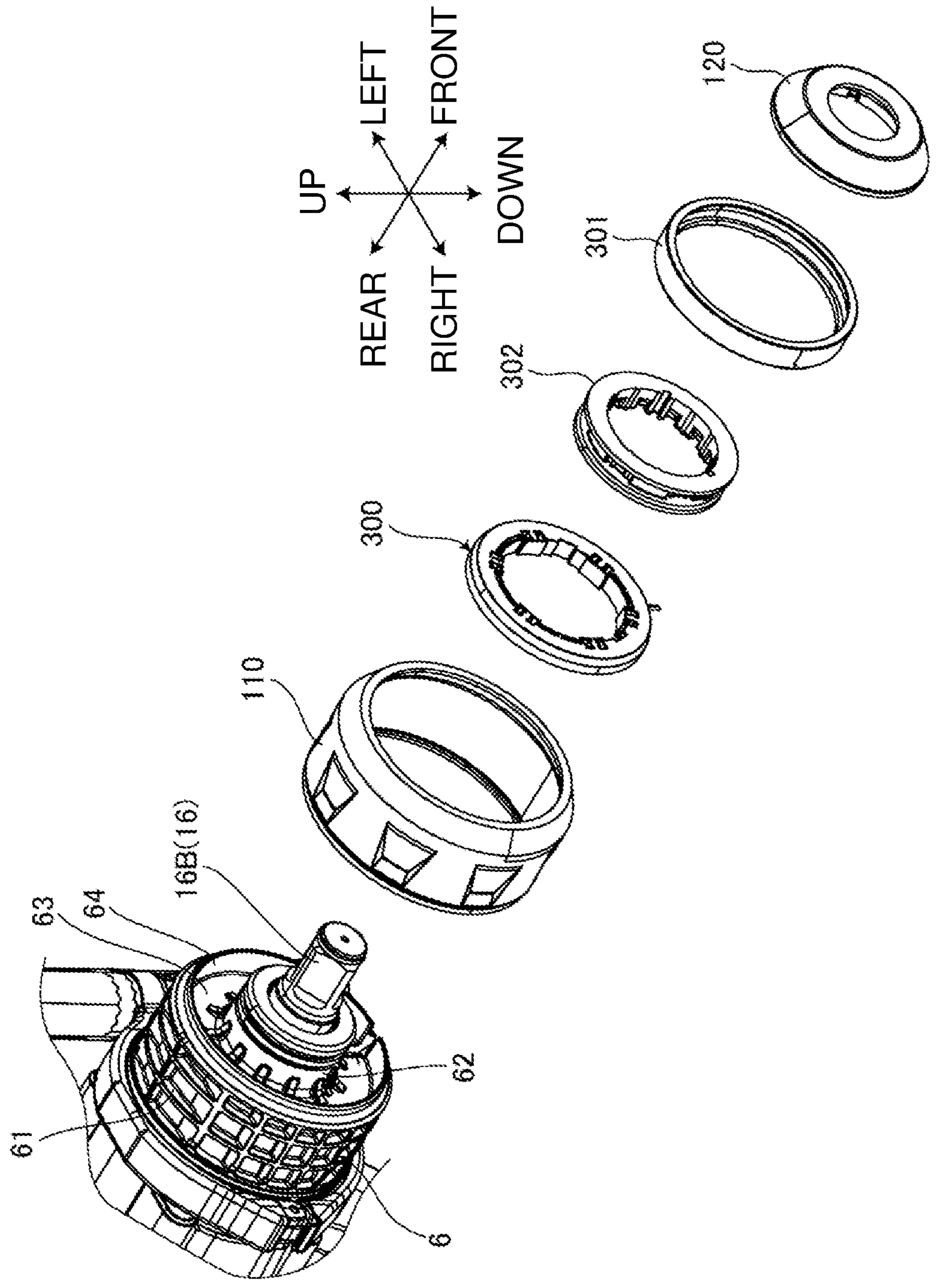
FIG. 34 is an exploded perspective view of the light assembly in the embodiment as viewed from the right front.

FIG. 31 is a perspective view of an impact tool 1B according to the present embodiment as viewed from the right front. FIG. 32 is a partial sectional view of the impact tool 1B. FIG. 33 is a partially enlarged sectional view of a light assembly 18B. FIG. 34 is an exploded perspective view of the light assembly 18B as viewed from the right front.

The impact tool 1B is an impact wrench as an example of a fastening tool. Similarly to the impact tool 1 described in the first embodiment, the impact tool 1B according to the present embodiment includes a main housing 2, a battery housing 3, a gear case 5, a hammer case 6, a side handle 7, a spindle 14, a striker 15, an anvil 16, a trigger switch 17, and the light assembly 18B.

The main housing 2 includes a body 21, a protruding portion 22, a grip 23, and a controller compartment 24. As in the first embodiment, the body 21 accommodates a motor case 4 accommodating a motor 10. The protruding portion 22 protrudes downward from the body 21. The controller compartment 24 is located behind the protruding portion 22. The grip 23 is located behind the body 21.

The grip 23 includes a rear grip 23A and an upper grip 23B. The rear grip 23A extends upward from the rear portion of the controller compartment 24. The upper grip 23B extends frontward from the upper end of the rear grip 23A. The rear grip 23A has its lower end connected to the controller compartment 24. The rear grip 23A has its upper end connected to the rear end of the upper grip 23B. The upper grip 23B has its front end connected to an upper portion of the body 21. The grip 23, the body 21, and the controller compartment 24 define a D-shaped handle. The D-shaped handle is located behind the motor 10. The trigger switch 17 is located in an upper portion of the rear grip 23A.

The hammer case 6 is substantially cylindrical. The hammer case 6 includes a first cylinder 61 (rear cylinder), a second cylinder 62 (front cylinder), a front wall 63, and an annular rib 64. The second cylinder 62 holds an anvil bearing 79. The first cylinder 61 is located rearward from the second cylinder 62. The first cylinder 61 has a larger outer diameter than the second cylinder 62. The front wall 63 connects the front end of the first cylinder 61 and the rear end of the second cylinder 62. The annular rib 64 protrudes frontward from the outer edge of the front surface of the front wall 63. The annular rib 64 is substantially annular in a plane orthogonal to the output rotation axis AX.

The side handle 7 includes a handle portion 7A and a base 7B. The handle portion 7A is grippable by the operator. The base 7B is fixed to the hammer case 6. The base 7B includes a first base 7C and a second base 7D. The second base 7D is located below the first base 7C. The first base 7C and the second base 7D are arc-shaped. The first base 7C and the second base 7D hold the first cylinder 61 in between. The first base 7C and the second base 7D have their right ends connected to each other with a hinge 7E. The first base 7C and the second base 7D have their left ends connected to the handle portion 7A. In the embodiment, the first base 7C and the second base 7D have their surfaces covered with rubber portions 7F. The rubber portions 7F protect the first base 7C and the second base 7D. The rubber portions 7F reduce contact between the base 7B and an object around the impact tool 1B. The rubber portions 7F protect an object around the impact tool 1B.

The impact tool 1B according to the embodiment includes a rear bumper 110 and a front bumper 120.

The rear bumper 110 covers at least a part of the surface of the hammer case 6. The rear bumper 110 in the embodiment covers the outer circumferential surface of the first cylinder 61, the outer circumferential surface of the annular rib 64, and the front end face of the annular rib 64. The rear bumper 110 protects the hammer case 6. The rear bumper 110 is formed from rubber. The rear bumper 110 reduces contact between the hammer case 6 and an object around the impact tool 1B.

The rear bumper 110 includes a cylindrical portion 111 and a protrusion 112. The cylindrical portion 111 covers the outer circumferential surface of the first cylinder 61, the outer circumferential surface of the annular rib 64, and the front end face of the annular rib 64. The protrusion 112 protrudes radially inward from the rear of the inner circumferential surface of the cylindrical portion 111. The cylindrical portion 111 surrounds the first cylinder 61 and the annular rib 64. The protrusion 112 is received in a groove 61R on the outer circumferential surface of the first cylinder 61. The protrusion 112 is annular and surrounds the output rotation axis AX. The groove 61R surrounds the output rotation axis AX.

As described above, the rear bumper 110 is formed from rubber. The rear bumper 110 is fastened to the first cylinder 61 with an elastic force (fastening force) from the rubber. With the protrusion 112 received in the groove 61R, the rear bumper 110 is positioned relative to the first cylinder 61.

The front bumper 120 covers at least a part of the surface of the hammer case 6. The front bumper 120 in the embodiment covers the outer circumferential surface of the second cylinder 62 and the front end face of the second cylinder 62. The front bumper 120 protects the hammer case 6. The front bumper 120 reduces contact between the hammer case 6 and an object around the impact tool 1B. The front bumper 120 is formed from rubber.

The front bumper 120 includes a cylindrical portion 121, an annular portion 122, and a protrusion 123. The cylindrical portion 121 covers the outer circumferential surface of the second cylinder 62. The annular portion 122 covers the front end portion of the second cylinder 62. The protrusion 123 protrudes radially inward from the inner circumferential surface of the cylindrical portion 121. The cylindrical portion 121 surrounds the second cylinder 62. The protrusion 123 is received in a groove 62R on the outer circumferential surface of the second cylinder 62. The protrusion 123 is annular and surrounds the output rotation axis AX. The groove 62R surrounds the output rotation axis AX.

As described above, the front bumper 120 is formed from rubber. The front bumper 120 is fastened to the second cylinder 62 with an elastic force (fastening force) from the rubber. With the protrusion 123 received in the groove 62R, the front bumper 120 is positioned relative to the second cylinder 62.

The spindle 14 rotates with a rotational force from the motor 10 transmitted by the reducer 13. The spindle 14 has a front portion accommodated in the hammer case 6. The striker 15 is accommodated in the first cylinder 61 in the hammer case 6.

The anvil 16 is located frontward from the motor 10. The anvil 16 is an output unit of the impact tool 1B that rotates about the output rotation axis AX with a rotational force from the motor 10. The anvil 16 is struck by the hammer 71 in the striker 15 in the rotation direction. An anvil shaft 16B has its front end located in front of the hammer case 6 through a front opening of the second cylinder 62. The anvil shaft 16B receives a socket as a tip tool on the front end.

The anvil shaft 16B is rotatably supported by an anvil bearing 79. The anvil bearing 79 is held inside the second cylinder 62 in the hammer case 6. The anvil bearing 79 in the embodiment is a slide bearing. The anvil bearing 79 is cylindrical.

The light assembly 18B emits illumination light. The light assembly 18B illuminates the anvil 16 and an area around the anvil 16 with illumination light. The light assembly 18B illuminates an area ahead of the anvil 16 with illumination light. The light assembly 18B also illuminates the socket attached to the anvil 16 and an area around the socket with illumination light. The light assembly 18B surrounds the second cylinder 62 in the hammer case 6.

The light assembly 18B includes a light emitter unit 300, an axial elastic member 301, and a radial elastic member 302.

The light emitter unit 300 surrounds the second cylinder 62. The light emitter unit 300 includes a COB LED 95 and an optical member 960. As in the above embodiment, the COB LED 95 includes LED chips as light emitters.

The optical member 960 faces the front surfaces of the LED chips in the COB LED 95. The optical member 960 transmits light emitted from the LED chips. The optical member 960 is at least partially located frontward from the COB LED 95.

The optical member 960 includes an outer cylinder 960A, an inner cylinder 960B, and a light transmitter 960C. The outer cylinder 960A is located radially outward from the inner cylinder 960B. The outer cylinder 960A is located adjacent to the outer circumference of the COB LED 95. The inner cylinder 960B is located adjacent to the inner circumference of the COB LED 95. The light transmitter 960C is located frontward from the COB LED 95. The light transmitter 960C connects the front end of the outer cylinder 960A and the front end of the inner cylinder 960B. The light transmitter 960C allows light emitted from the COB LED 95 to pass through and illuminate an area ahead of the light emitter unit 300.

The axial elastic member 301 and the radial elastic member 302 are formed from rubber. The axial elastic member 301 and the radial elastic member 302 reduce transmission of vibrations from the hammer case 6 to the light emitter unit 300. The axial elastic member 301 and the radial elastic member 302 each function as a vibration isolator to reduce vibrations received by the light emitter unit 300.

The radial elastic member 302 is annular. The radial elastic member 302 surrounds the anvil shaft 16B. The radial elastic member 302 surrounds the second cylinder 62.

The radial elastic member 302 is supported by the hammer case 6. The radial elastic member 302 supports the light emitter unit 300 from radially inside. The radial elastic member 302 at least partially faces the front surface of the optical member 960. The radial elastic member 302 includes a radial base 302A, a rear support 302B, and a front support 302C. The radial base 302A, the rear support 302B, and the front support 302C are integral with one another.

The radial base 302A is located between the second cylinder 62 and the light emitter unit 300 in the radial direction. The radial base 302A is cylindrical. The radial base 302A surrounds the second cylinder 62. The radial base 302A has its inner circumferential surface facing the outer circumferential surface of the second cylinder 62. The inner circumferential surface of the radial base 302A is in contact with the outer circumferential surface of the second cylinder 62. The radial base 302A has its outer circumferential surface facing the inner circumferential surface of the light emitter unit 300. The outer circumferential surface of the radial base 302A is in contact with the inner circumferential surface of the light emitter unit 300.

The rear support 302B supports the light emitter unit 300 from the rear. The rear support 302B is annular. The rear support 302B is connected to the rear end of the radial base 302A. The rear support 302B protrudes radially outward from the rear end of the radial base 302A. The rear support 302B has its rear surface facing the front surface of the front wall 63. The rear support 302B has its front surface in contact with the rear surface of the light emitter unit 300. The front surface of the rear support 302B is in contact with the rear surface of the inner cylinder 960B in the optical member 960.

The front support 302C supports the light emitter unit 300 from the front. The front support 302C is annular. The front support 302C is connected to the front end of the radial base 302A. The front support 302C protrudes radially outward from the front end of the radial base 302A. The front support 302C has its rear surface in contact with the front surface of the light emitter unit 300. The front support 302C has its front surface in contact with the rear surface of the front bumper 120.

The axial elastic member 301 is annular. The axial elastic member 301 surrounds the light emitter unit 300.

The axial elastic member 301 is supported by the light emitter unit 300. The axial elastic member 301 supports the light emitter unit 300 from the rear. The axial elastic member 301 is at least partially located between the annular rib 64 and the light emitter unit 300 in the radial direction. The axial elastic member 301 includes an axial base 301A, a rear support 301B, and a front support 301C. The axial base 301A, the rear support 301B, and the front support 301C are integral with one another.

The axial base 301A is located between the annular rib 64 and the light emitter unit 300 in the radial direction. The axial base 301A is cylindrical. The axial base 301A surrounds the light emitter unit 300. The axial base 301A has its outer circumferential surface facing the inner circumferential surface of the annular rib 64. The outer circumferential surface of the axial base 301A is in contact with the inner circumferential surface of the annular rib 64. The axial base 301A has its inner circumferential surface facing the outer circumferential surface of the light emitter unit 300. The inner circumferential surface of the axial base 301A is in contact with the outer circumferential surface of the light emitter unit 300.

The rear support 301B supports the light emitter unit 300 from the rear. The rear support 301B is annular. The rear support 301B is connected to the rear end of the axial base 301A. The rear support 301B protrudes radially inward from the rear end of the axial base 301A. The rear support 301B has its rear surface facing the front surface of the front wall 63. The rear support 301B has its front surface in contact with the rear surface of the light emitter unit 300. The front surface of the rear support 301B is in contact with the rear surface of the outer cylinder 960A in the optical member 960.

The front support 301C supports the light emitter unit 300 from the front. The front support 301C is annular. The front support 301C is connected to the front end of the axial base 301A. The front support 301C protrudes radially inward from the front end of the axial base 301A. The front support 301C has its rear surface in contact with the front surface of the light emitter unit 300.

The front bumper 120 covers at least a part of the surface of the hammer case 6 at a position frontward from the light assembly 18B. The front bumper 120 is in contact with at least a part of the front surface of the light assembly 18B. The front bumper 120 supports the light assembly 18B from the front. The front bumper 120 supports the radial elastic member 302 from the front. The front bumper 120 is in contact with at least a part of the front surface of the radial elastic member 302.

The front bumper 120 supports the front support 302C from the front. The front bumper 120 has its rear surface in contact with the front surface of the front support 302C.

The front bumper 120 supports the light emitter unit 300 from the front with the radial elastic member 302 in between. The front bumper 120 supports the optical member 960 from the front with the radial elastic member 302 in between. The front bumper 120 has its outer end located radially outward from the inner end of the optical member 960. The outer end of the front bumper 120 and the inner end of the optical member 960 overlap each other in the radial direction.

In the embodiment, the rear bumper 110 and the front bumper 120 have the same rubber hardness. The radial elastic member 302 and the axial elastic member 301 have the same rubber hardness. The front bumper 120 and the rear bumper 110 have higher rubber hardness than the radial elastic member 302 and the axial elastic member 301.

As described above, the rubber front bumper 120 in the embodiment reduces the likelihood that the light assembly 18B slips forward from the second cylinder 62. The front bumper 120 formed from rubber reduces wear of the second cylinder 62 when the impact tool 1B vibrates. For a front bumper 120 formed from a metal, the outer circumferential surface of the second cylinder 62 may wear or the inner surface of the groove 62R may wear when the impact tool 1B vibrates. The front bumper 120 in the embodiment is formed from rubber. The second cylinder 62 is thus less likely to wear when the impact tool 1B vibrates.

Figure 35:
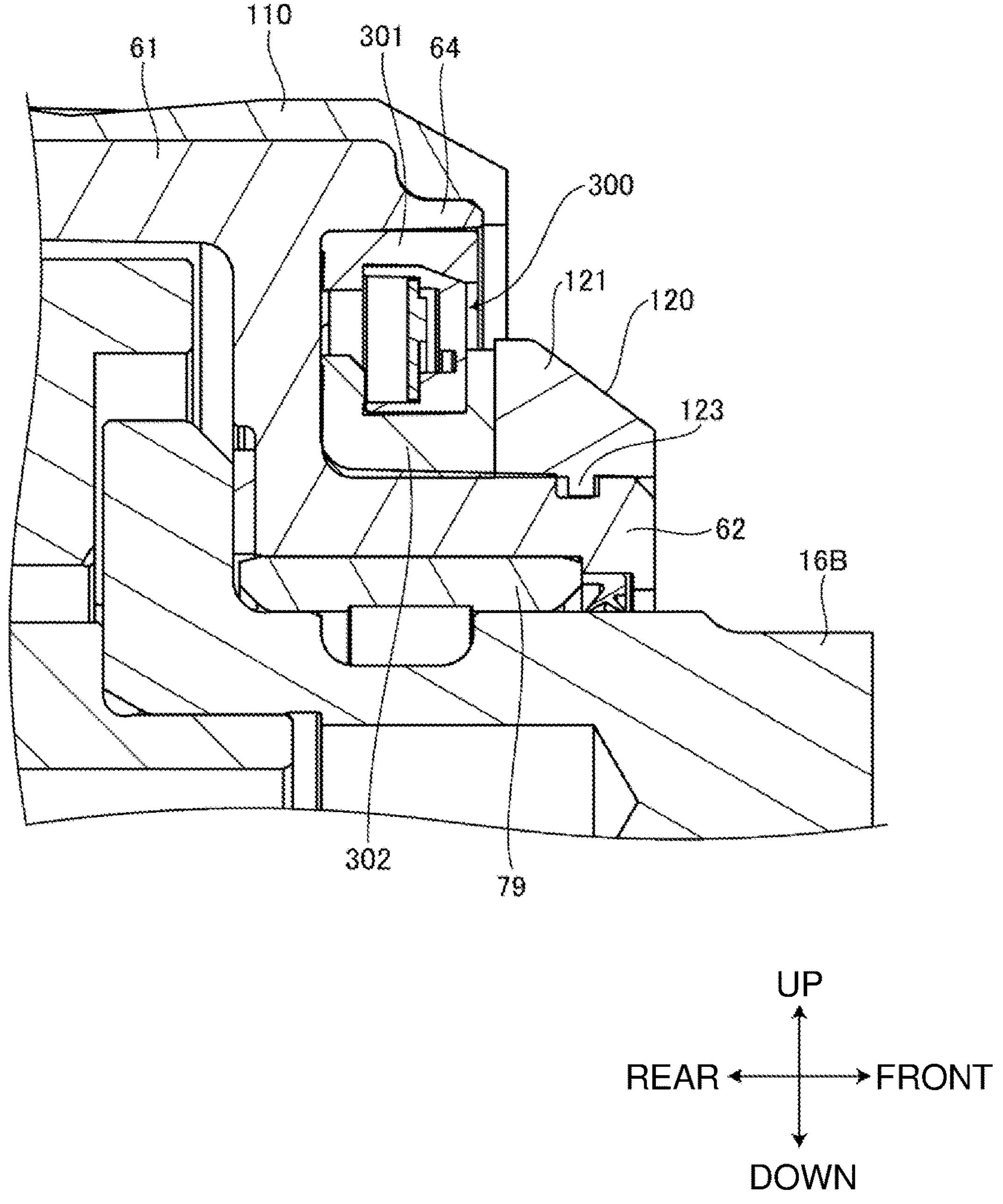
FIG. 35 is a partially enlarged sectional view of an impact tool in a modification.

FIG. 35 is a partially enlarged sectional view of the impact tool 1B according to a modification. As shown in FIG. 35, the annular portion 122 may be eliminated from the front bumper 120. When the annular portion 122 is included, the socket received in the anvil shaft 16B may come in contact with the front bumper 120. This may easily degrade the front bumper 120. Without the annular portion 122, the socket received in the anvil shaft 16B is less likely to come in contact with the front bumper 120, thus reducing degradation of the front bumper 120.

Third Embodiment

A third embodiment will be described. The same or corresponding components as those in the above first embodiment are given the same reference numerals herein and will be described briefly or will not be described.

Figure 36:
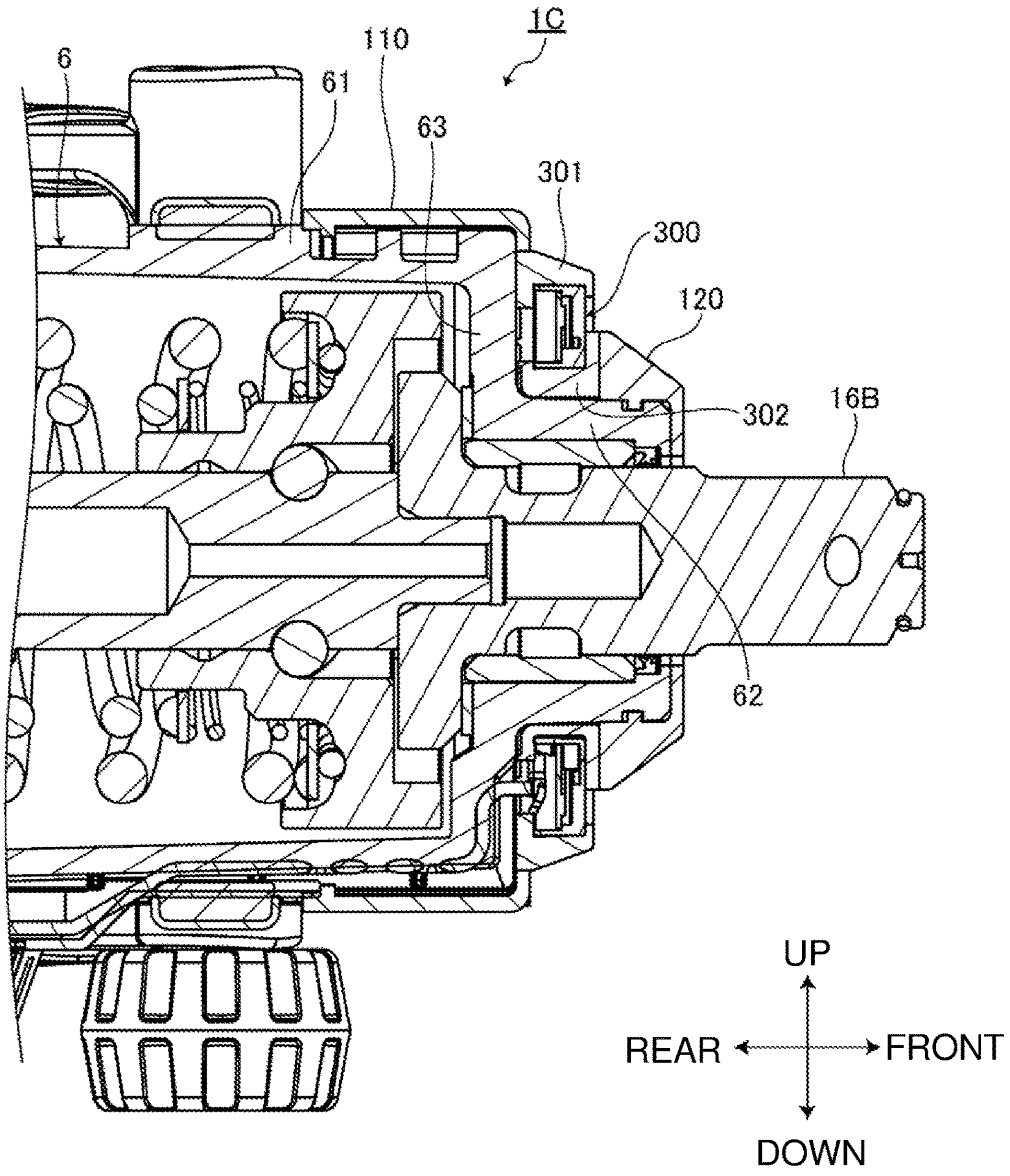
FIG. 36 is a partial sectional view of an impact tool according to an embodiment.
Figure 37:
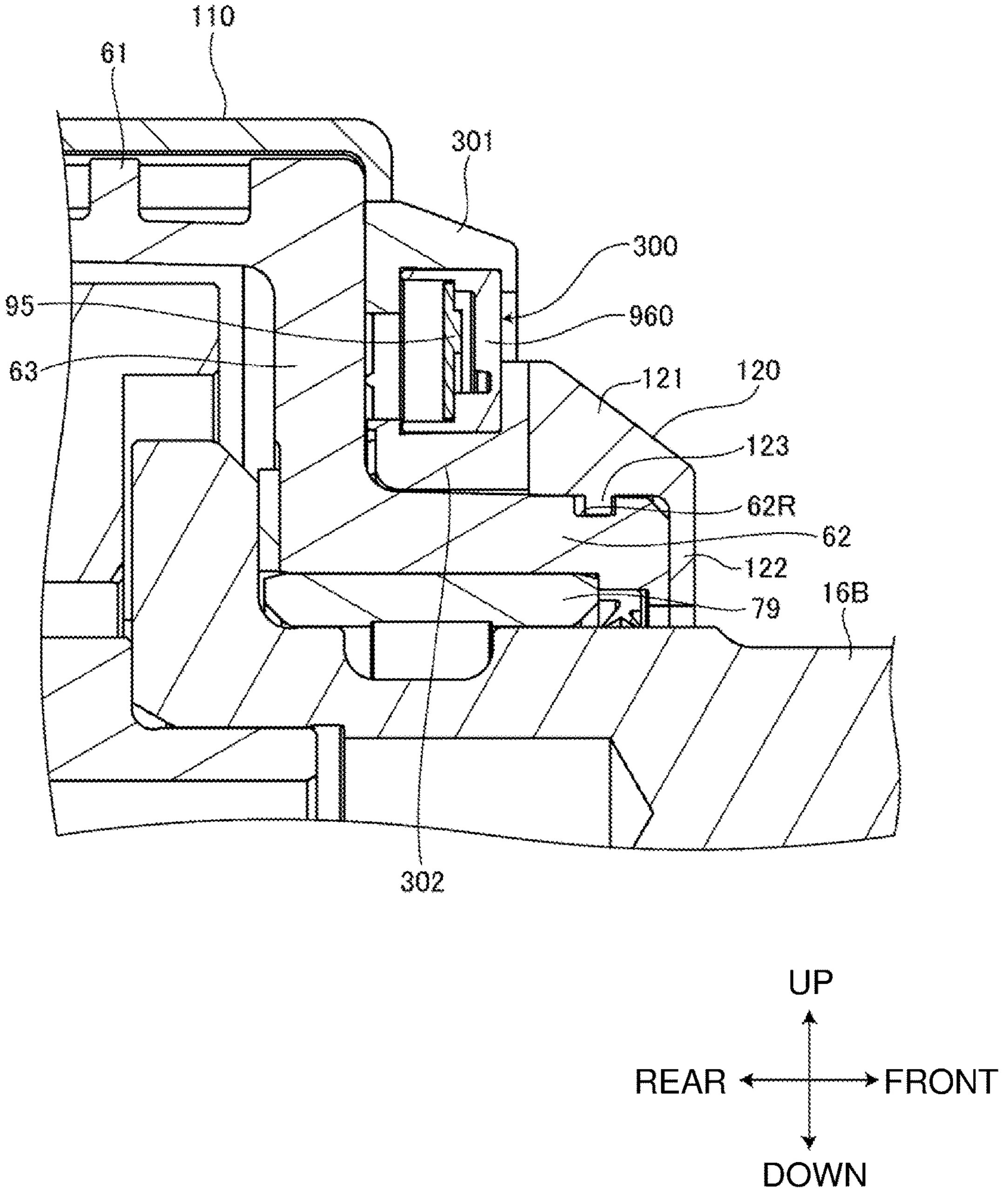
FIG. 37 is a partially enlarged sectional view of a light assembly in the embodiment.
Figure 38:
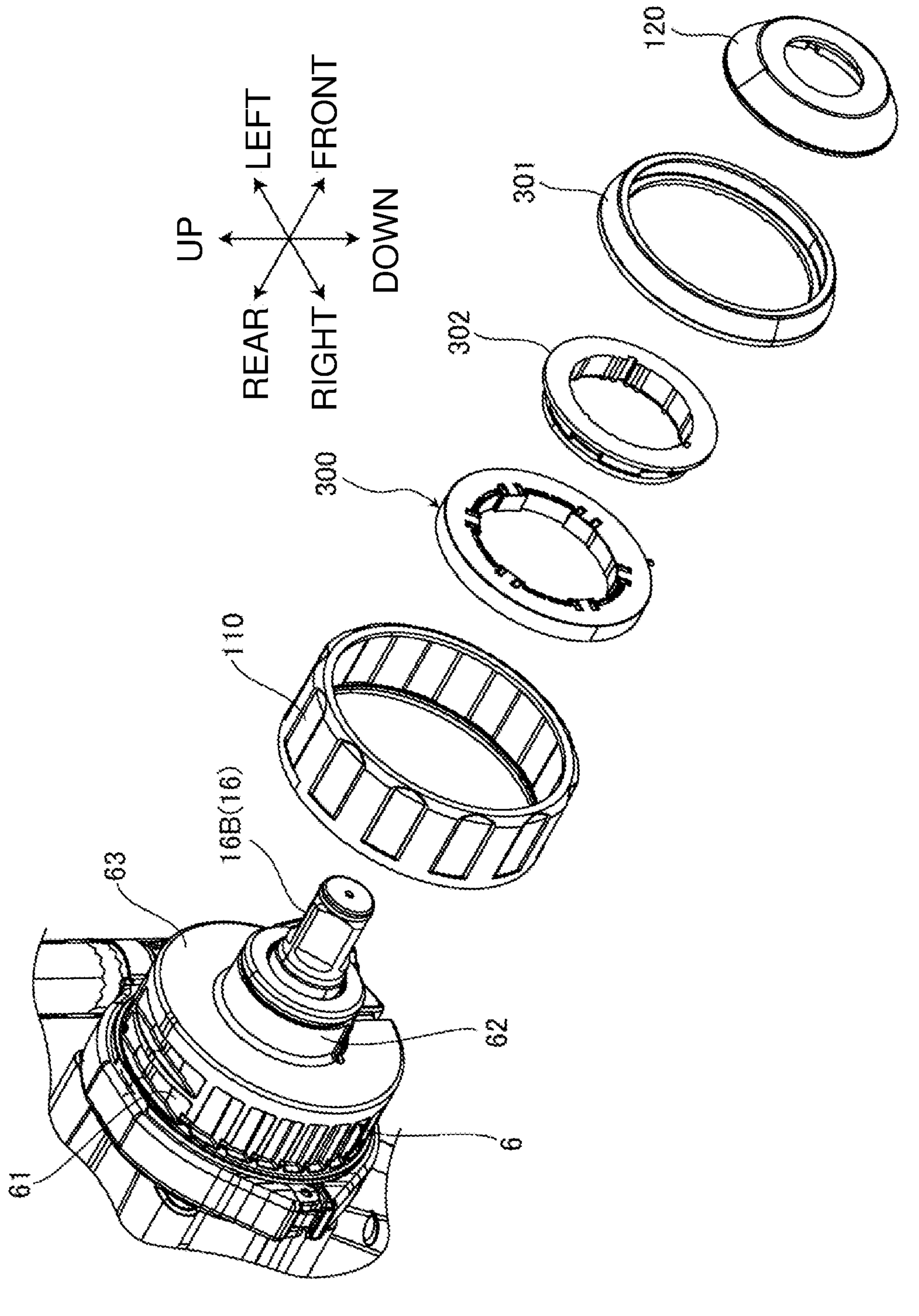
FIG. 38 is an exploded perspective view of the light assembly in the embodiment as viewed from the right front.

FIG. 36 is a partial sectional view of an impact tool 1C according to the present embodiment. FIG. 37 is a partially enlarged sectional view of a light assembly. FIG. 38 is an exploded perspective view of the light assembly as viewed from the right front.

The impact tool 1C is a modification of the impact tool 1B described in the second embodiment. The main difference between the impact tool 1B and the impact tool 1C is that the hammer case 6 in the impact tool 1B includes the annular rib 64 but the hammer case 6 in the impact tool 1C includes no annular rib 64. The rear bumper 110 in the impact tool 1C has its front end that is bent radially inward. The front end of the rear bumper 110 is in contact with the outer circumferential surface of the axial elastic member 301. The hammer case 6 is not exposed at the boundary between the front end of the rear bumper 110 and the outer circumferential surface of the axial elastic member 301.

The rear bumper 110 has its front end located rearward from the rear end of the optical member 960. In other words, the front end of the rear bumper 110 does not overlap the rear end of the optical member 960 in the axial direction.

Figure 39:
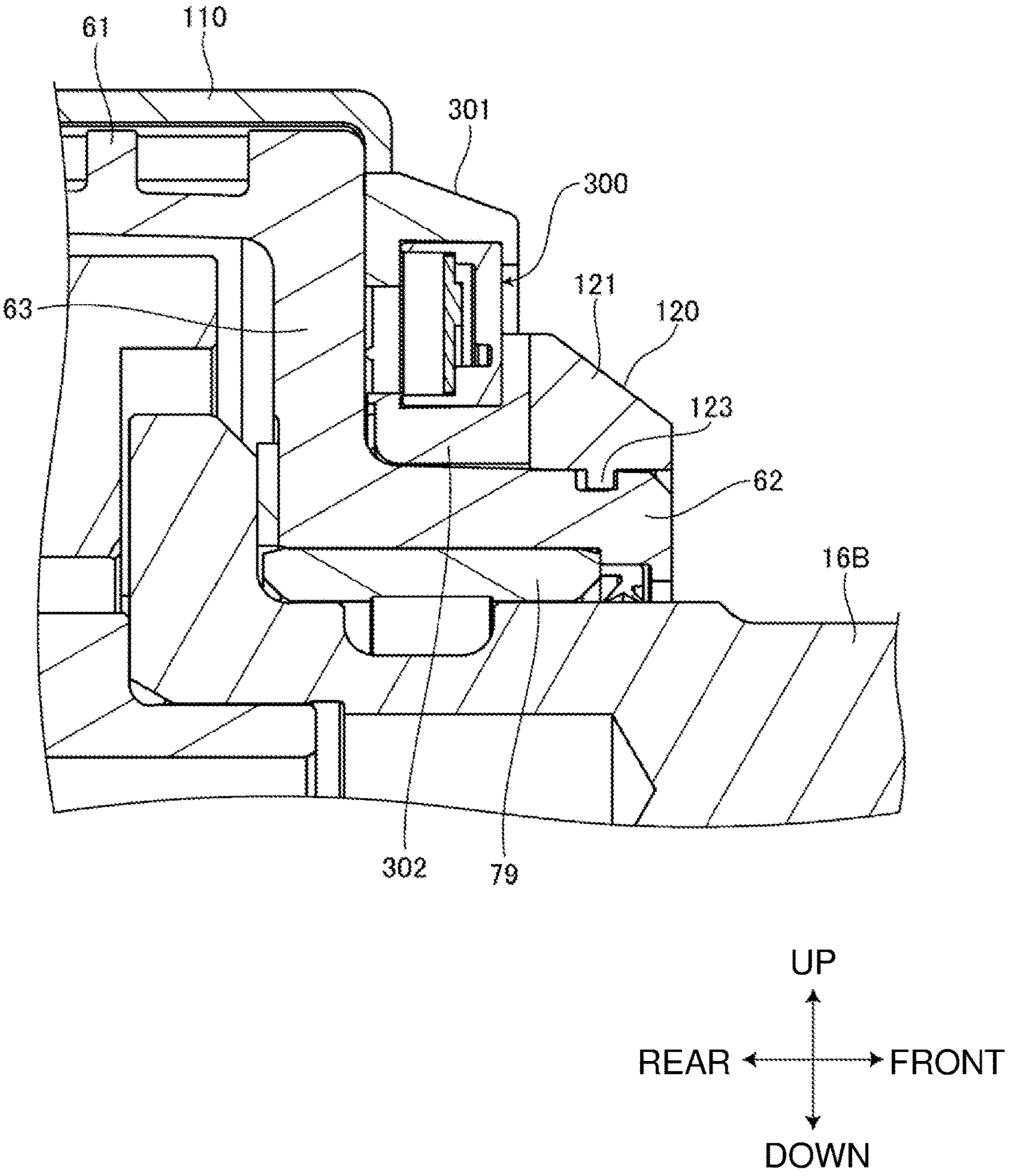
FIG. 39 is a partially enlarged sectional view of the impact tool in a modification.

FIG. 39 is a partially enlarged sectional view of the impact tool 1C in a modification. As shown in FIG. 39, the annular portion 122 may be eliminated from the front bumper 120.

Figure 40:
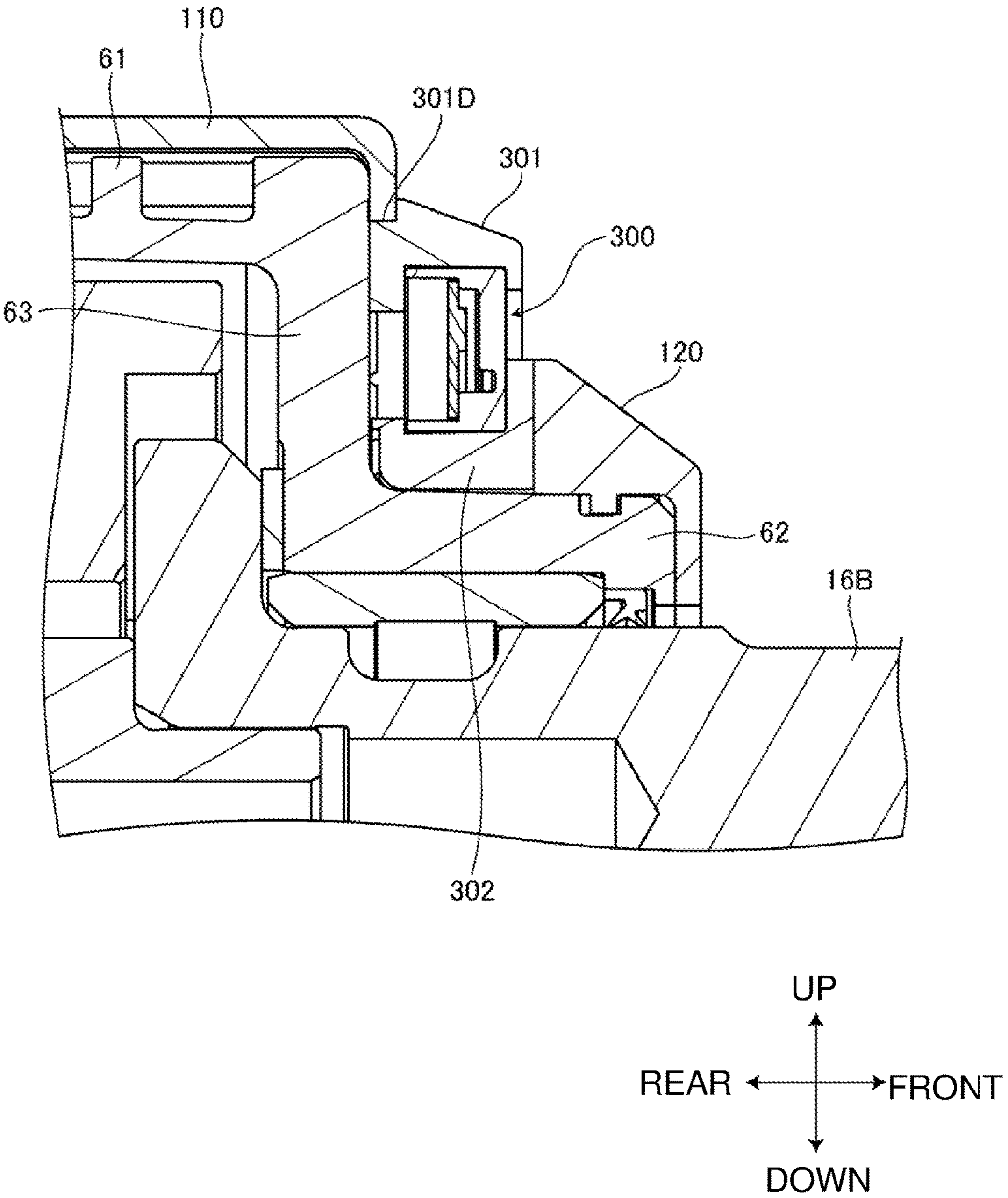
FIG. 40 is a partially enlarged sectional view of the impact tool according to a modification.
Figure 41:
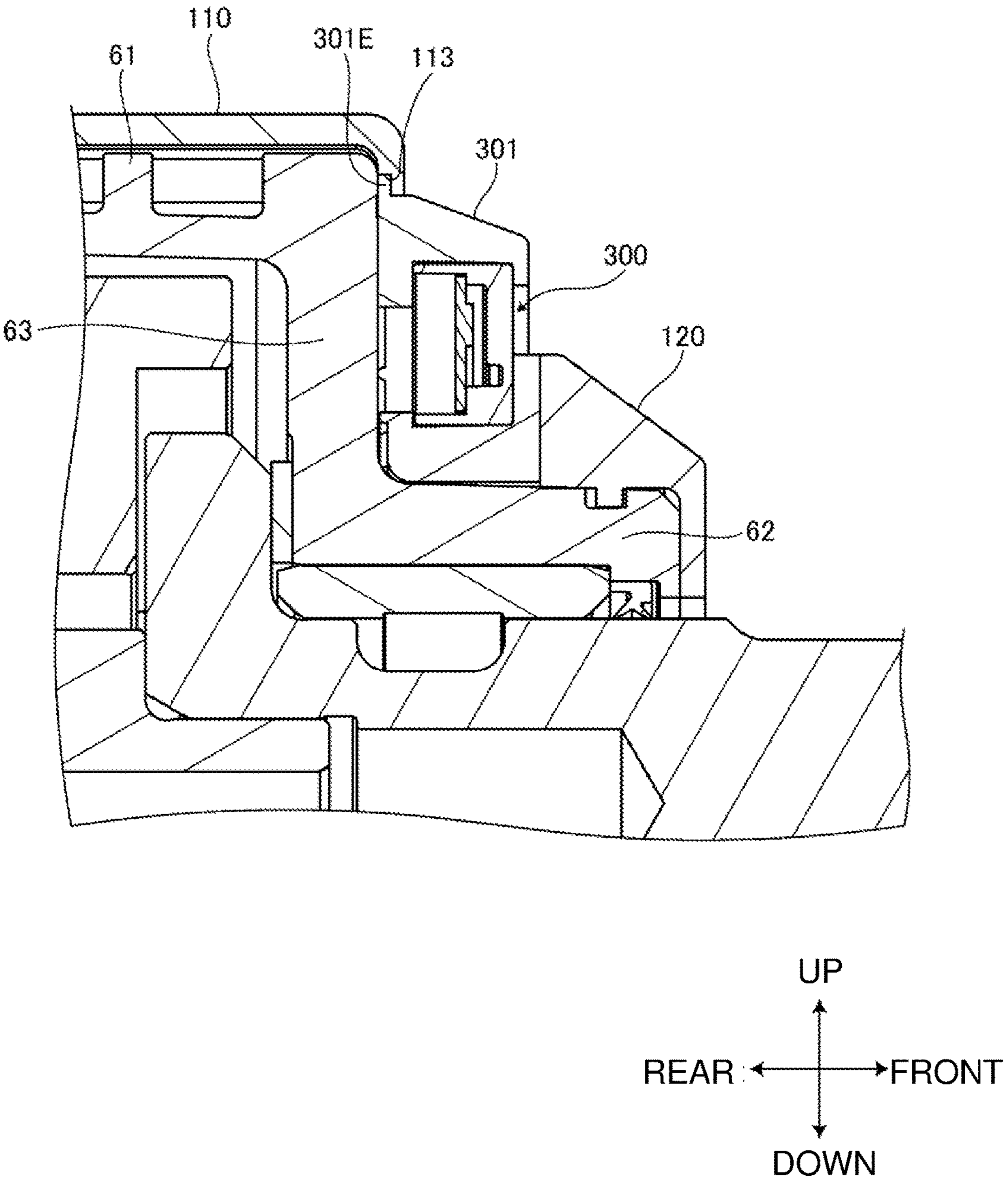
FIG. 41 is a partially enlarged sectional view of the impact tool according to a modification.

FIGS. 40 and 41 are each a partially enlarged sectional view of the impact tool 1C in a modification. As shown in FIGS. 40 and 41, the front end of the rear bumper 110 and the rear end of the axial elastic member 301 may overlap each other in the radial direction.

In the example shown in FIG. 40, the axial elastic member 301 has a recess 301D on the rear of the outer circumferential surface. The recess 301D is recessed radially inward from the rear of the outer circumferential surface of the axial elastic member 301. The rear bumper 110 has its front end that is bent radially inward. The front end of the rear bumper 110 is received in the recess 301D. The hammer case 6 is not exposed at the boundary between the front end of the rear bumper 110 and the outer circumferential surface of the axial elastic member 301.

In the example shown in FIG. 41, the axial elastic member 301 includes a flange 301E on the rear of the outer circumferential surface. The flange 301E protrudes radially outward from the rear of the outer circumferential surface of the axial elastic member 301. The rear bumper 110 has its front end that is bent radially inward. The rear bumper 110 has, on its front end, a recess 113 receiving the flange 301E. The hammer case 6 is not exposed at the boundary between the front end of the rear bumper 110 and the outer circumferential surface of the axial elastic member 301.

Fourth Embodiment

A fourth embodiment will be described. The same or corresponding components as those in the first embodiment are given the same reference numerals herein and will be described briefly or will not be described.

Figure 42:
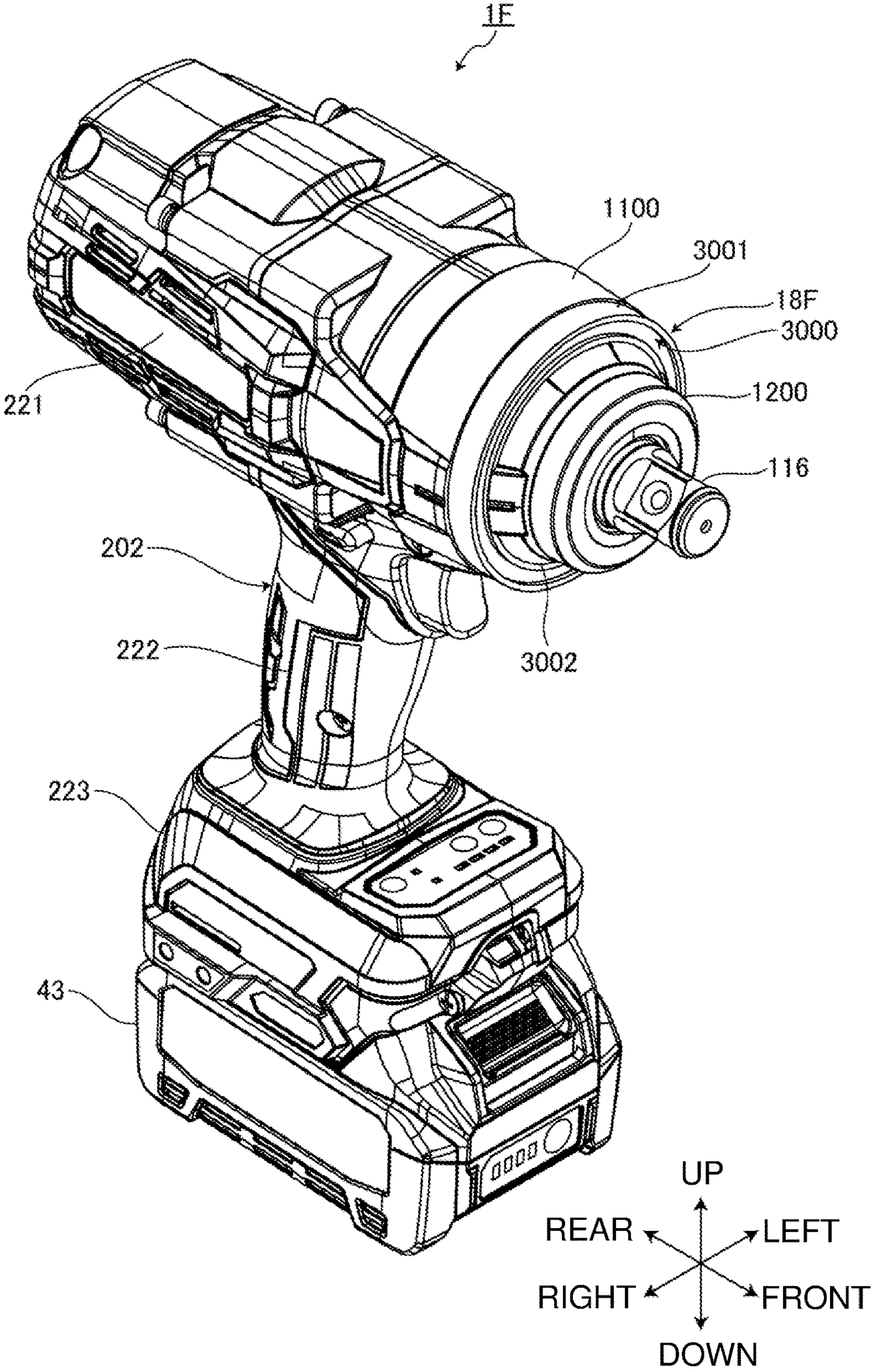
FIG. 42 is a perspective view of an impact tool according to an embodiment as viewed from the right front.
Figure 43:
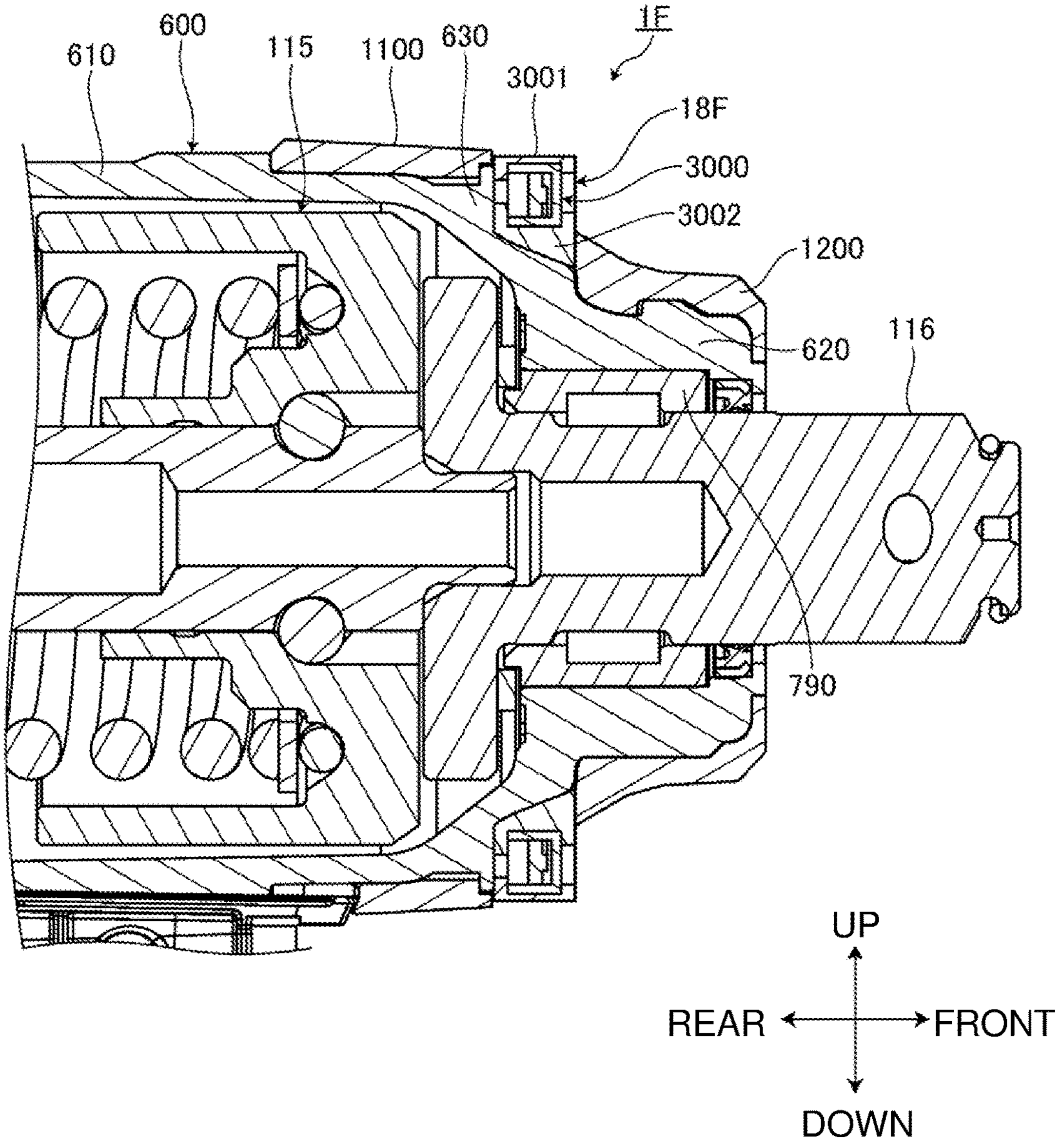
FIG. 43 is a partial sectional view of the impact tool according to the embodiment.
Figure 44:
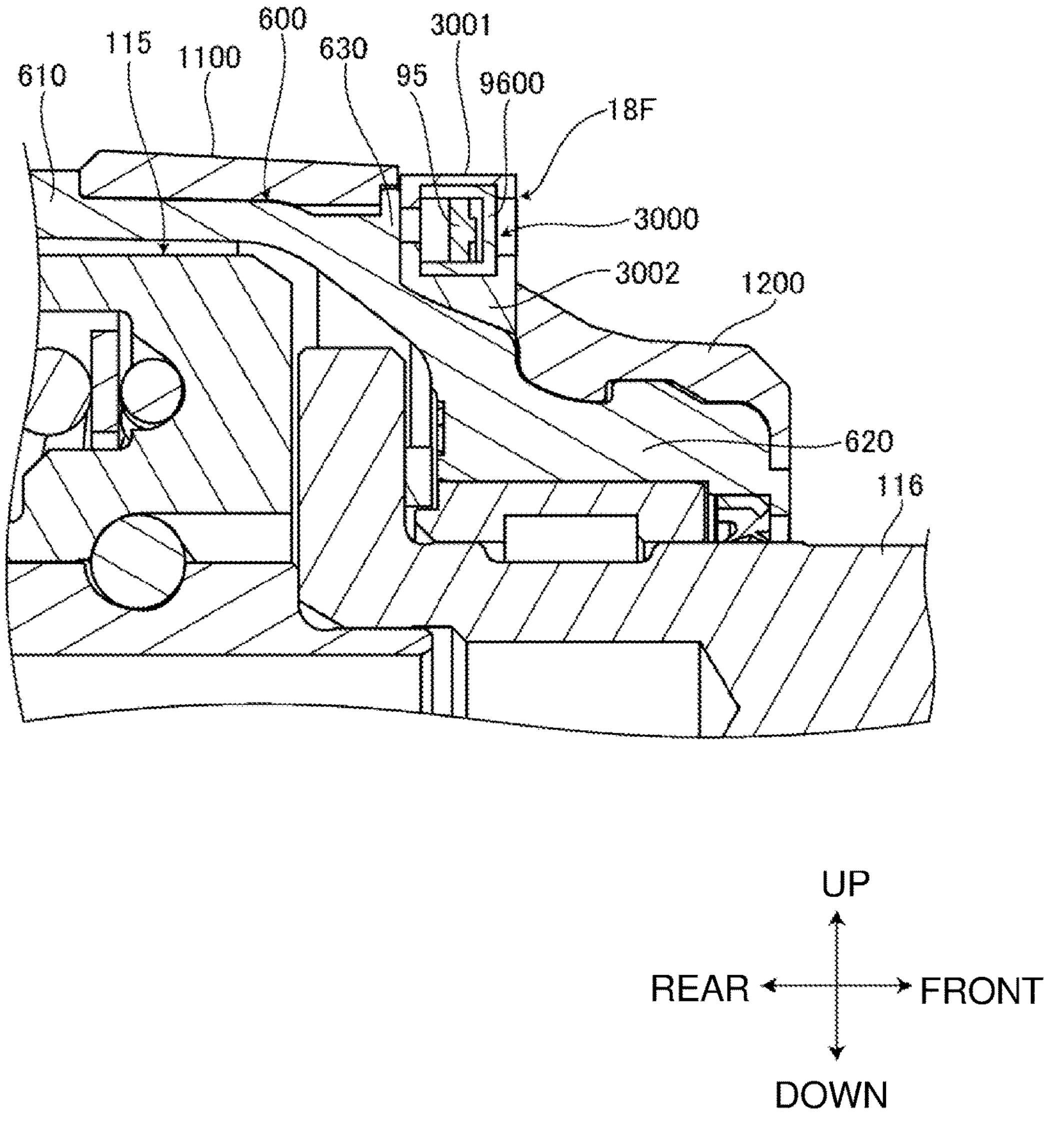
FIG. 44 is a partially enlarged sectional view of the impact tool according to the embodiment.
Figure 45:
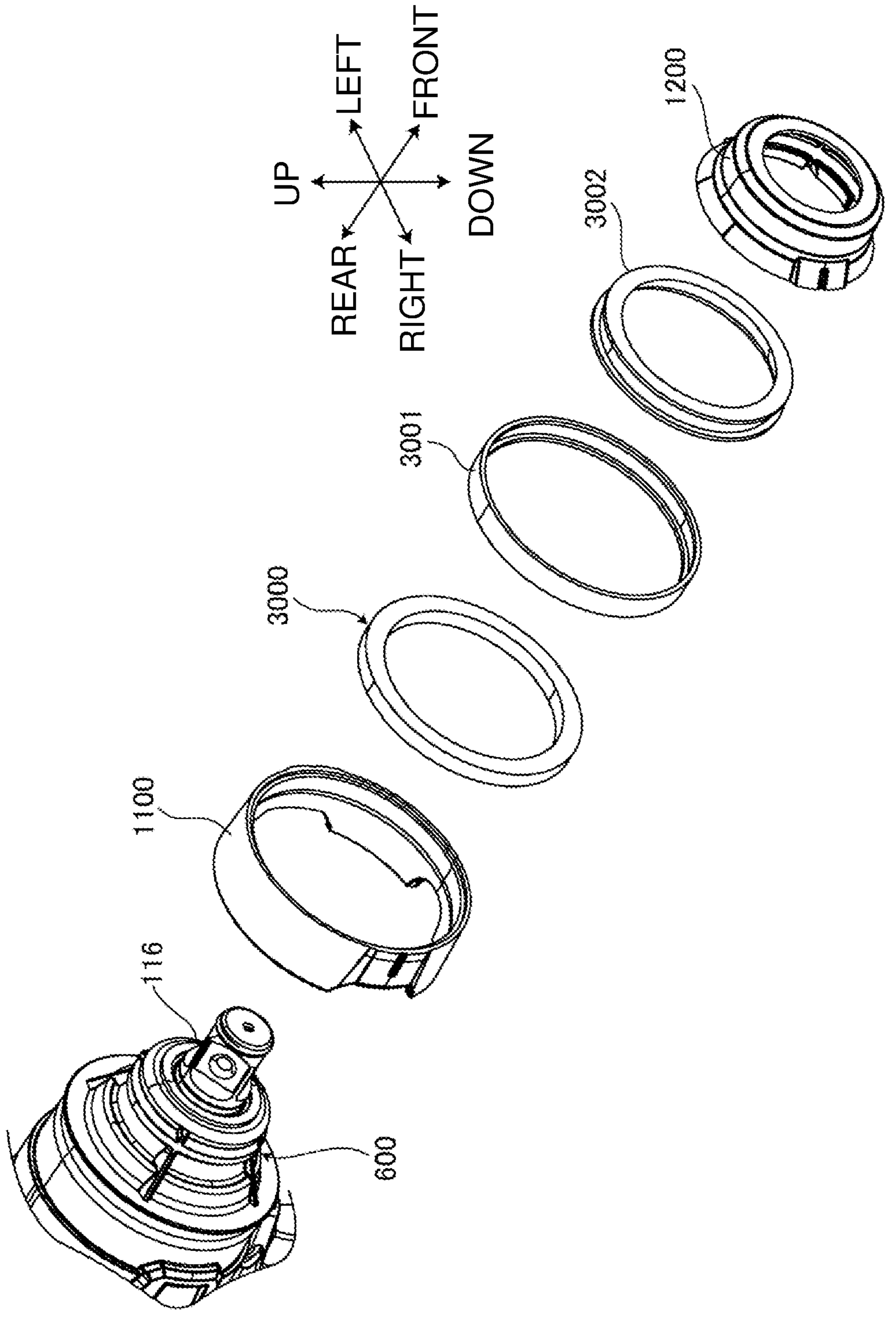
FIG. 45 is an exploded perspective view of a light assembly in the embodiment as viewed from the right front.

FIG. 42 is a perspective view of an impact tool 1F according to the present embodiment as viewed from the right front. FIG. 43 is a partial sectional view of the impact tool 1F. FIG. 44 is a partially enlarged sectional view of the impact tool 1F. FIG. 45 is an exploded perspective view of a light assembly 18F as viewed from the right front.

The impact tool 1F is an impact wrench. Unlike the impact tool described in the above embodiments, the impact tool 1F includes no D-shaped handle. The impact tool 1F is a pistol impact wrench.

The main housing 202 in the impact tool 1F includes a body 221, a grip 222, and a battery holding portion 223. The body 221 accommodates a motor 10. The grip 222 protrudes downward from a lower portion of the body 221. The battery holding portion 223 is connected to the lower end of the grip 222. The grip 222 protrudes downward from the middle of the body 221 in the front-rear direction. The battery holding portion 223 has a larger profile than the grip 222 in the front-rear and lateral directions. A battery mount to which the battery pack 43 is attachable is located in a lower portion of the battery holding portion 223.

A hammer case 600 includes a first cylinder 610, a second cylinder 620, and a connector 630. The second cylinder 620 is located frontward from the first cylinder 610. The connector 630 connects the front end of the first cylinder 610 and the rear end of the second cylinder 620. The second cylinder 620 has a smaller outer diameter than the first cylinder 610. A striker 115 is accommodated in the first cylinder 610. The second cylinder 620 holds an anvil bearing 790. The anvil bearing 790 supports a front portion of an anvil 116 in a rotatable manner. The anvil 116 has its front end located frontward from the front end of the second cylinder 620.

The light assembly 18F includes a light emitter unit 3000, an axial elastic member 3001, and a radial elastic member 3002. The axial elastic member 3001 is at least partially located radially outward from the light emitter unit 3000. The radial elastic member 3002 is at least partially located radially inward from the light emitter unit 3000. The light emitter unit 3000 includes a COB LED 95 and an optical member 9600. The optical member 9600 is at least partially located frontward from the COB LED 95.

A rear bumper 1100 covers at least a part of the outer circumferential surface of the first cylinder 610. A front bumper 1200 is supported by the second cylinder 620. The radial elastic member 3002 surrounds the second cylinder 620. The radial elastic member 3002 at least partially faces the front surface of the optical member 9600. The front bumper 1200 supports the optical member 9600 from the front with the radial elastic member 3002 in between.

Other Embodiments

In the above embodiments, the axial elastic member 91 and the radial elastic member 92 are annular. Multiple axial elastic members 91 may surround the second cylinder 62 at different positions. Multiple radial elastic members 92 may surround the second cylinder 62 at different positions.

In the above embodiments, the battery holder 9 includes the left battery holder 9L and the right battery holder 9R located on the right of the left battery holder 9L. In other words, the battery holder 9 is laterally dividable. The battery holder 9 may be vertically dividable.

In the above embodiments, the impact tool 1 is an impact wrench. The impact tool may be an impact driver. The impact driver includes an anvil having an insertion hole to receive a tip tool and a chuck assembly to hold the tip tool.

In the above embodiments, the impact tool 1 is powered by the battery pack 43 attached to the battery holder. The impact tool 1 may use utility power (alternating current power supply).

In the above embodiments, the motor 10 is an inner-rotor brushless motor. The motor 10 may be an outer-rotor brushless motor or a brushed motor.

Reference Signs List

1 impact tool
1B impact tool
1C impact tool
1F impact tool
2 main housing
2B screw boss
2L left main housing
2R right main housing
2S screw
3 battery housing
3L left battery housing
3R right battery housing
3S screw
4 motor case
4A cylinder
4B lower wall

4C vent
5 gear case
5B screw boss
6 hammer case
6A bearing support surface
6B screw boss
7 side handle
7A handle portion
7B base
7C first base
7D second base
7E hinge
7F rubber portion
8 bumper
9 battery holder
9L left battery holder
9R right battery holder
10 motor
11 controller
11A controller case
12 fan
13 reducer
14 spindle
14A flange
14B spindle shaft
14C protruding portion
14D spindle groove
15 striker
16 anvil
16A anvil recess
16B anvil shaft
16C anvil projection
16D first groove
16E second groove
17 trigger switch
17A trigger lever
17B switch body
18 light assembly
18B light assembly
18F light assembly
19 interface panel
20 hook assembly
20A base
20B ring
21 body
22 protruding portion
23 grip
23A rear grip
23B upper grip
24 controller compartment
25 panel holder
26 inlet
27 outlet
28 holding protrusion
31 holder support
32 elastic member support
33 spring holder
34 rubber holder
35 guide
36 holding recess
37 opening
40 bearing cover
40S screw
41 screw
42 fastening assembly
42A screw
42B dial
43 battery pack
44 terminal unit
44A terminal plate
44B terminal
45 spring
46 rubber buffer
46A body
46B protrusion
47 stator
48 rotor
49 rotor shaft
50 sensor board
51 rotor bearing
52 rotor bearing
53 first bevel gear
54 second bevel gear
55 planetary gear assembly
55A pin
55S sun gear
55P planetary gear
55I internal gear
56 gear bearing
57 gear bearing
58 spindle bearing
61 first cylinder
61R groove
62 second cylinder
62A groove
62R groove
63 front wall
64 annular rib
71 hammer
71A hammer body
71B hammer projection
71C recess
71D hammer groove
72 ball
73 first coil spring
74 second coil spring
75 third coil spring
76 first washer
77 second washer
78 ball
79 anvil bearing
79A groove
80 O-ring
81 seal
90 light emitter unit
91 axial elastic member
91A axial base
91B cover
91C annular protrusion
91D second axial rib
92 radial elastic member
92A radial base
92B rear support
92C front support
92D radial rib
92E annular protrusion
92F first axial rib
93 washer
94 ring spring
95 chip-on-board light-emitting diode (COB LED)
95A substrate
95B LED chip
95C bank
95D phosphor

95E lead wire
95F recess
96 optical member
96A first outer cylinder
96B second outer cylinder
96C first inner cylinder
96D second inner cylinder
96E light transmitter
96F protrusion
96G snap-fit
100 rubber vibration isolator
100L left rubber vibration isolator
100R right rubber vibration isolator
101 first portion
102 second portion
103 third portion
104 fourth portion
105 fifth portion
106 projection
107 holding groove
110 rear bumper
111 cylindrical portion
112 protrusion
113 recess
115 striker
116 anvil
120 front bumper
121 cylindrical portion
122 annular portion
123 protrusion
202 main housing
221 body
222 grip
223 battery holding portion
300 light emitter unit
301 axial elastic member
301A axial base
301B rear support
301C front support
301D recess
301E flange
302 radial elastic member
302A radial base
302B rear support
302C front support
600 hammer case
610 first cylinder
620 second cylinder
630 connector
790 anvil bearing
901 terminal holder
902 protrusion
903 slide
960 optical member
960A outer cylinder
960B inner cylinder
960C light transmitter
3000 light emitter unit
3001 axial elastic member
3002 radial elastic member
9600 optical member
AX output rotation axis
MX motor rotation axis
VL line

What is claimed is:

1. An impact tool, comprising:
a motor;
a hammer rotatable by the motor;
an anvil strikable by the hammer in a rotation direction;
a hammer case accommodating the hammer;
a light emitter unit including a light emitter configured to illuminate an area adjacent to a front end of the anvil; and
a radial elastic member supported by the hammer case and supporting the light emitter unit from radially inside, wherein
the hammer case includes
a first cylinder surrounding the hammer,
a second cylinder located frontward from the first cylinder and having a smaller outer diameter than the first cylinder, and
a front wall connecting a front end of the first cylinder and a rear end of the second cylinder,
the light emitter unit at least partially surrounds the second cylinder, and
the radial elastic member includes a radial base between the second cylinder and the light emitter unit in a radial direction.

2. The impact tool according to claim 1, wherein
the radial base includes
an inner circumferential surface facing an outer circumferential surface of the second cylinder, and
a radial rib protruding radially inward from the inner circumferential surface, and
the radial rib is in contact with the outer circumferential surface of the second cylinder.

3. The impact tool according to claim 1, further comprising:
an elastic member supported by the hammer case, the elastic member supporting the light emitter unit from at least two of radially outside, rear, or front.

4. The impact tool according to claim 3, wherein
the hammer case includes
a first cylinder surrounding the hammer,
a second cylinder located frontward from the first cylinder and having a smaller outer diameter than the first cylinder, and
a front wall connecting a front end of the first cylinder and a rear end of the second cylinder, and
the elastic member and the light emitter unit are located radially inward from a line connecting the front end of the first cylinder and a front end of the anvil in a cross section including a rotation axis of the anvil and parallel to the rotation axis.

5. The impact tool according to claim 1, wherein
the light emitter unit includes a chip-on-board light-emitting diode.

6. An impact tool, comprising:
a motor;
a hammer rotatable by the motor;
an anvil strikable by the hammer in a rotation direction;
a hammer case accommodating the hammer;
a light emitter unit including a light emitter configured to illuminate an area adjacent to a front end of the anvil;
an elastic member supported by the hammer case, the elastic member including a front support supporting the light emitter unit from front; and
a ring spring fastened to at least a part of the hammer case and supporting the front support from front.

7. An impact tool, comprising:
a motor;
an output unit located frontward from the motor, the output unit being rotatable about an output rotation axis extending in a front-rear direction with a rotational force from the motor;
a bearing supporting the output unit in a rotatable manner;
a case holding the bearing;
an annular light assembly surrounding the case; and
a front bumper located frontward from the light assembly and covering at least a part of a surface of the case, the front bumper comprising rubber and being in contact with at least a part of a front surface of the light assembly.

8. The impact tool according to claim 7, wherein
the front bumper includes
a cylindrical portion surrounding the case, and
a protrusion protruding radially inward from an inner circumferential surface of the cylindrical portion, the protrusion being received in a groove on an outer circumferential surface of the case.

9. The impact tool according to claim 7, wherein
the light assembly includes
a light emitter unit surrounding the case and including a light emitter, and
a radial elastic member supported by the case and supporting the light emitter unit from radially inside, and
the front bumper is in contact with at least a part of a front surface of the radial elastic member.

10. The impact tool according to claim 9, wherein
the light emitter unit includes an optical member facing a front surface of the light emitter, and the optical member transmits light emitted from the light emitter,
the radial elastic member at least partially faces a front surface of the optical member, and
the front bumper supports the optical member from front with the radial elastic member in between.

11. The impact tool according to claim 10, wherein
the front bumper has an outer end located radially outward from an inner end of the optical member.

12. The impact tool according to claim 11, wherein
the light assembly includes an axial elastic member supporting the light emitter unit from rear.

13. The impact tool according to claim 12, wherein
the case includes
a front cylinder holding the bearing,
a rear cylinder located rearward from the front cylinder and having a larger outer diameter than the front cylinder,
a front wall connecting a front end of the rear cylinder and a rear end of the front cylinder, and
an annular rib protruding frontward from an outer edge of a front surface of the front wall, and
the axial elastic member is at least partially between the annular rib and the light emitter unit in a radial direction.

14. The impact tool according to claim 13, further comprising:
a rear bumper comprising rubber and covering an outer circumferential surface of the rear cylinder and an outer circumferential surface of the annular rib.

15. The impact tool according to claim 14, wherein
each of the radial elastic member and the axial elastic member comprises rubber, and
each of the front bumper and the rear bumper has a higher rubber hardness than the radial elastic member or the axial elastic member.

16. The impact tool according to claim 14, wherein
the rear bumper has a front end located rearward from a rear end of the optical member.

17. The impact tool according to claim 14, wherein
the rear bumper has a front end overlapping a rear end of the axial elastic member in a radial direction.

18. The impact tool according to claim 7, further comprising:
a main housing including
a body accommodating the motor,
a protruding portion protruding downward from the body,
a controller compartment behind the protruding portion, and
a grip behind the body, the grip including
a rear grip extending upward from a rear portion of the controller compartment, and
an upper grip extending frontward from an upper end of the rear grip, the rear grip having a lower end connected to the controller compartment and an upper end connected to a rear end of the upper grip, the upper grip having a front end connected to an upper portion of the body.

19. The impact tool according to claim 7, further comprising:
a main housing including
a body accommodating the motor,
a grip protruding downward from the body, and
a battery holding portion connected to a lower end of the grip.

* * * * *